US009298749B2

(12) United States Patent
Cosic

(10) Patent No.: US 9,298,749 B2
(45) Date of Patent: *Mar. 29, 2016

(54) UNIVERSAL DATA MANAGEMENT INTERFACE

(71) Applicant: Crucial Apex Communications LLC, Wilmington, DE (US)

(72) Inventor: Jasmin Cosic, Pittsfield, MA (US)

(73) Assignee: S. AQUA SEMICONDUCTOR, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,298

(22) Filed: Mar. 22, 2013

(65) Prior Publication Data

US 2013/0218932 A1 Aug. 22, 2013

Related U.S. Application Data

(63) Continuation of application No. 11/072,030, filed on Mar. 4, 2005, now Pat. No. 8,417,740, which is a continuation of application No. 10/217,937, filed on Aug. 12, 2002, now Pat. No. 7,117,225.

(60) Provisional application No. 60/311,863, filed on Aug. 13, 2001.

(51) Int. Cl.
*G06F 17/30* (2006.01)

(52) U.S. Cl.
CPC ...... *G06F 17/30289* (2013.01); *G06F 17/3056* (2013.01); *Y10S 707/966* (2013.01); *Y10S 707/99938* (2013.01); *Y10S 707/99943* (2013.01)

(58) Field of Classification Search
CPC ............... G06F 17/30864; G06F 17/30867; G06F 17/30067; G06F 17/30289; G06F 17/3056; Y10S 707/99943; Y10S 707/99938; Y10S 707/966
USPC ............... 707/705, 770, 805, 781, 782, 783; 715/212, 216, 217, 219, 847, 968; 709/217
See application file for complete search history.

(56) References Cited

U.S. PATENT DOCUMENTS

| | | | |
|---|---|---|---|
| 5,333,316 A | | 7/1994 | Champagne et al. |
| 5,596,745 A | | 1/1997 | Lai et al. |
| 5,634,053 A | * | 5/1997 | Noble et al. |
| 5,761,663 A | | 6/1998 | Lagarde et al. |
| 5,835,758 A | | 11/1998 | Nochur et al. |
| 5,960,194 A | | 9/1999 | Choy et al. |
| 6,076,092 A | | 6/2000 | Goldberg et al. |
| 6,167,405 A | | 12/2000 | Rosensteel, Jr. et al. |

(Continued)

OTHER PUBLICATIONS

Advisory Action dated Apr. 4, 2011 in U.S. Appl. No. 12/352,786.

(Continued)

*Primary Examiner* — Greta Robinson
(74) *Attorney, Agent, or Firm* — Brundidge & Stanger, P.C.

(57) ABSTRACT

A universal data management interface (UDMI) system includes a processing system generates a visual interface through which a user can access, manage, and manipulate data on plural different types of remote databases. The UDMI connects to multiple standard database management systems and to allow multiple users to access, manage, and manipulate data within each of the multiple standard database management systems. The UDMI also allows multiple virtual databases that reside in a single database to be available as a network service.

16 Claims, 52 Drawing Sheets

(Universal Data Management Interface)

(56) References Cited

U.S. PATENT DOCUMENTS

| | | | |
|---|---|---|---|
| 6,230,157 B1 | 5/2001 | Malcolm et al. | |
| 6,233,573 B1 | 5/2001 | Bair et al. | |
| 6,330,560 B1 | 12/2001 | Harrison et al. | |
| 6,363,393 B1 | 3/2002 | Ribitzky | |
| 6,457,009 B1 | 9/2002 | Bollay | |
| 6,469,714 B2 | 10/2002 | Buxton et al. | |
| 6,480,848 B1 | 11/2002 | DeKimpe et al. | |
| 6,529,910 B1 | 3/2003 | Fleskes | |
| 6,606,627 B1 | 8/2003 | Guthrie et al. | |
| 6,651,140 B1 * | 11/2003 | Kumar | 711/118 |
| 6,654,747 B1 | 11/2003 | Van Huben et al. | |
| 6,684,214 B2 | 1/2004 | Bata et al. | |
| 6,694,306 B1 | 2/2004 | Nishizawa et al. | |
| 6,725,227 B1 | 4/2004 | Li | |
| 6,754,679 B2 * | 6/2004 | Oheda | |
| 6,795,825 B2 * | 9/2004 | Rishe | |
| 6,801,914 B2 | 10/2004 | Barga et al. | |
| 6,807,539 B2 | 10/2004 | Miller et al. | |
| 6,865,573 B1 | 3/2005 | Hornick et al. | |
| 6,871,346 B1 | 3/2005 | Kumbalimutt et al. | |
| 6,952,717 B1 | 10/2005 | Monchilovich et al. | |
| 6,968,346 B2 * | 11/2005 | Hekmatpour | 715/235 |
| 7,003,528 B2 | 2/2006 | Dan et al. | |
| 7,082,435 B1 | 7/2006 | Guzman et al. | |
| 7,165,060 B2 | 1/2007 | Foster et al. | |
| 7,228,303 B1 | 6/2007 | Brenes et al. | |
| 9,047,324 B2 * | 6/2015 | Cosic | G06F 17/3056 |
| 2001/0056354 A1 | 12/2001 | Feit et al. | |
| 2002/0002688 A1 | 1/2002 | Gregg et al. | |
| 2002/0156929 A1 | 10/2002 | Hekmatpour | |
| 2002/0169777 A1 | 11/2002 | Balajel et al. | |
| 2004/0068514 A1 | 4/2004 | Chundi et al. | |
| 2005/0149517 A1 | 7/2005 | Cosic | |
| 2005/0149542 A1 | 7/2005 | Cosic | |
| 2005/0289105 A1 | 12/2005 | Cosic | |
| 2010/0023541 A1 | 1/2010 | Cosic | |
| 2010/0082536 A1 | 4/2010 | Cosic | |

OTHER PUBLICATIONS

Advisory Action dated Nov. 16, 2011 in U.S. Appl. No. 11/072,845.
Advisory Action dated Nov. 2, 2011 in U.S. Appl. No. 12/359,199.
"Advisory Action", U.S. Appl. No. 11/072,845, (May 21, 2010), 3 pages.
Alonso, et al., "Negotiating Data Access in Federated Database Systems", Data Engineering, Proceedings fifth international conference, http://www.informatik.uni-trier.de!-ley/db/conf/icde/icde89.html,(1989),5665.
Anderson et al. "Distributed Network management in an Internet Environment" Global Telecommunication Conference, 1997. GLOBECOME'97., IEEE vol. 1, 3-8 Nov. 1997, pp. 180-184.
eUnifyNetworks, http:// eunify.net, printed on Aug. 8, 2005, 1 page.
Final Office Action dated Aug. 26, 2011 in U.S. Appl. No. 11/072,845.
Final Office Action dated Aug. 31, 2011 in U.S. Appl. No. 12/359,199.
Final Office Action dated Dec. 8, 2010 for U.S. Appl. No. 11/072,845.
Final Office Action dated Jan. 28, 2011 in U.S. Appl. No. 12/352,786.
"Final Office Action", U.S. Appl. No. 11/072,845 (Mar. 16, 2010), 12 pages.
http://searchnetworking.techtarget.com/sDefinition/0,290660,sid7 gci213116,00.html, printed on Aug. 12, 2005, 2 pages.
Intuit QuickBase, http://www.quickbase.com/p/CWHome.asp?ps=CW, on Aug. 7, 2004, 2 pages.
Lightspoke, retrieved from h!!n://www.lightspoke.com/index.html on Aug. 7, 2004, 1 page.
"Non Final Office Action", U.S. Appl. No. 12/352,786, (Aug. 24, 2010), 13 pages.
"Non Final Office Action", U.S. Appl. No. 12/359,199, (Sep. 28, 2010), 11 pages.
Non Final Office Action, U.S. Appl. No. 11/072 845 (Jul. 20, 2009), 6 pages.
"Non Final Office Action", U.S. Appl. No. 11/072,845, (Jul. 2, 2010), 11 pages.
Office Action dated Apr. 28, 2011 in U.S. Appl. No. 12/352,786.
Office Action dated Feb. 6, 2008 for U.S. Appl. No. 11/072,845.
Office Action dated Sep. 29, 2011 in U.S. Appl. No. 12/352,786.
Office Action Restriction dated Mar. 25, 2011 in U.S. Appl. No. 12/359,199.
Requirement, U.S. Appl. No. 11/072,845 (Mar. 3, 2009),7 pages.
Telecommunication Conference, 1997. GLOBECOM'97., IEEE vol. 1, Nov. 3-8, 1997, pp. 180-184.
Telenet Protocol Specification, RFC 854 (RFC854), http://www.faqs.org/rfcs/rfc854.html, printed on Aug. 12, 2005, 13 pages.

* cited by examiner

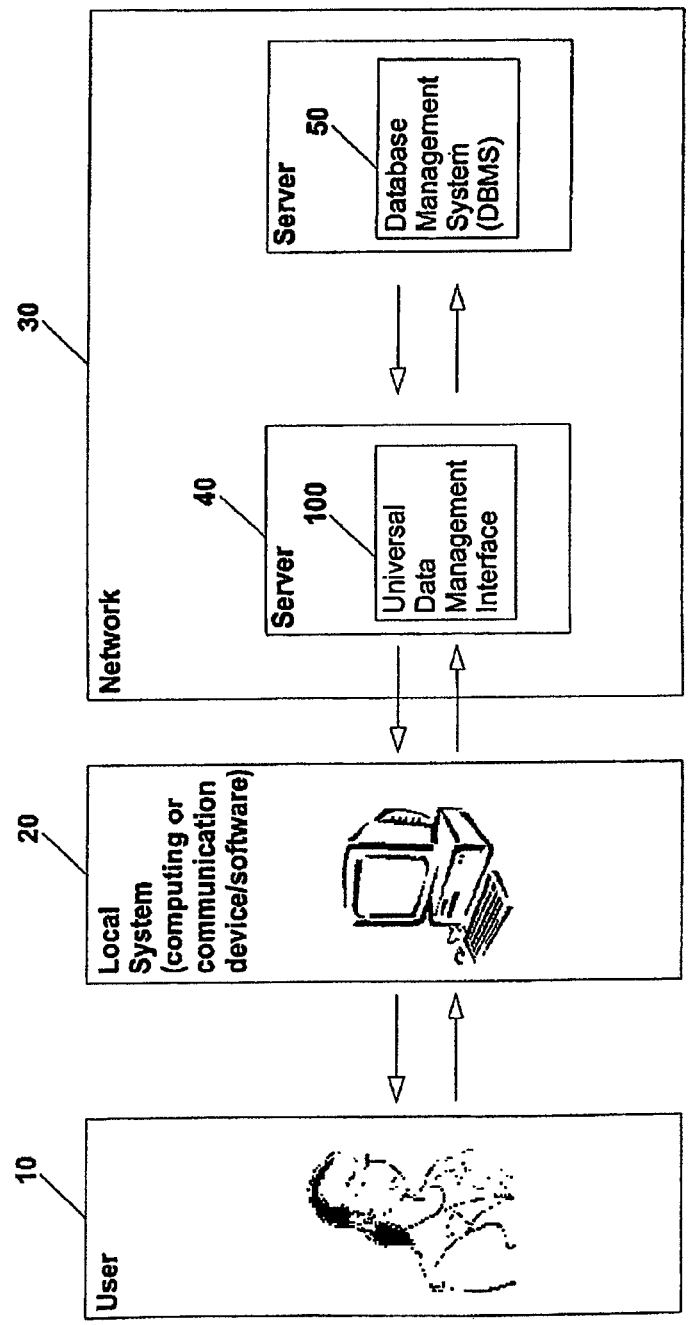
FIG. 1 (Universal Data Management Interface)

FIG. 1A (DBMS database)

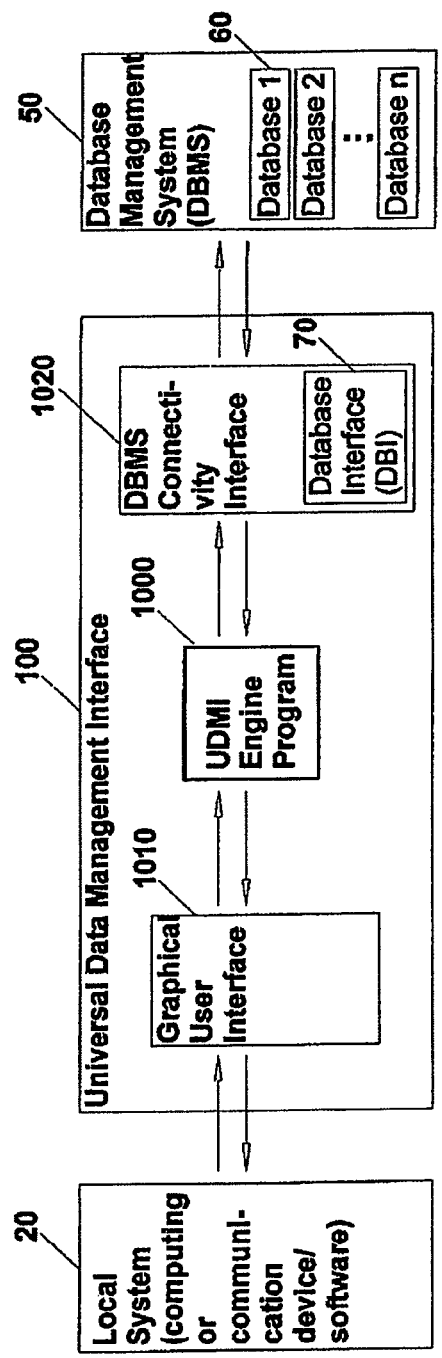
FIG. 2 (UDMI's abstract structure)

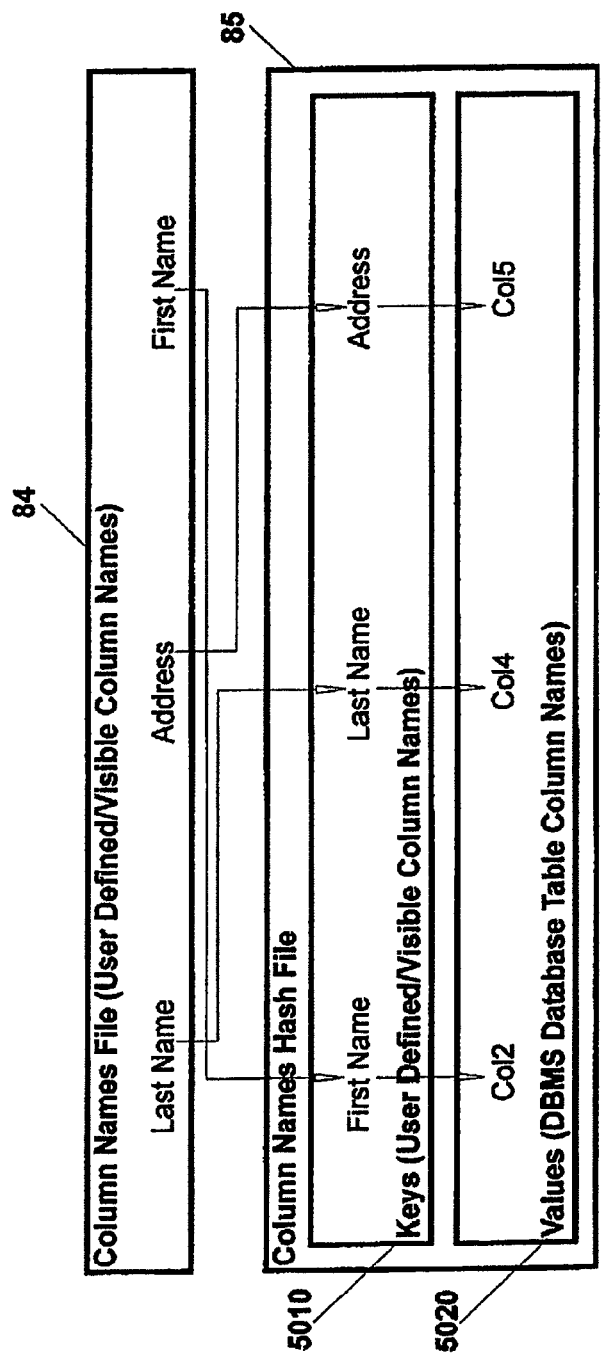
FIG. 3 (Column Names Hash File interacting with the Column Names File)

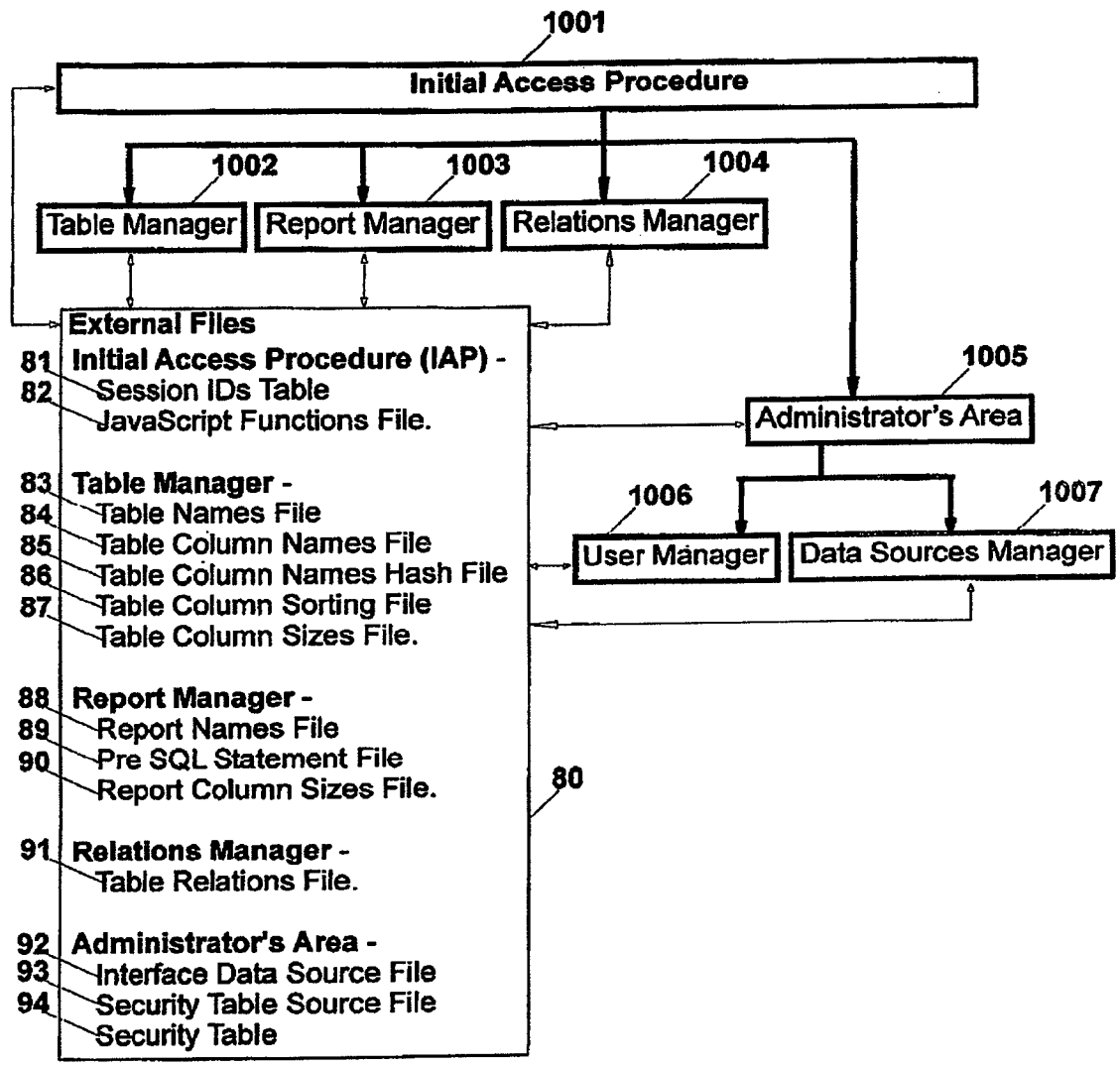
FIG. 4 (UDMI's logical structure)

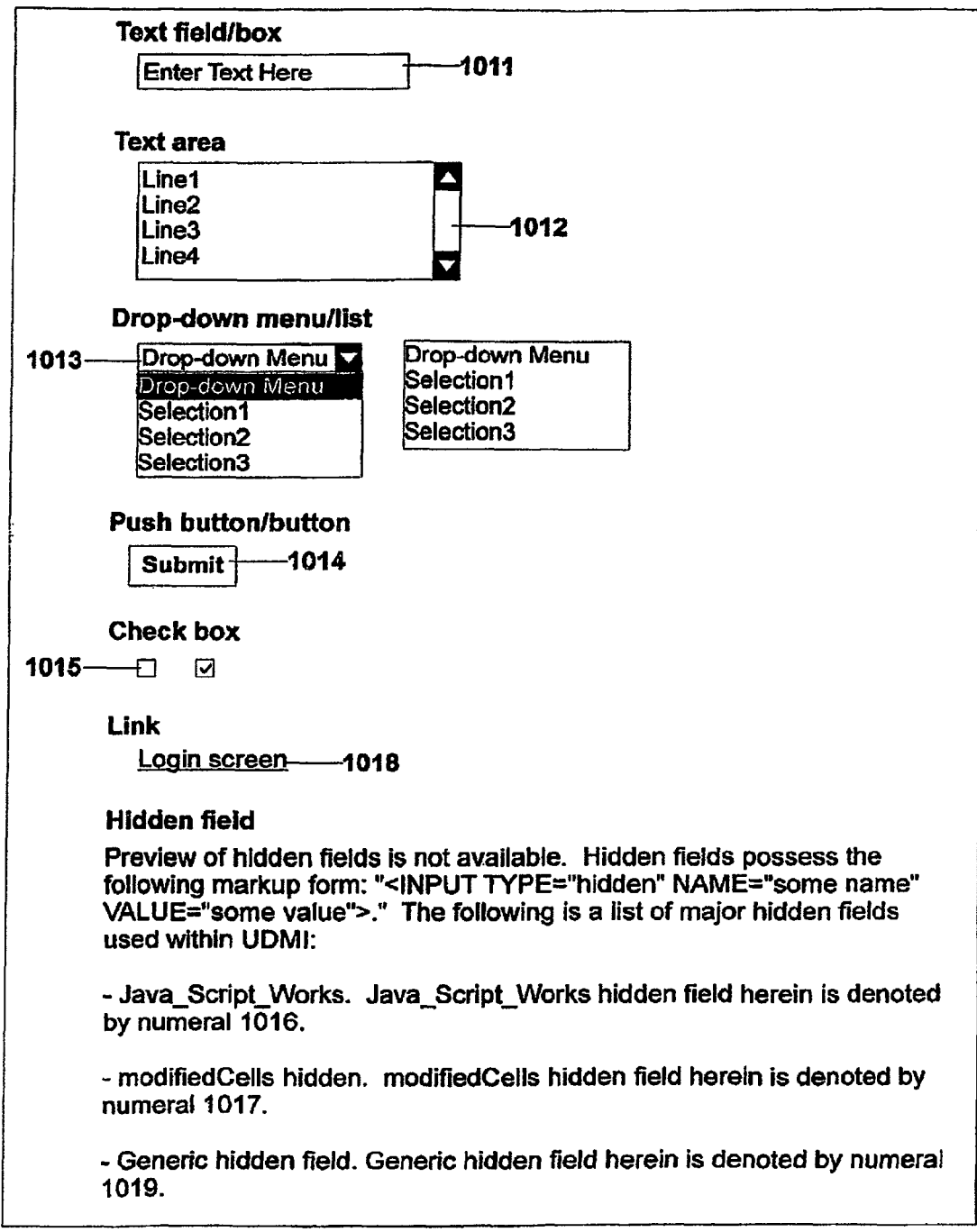
FIG. 5 (GUI form components)

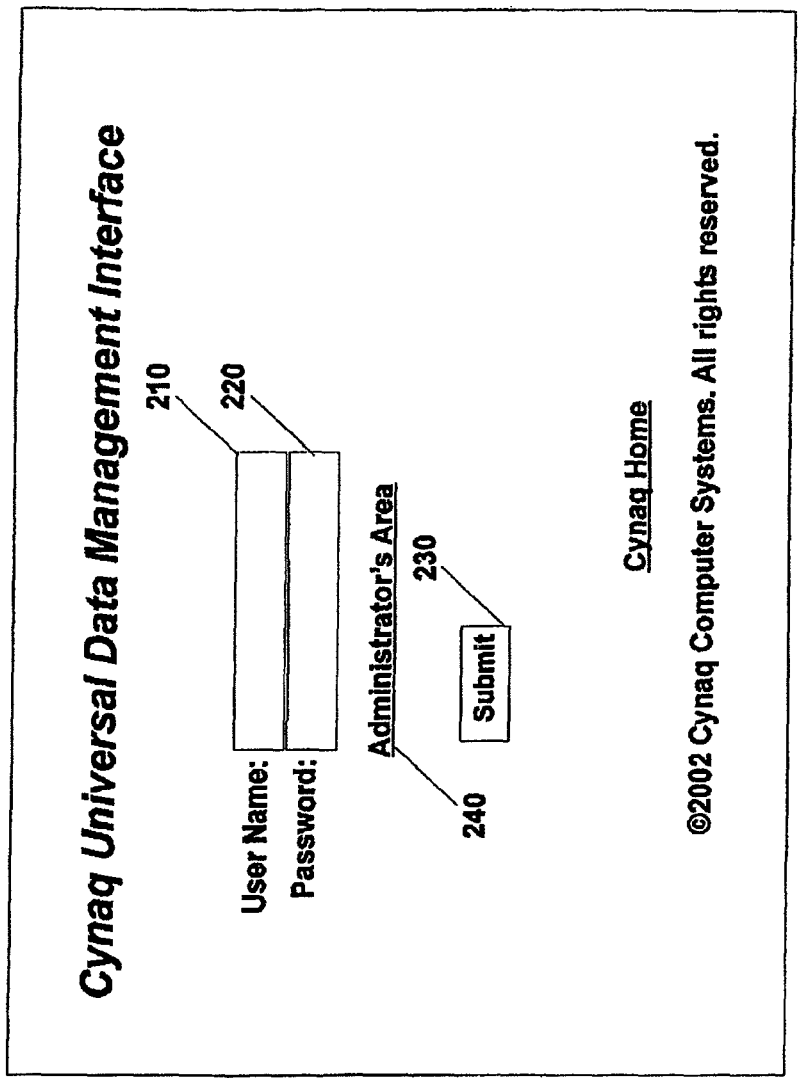
FIG. 6 (Initial Access Procedure's login screen)

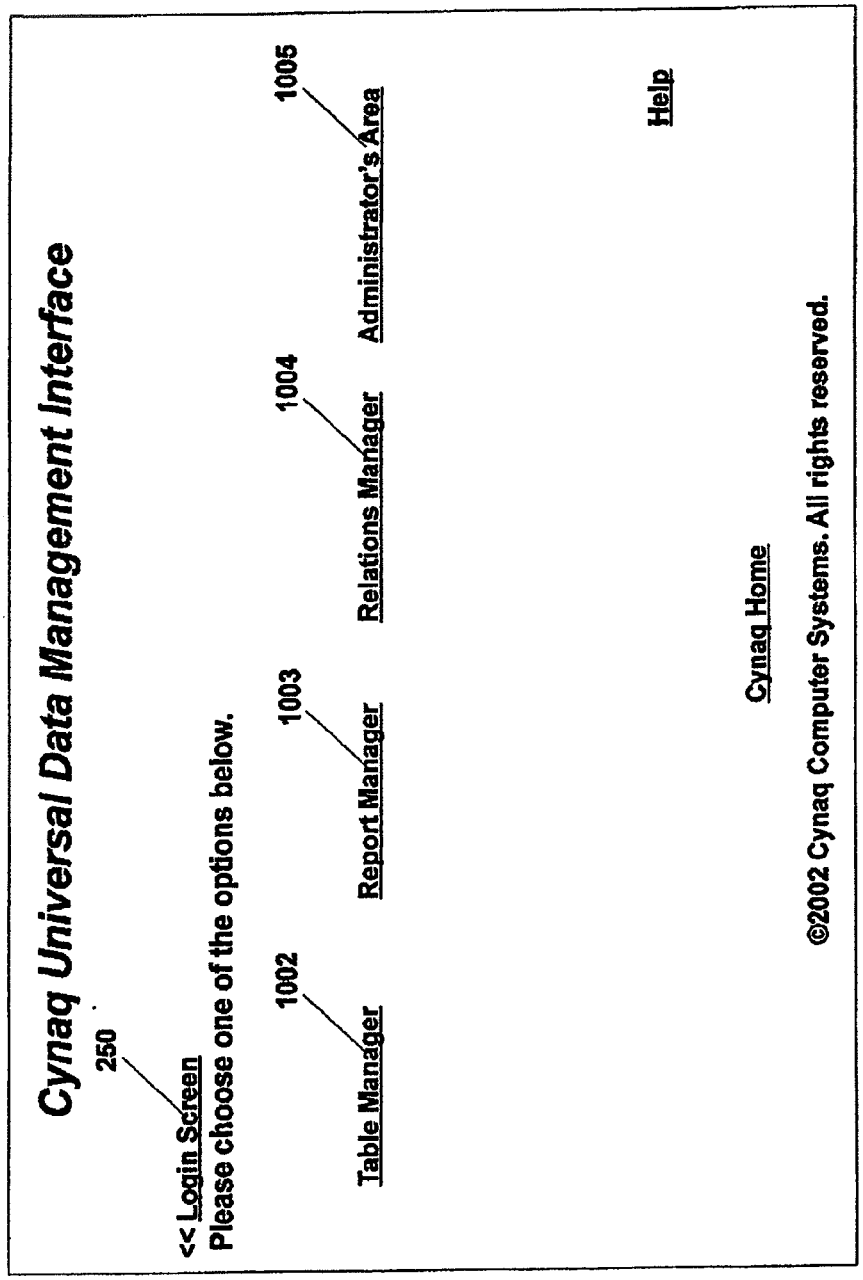
FIG. 7 (UDMI's four functional areas)

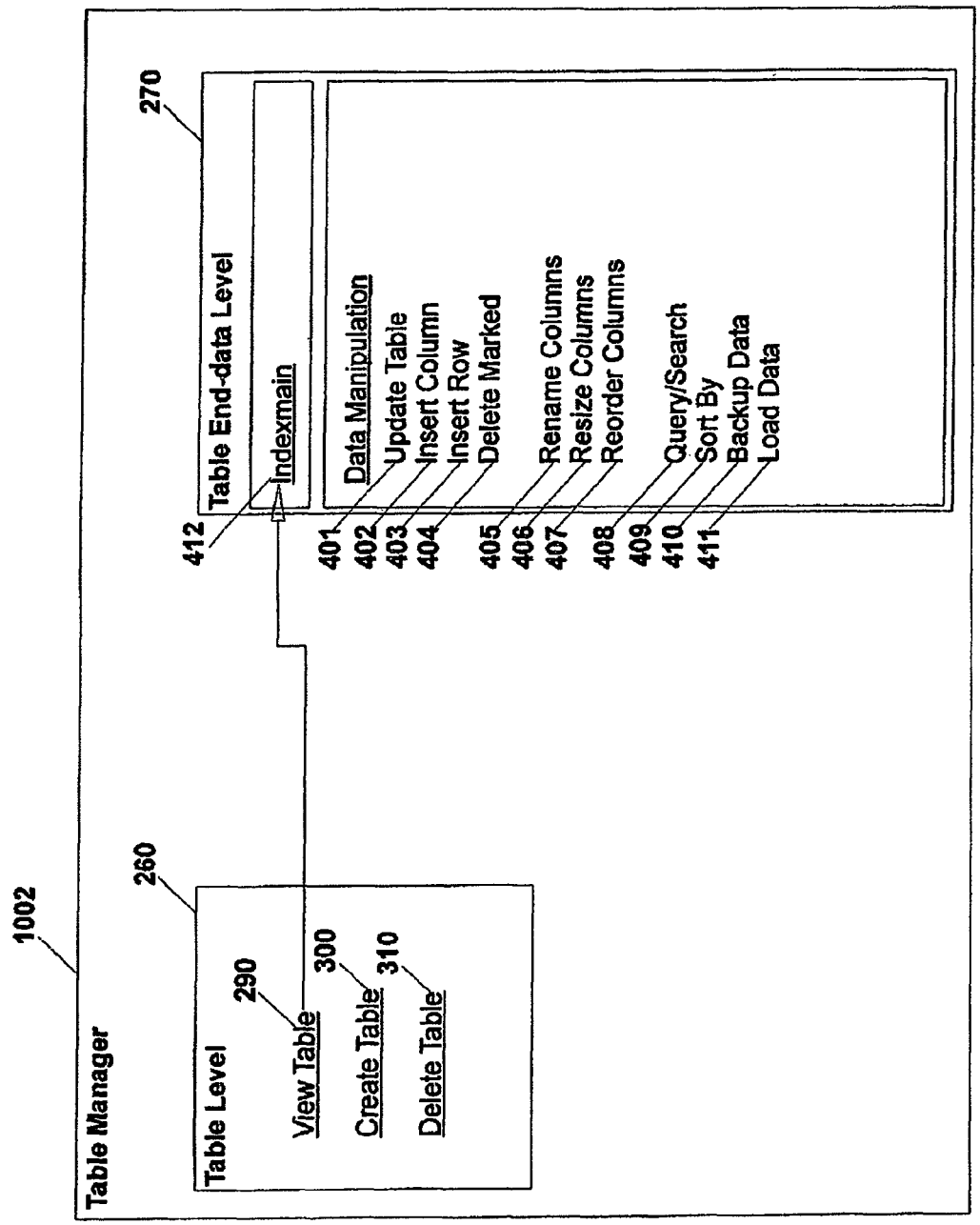
FIG. 8 (Table Manager's two modes of operation)

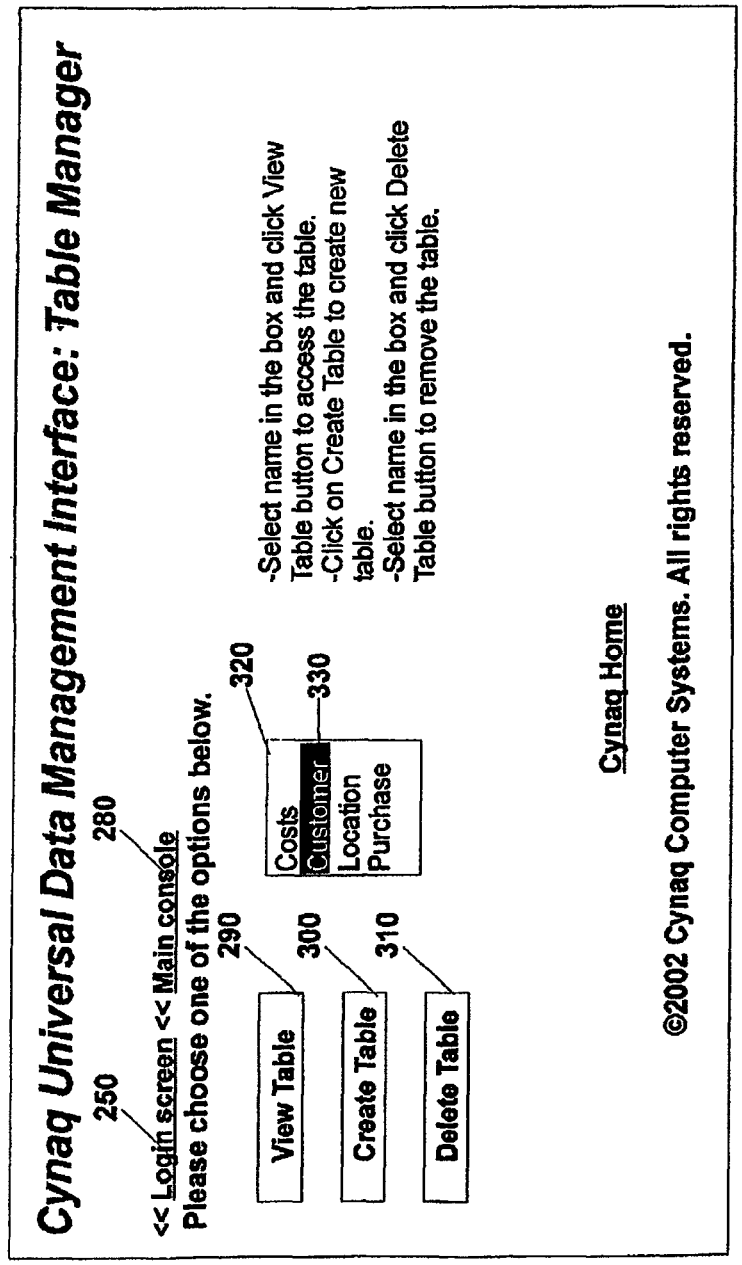
FIG. 9 (initial table level screen with four tables defined)

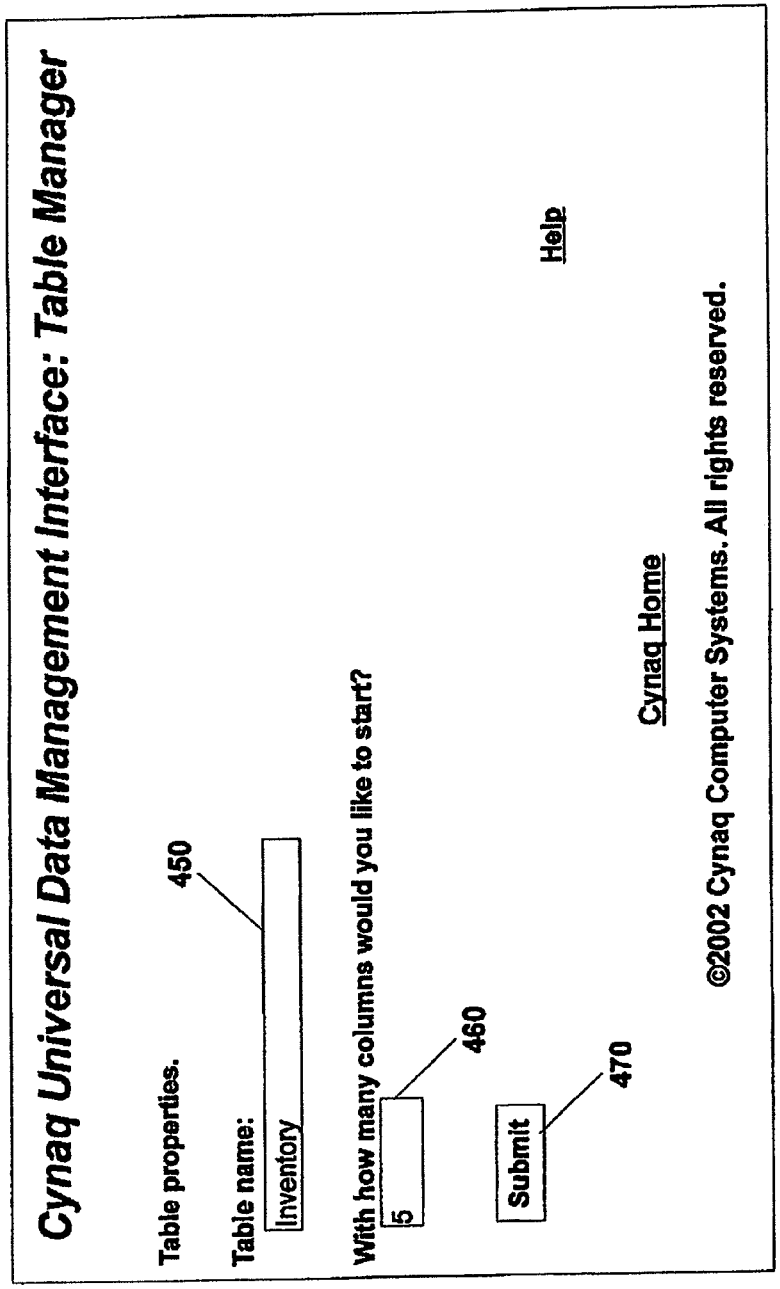
FIG. 10 (first step in table creation)

Cynaq Universal Data Management Interface: Table Manager

Column properties.  480     490

| | Name | Type | Range (where applicable) | Primary Key |
|---|---|---|---|---|
| 1 > | ItemNumber | INTEGER ▼ | 500 | ⦿ |
| 2 > | ItemName | TEXT ▼ | | ○ |
| 3 > | ItemCost | DECIMAL ▼ | | 510 ○ |
| 4 > | MarkupPercentage | DECIMAL ▼ | | ○ |
| 5 > | UnitsInStock | INTEGER ▼ | | ○ |

520

Submit

Cynaq Home

Help

©2002 Cynaq Computer Systems. All rights reserved.

FIG. 11 (second step in table creation)

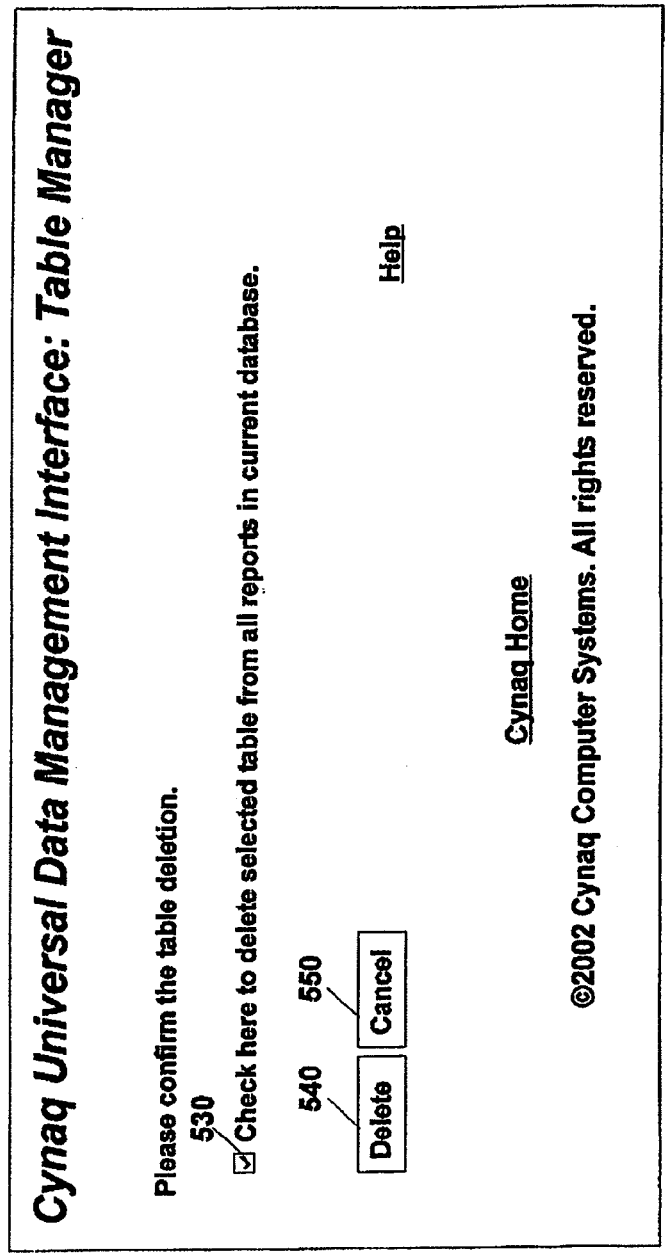
FIG. 12 (table deletion confirmation)

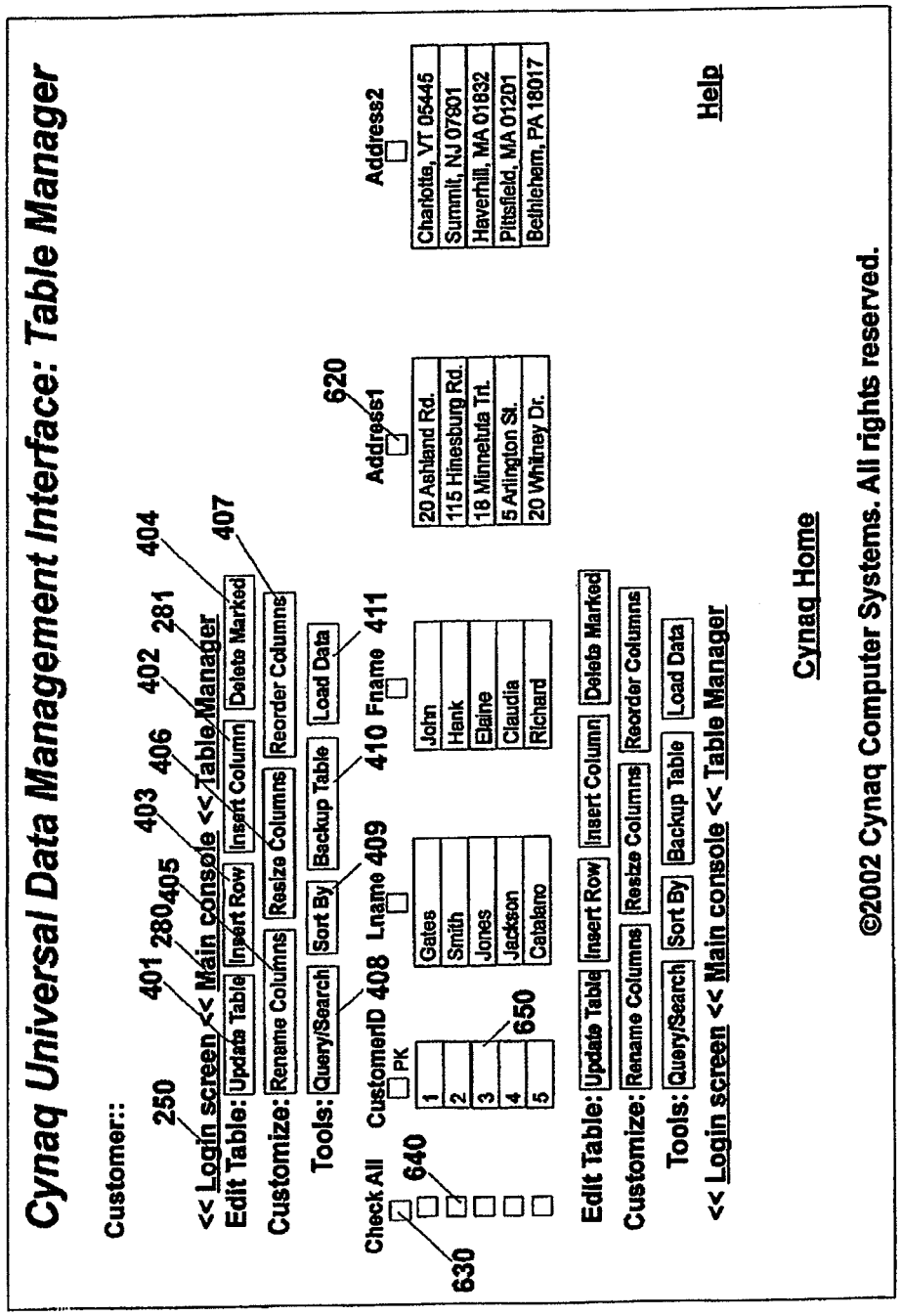
FIG. 13 (table end-data level screen)

Cynaq Universal Data Management Interface: Table Manager

CustomerID (PK)   Lname   700   Fname           Address1           Address2

[6]              [Nichols]      [Richard]       [23 Pine Street]   [New York, NY 01234]

[Submit]—710                                                       Help

Cynaq Home

©2002 Cynaq Computer Systems. All rights reserved.

FIG. 14 (Table Manager's insert row screen)

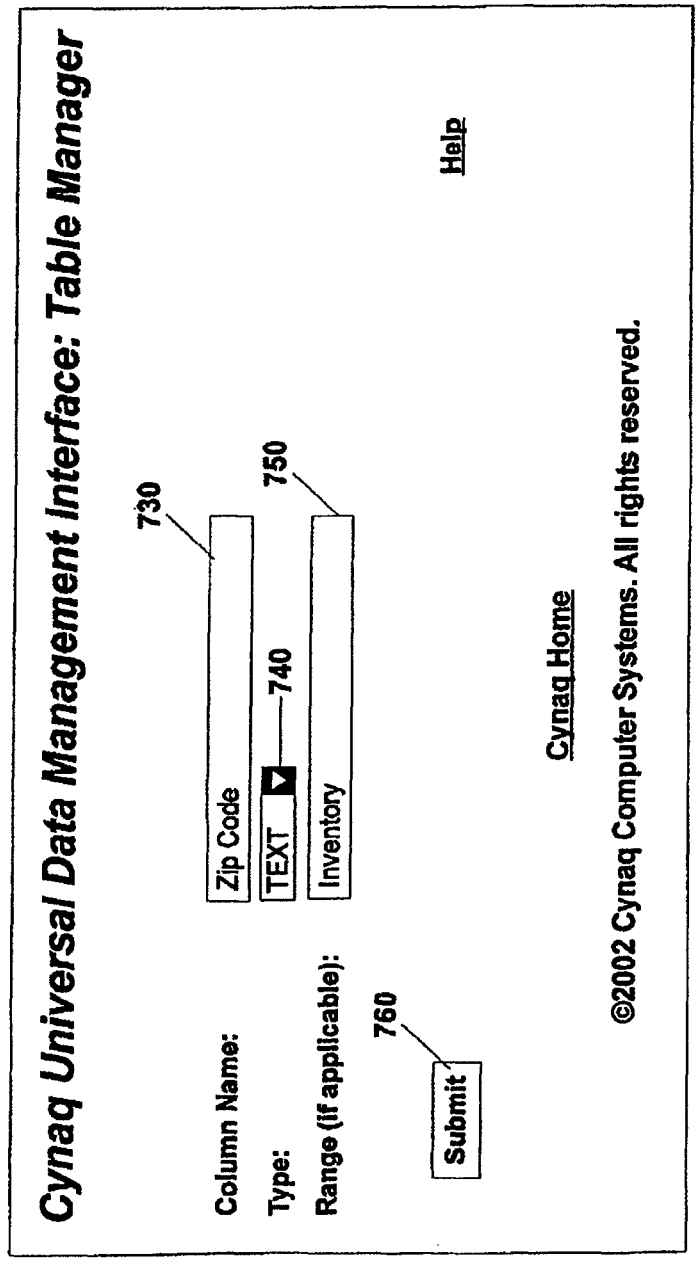
FIG. 15 (Table Manager's insert column screen)

Cynaq Universal Data Management Interface: Table Manager

Customer::

<< Login screen << Main console << Table Manager
Edit Table: Update Table | Insert Row | Insert Column | Delete Marked
Customize: Rename Columns | Resize Columns | Reorder Columns
Tools: Query/Search | Sort By | Backup Table | Load Data

| Check All | CustomerID PK | Lname | Fname | Address1 620 | Address2 |
|---|---|---|---|---|---|
| ☐ | 1 | Gates | John | 20 Ashland Rd. | Charlotte, VT 05445 |
| ☑ 640 | 2 | Smith | Hank | 115 Hinesburg Rd. | Summit, NJ 07901 |
| ☐ | 3 | Jones | Elaine | 18 Minneluta Trl. | Haverhill, MA 01832 |
| ☑ | 4 | Jackson | Claudia | 5 Arlington St. | Pittsfield, MA 01201 |
| ☐ | 5 | Catalano | Richard | 20 Whitney Dr. | Bethlehem, PA 18017 |

Edit Table: Update Table | Insert Row | Insert Column | Delete Marked
Customize: Rename Columns | Resize Columns | Reorder Columns
Tools: Query/Search | Sort By | Backup Table | Load Data << Login screen << Main console << Table Manager Cynaq Home                                              Help ©2002 Cynaq Computer Systems. All rights reserved.

FIG. 16 (example of checking/marking rows and columns)

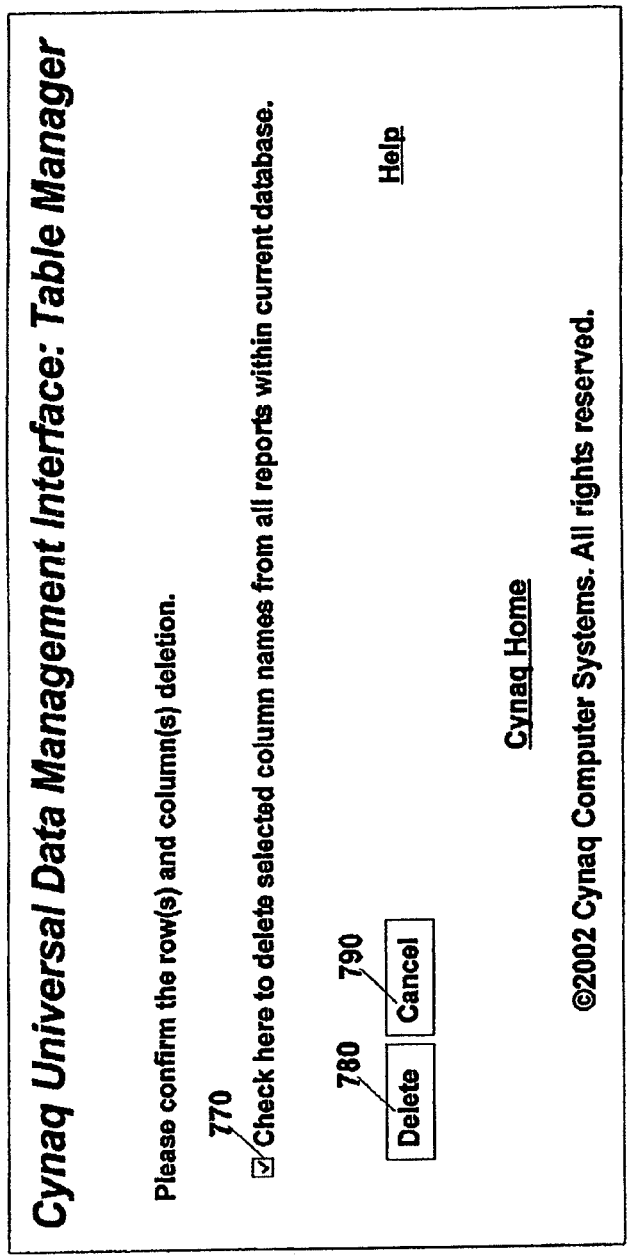
FIG. 17 (Table Manager's delete marked confirmation screen)

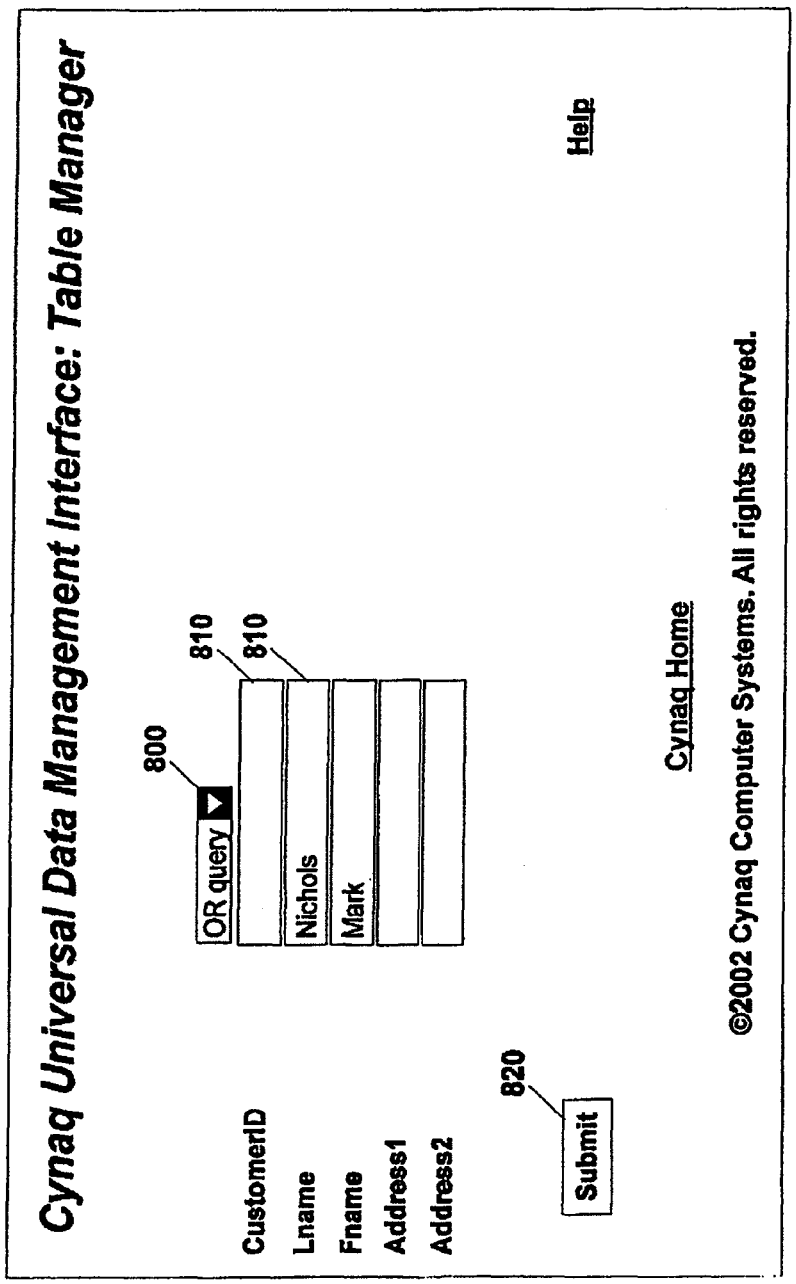
FIG. 18 (query/search screen)

Cynaq Universal Data Management Interface: Table Manager

> Rename columns by changing the text of input boxes below.

| CustomerID | Lname | Fname | Address1 | Address2 |

830

☑ Check here to rename columns in all reports within current database.

840

[Submit] 850

Cynaq Home

©2002 Cynaq Computer Systems. All rights reserved.

Help

FIG. 19 (Table Manager's rename columns screen)

FIG. 20 (Table Manager's resize columns screen)

FIG. 21 (Table Manager's reorder columns screen)

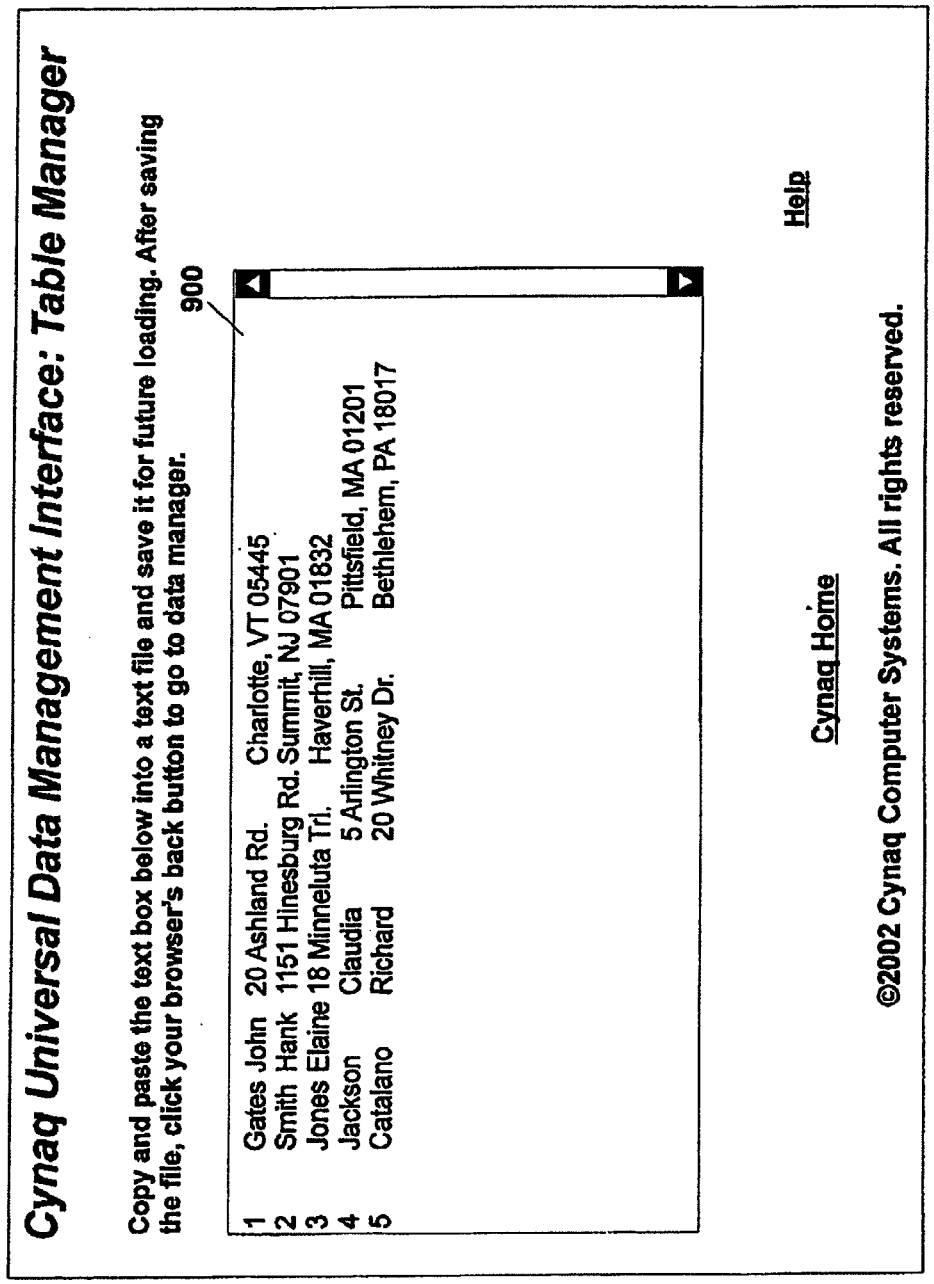
FIG. 22 (Table Manager's backup table screen)

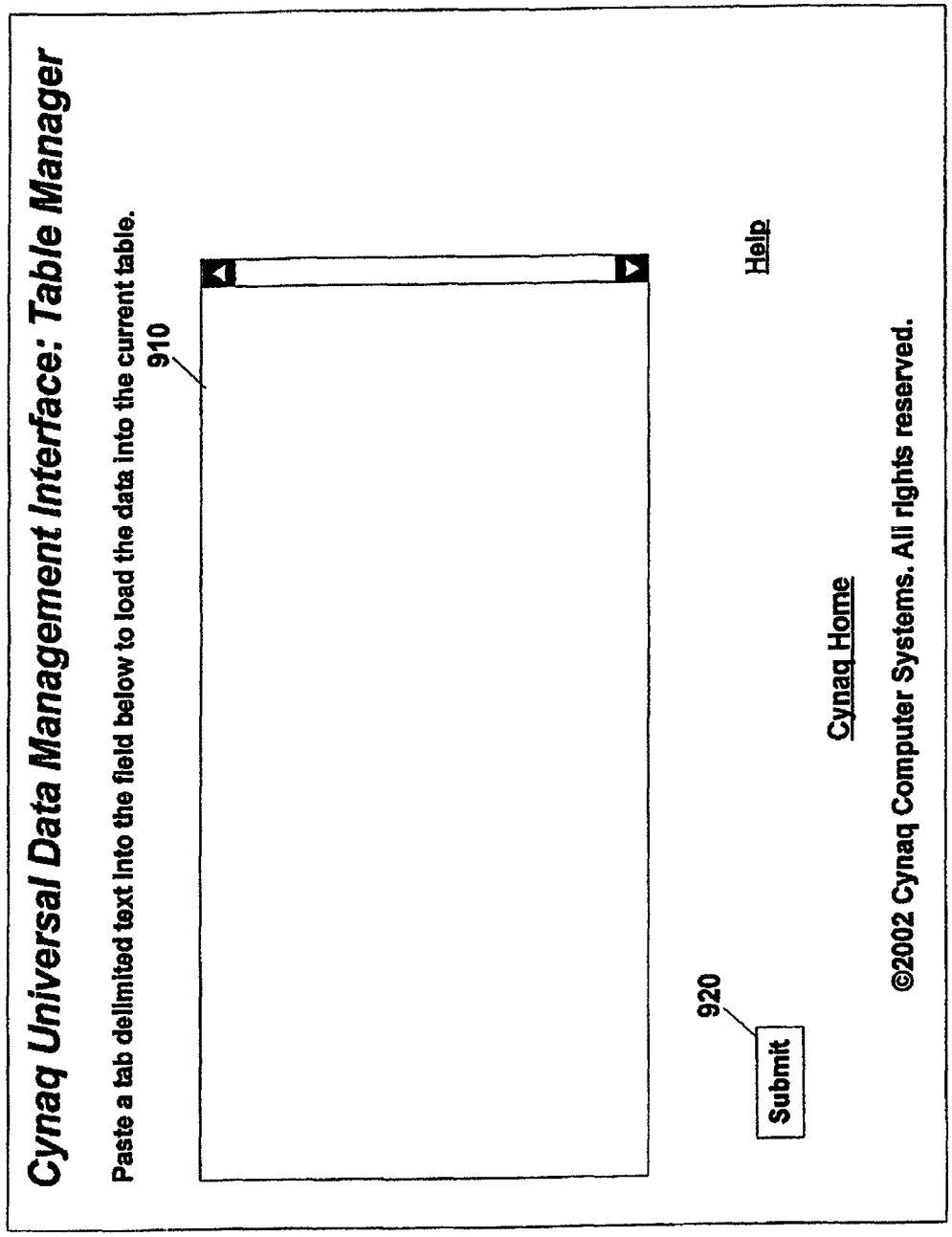
FIG. 23 (Table Manager's load data screen)

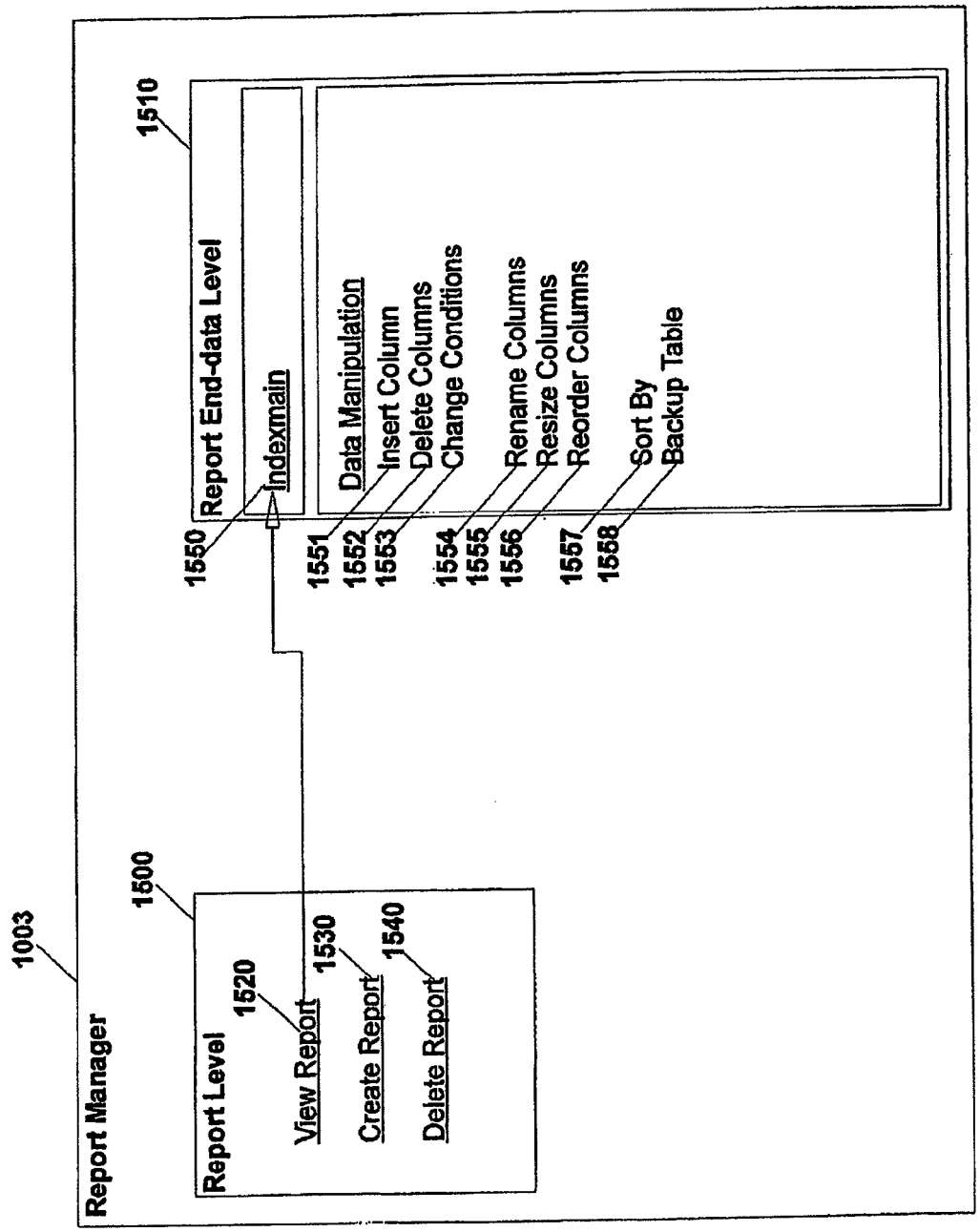
FIG. 24 (Report Manager's two modes of operation)

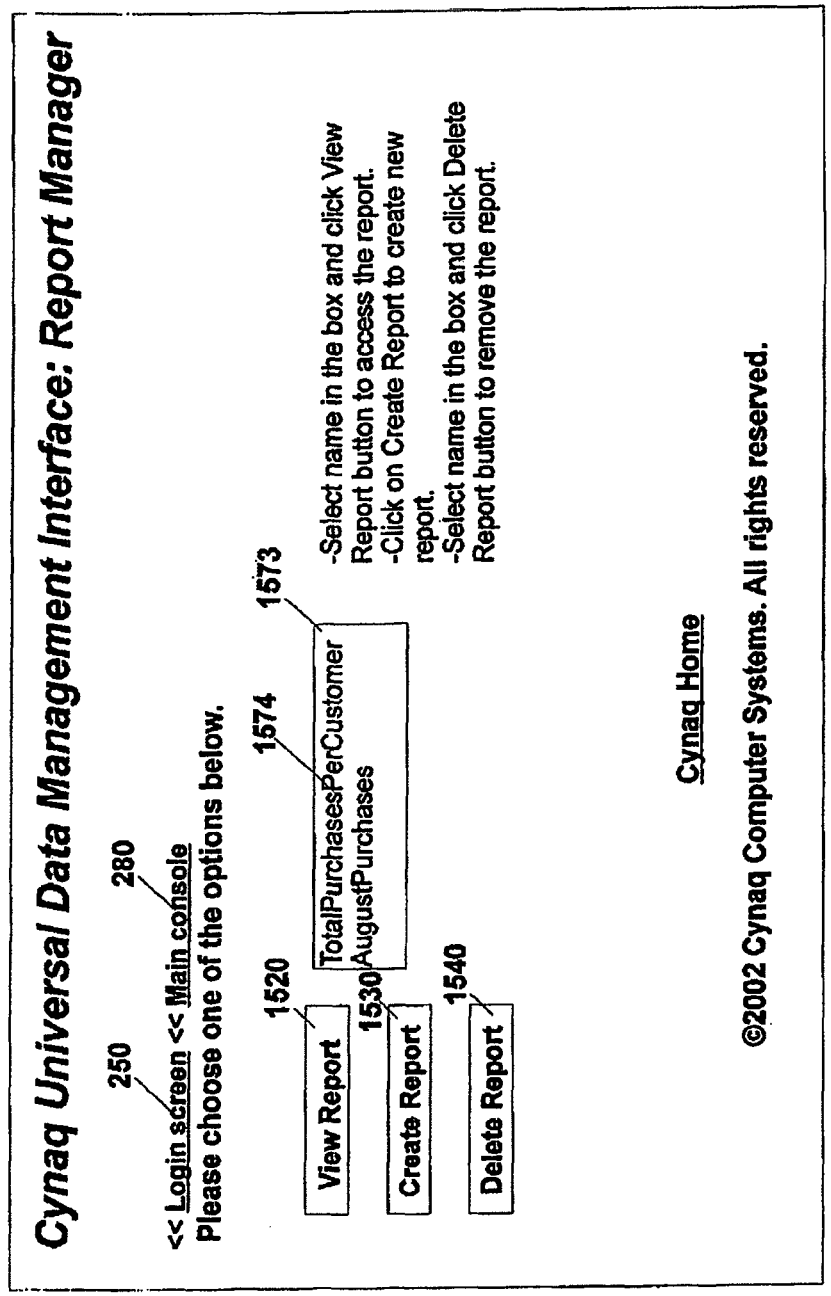
FIG. 25 (Report Manager's initial screen)

Cynaq Universal Data Management Interface: *Report Manager*

Report properties.

Report Title:

SalesPerCustomer — 1580

With how many columns would you like to start?

4 — 1590

Select tables to be used in your report:

Costs
Customer — 1600
Location
Purchase — 1610

Submit — 1620

Help

Cynaq Home

©2002 Cynaq Computer Systems. All rights reserved.

FIG. 26 (first step in report creation)

FIG. 27 (second step in report creation)

Cynaq Universal Data Management Interface: Report Manager

Advanced properties.

Modify SQL statement for advanced customization of your report or click on Submit to generate your report.

Select [Customer].[FName] as 'First Name', [Customer].[LName] as 'Last Name', [Purchase] —1710

From [Customer], [Purchase] —1720

Where [Purchase].[Date] > '2000-07-23' and [Purchase].[Date] < '2002-07-23' and [Purchase] —1730

Group By [Customer].[FName] —1740

Submit —1750

Help

Cynaq Home

©2002 Cynaq Computer Systems. All rights reserved.

FIG. 28 (third step in report creation)

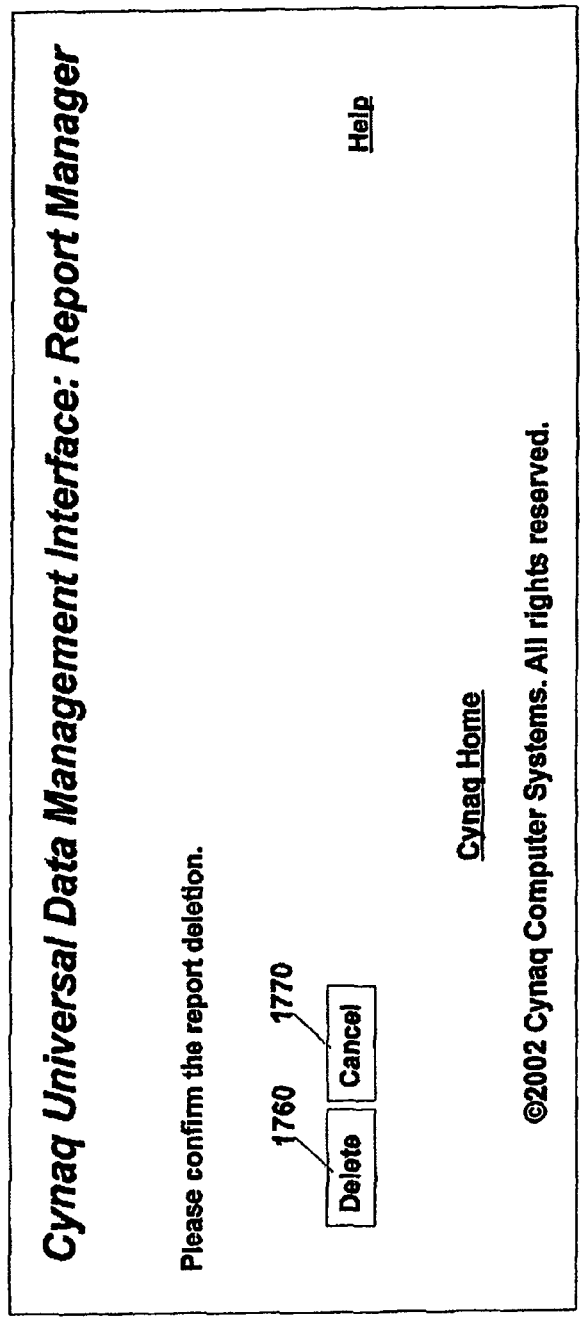
FIG. 29 (report deletion confirmation)

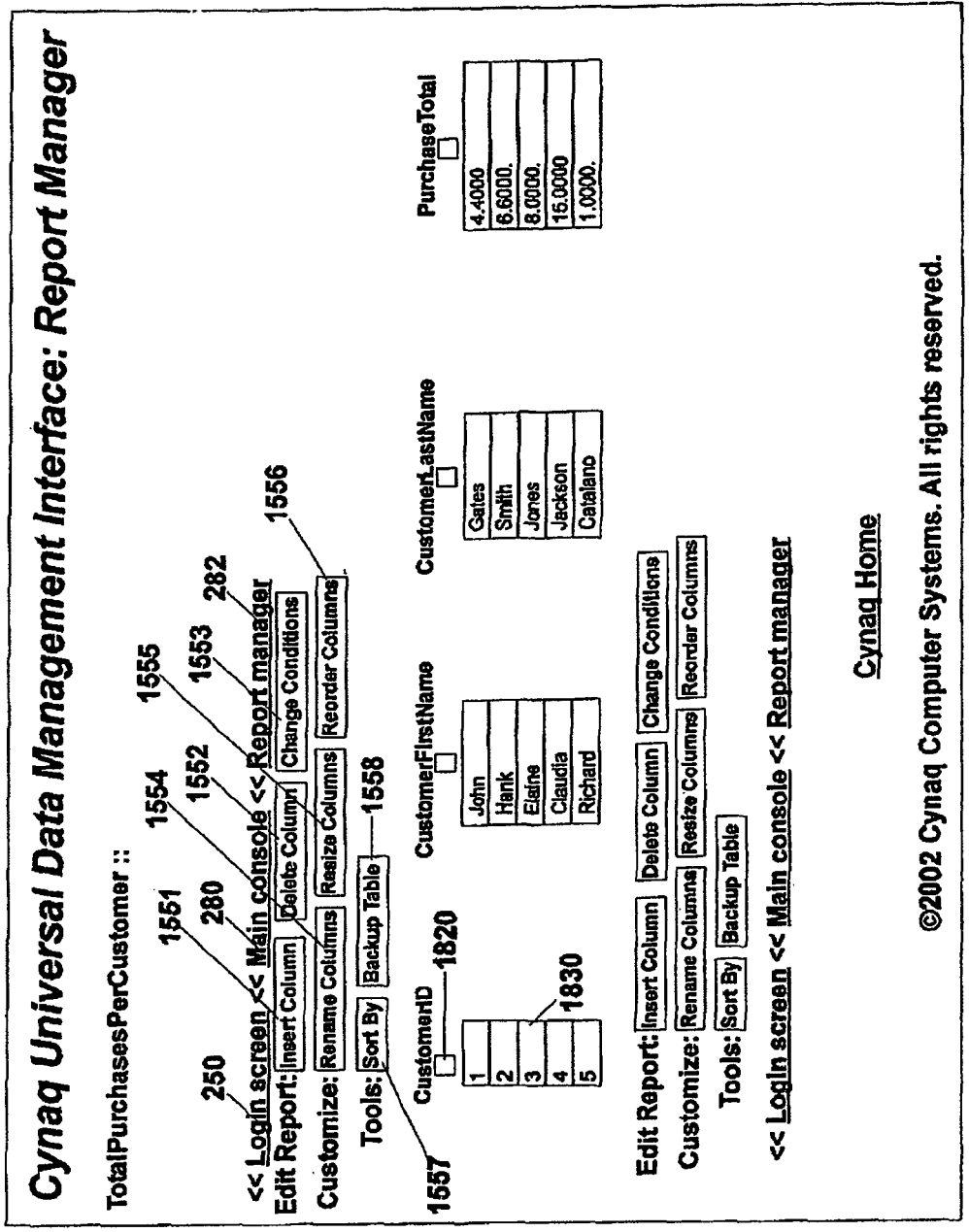
FIG. 30 (Report Manager's end-data screen)

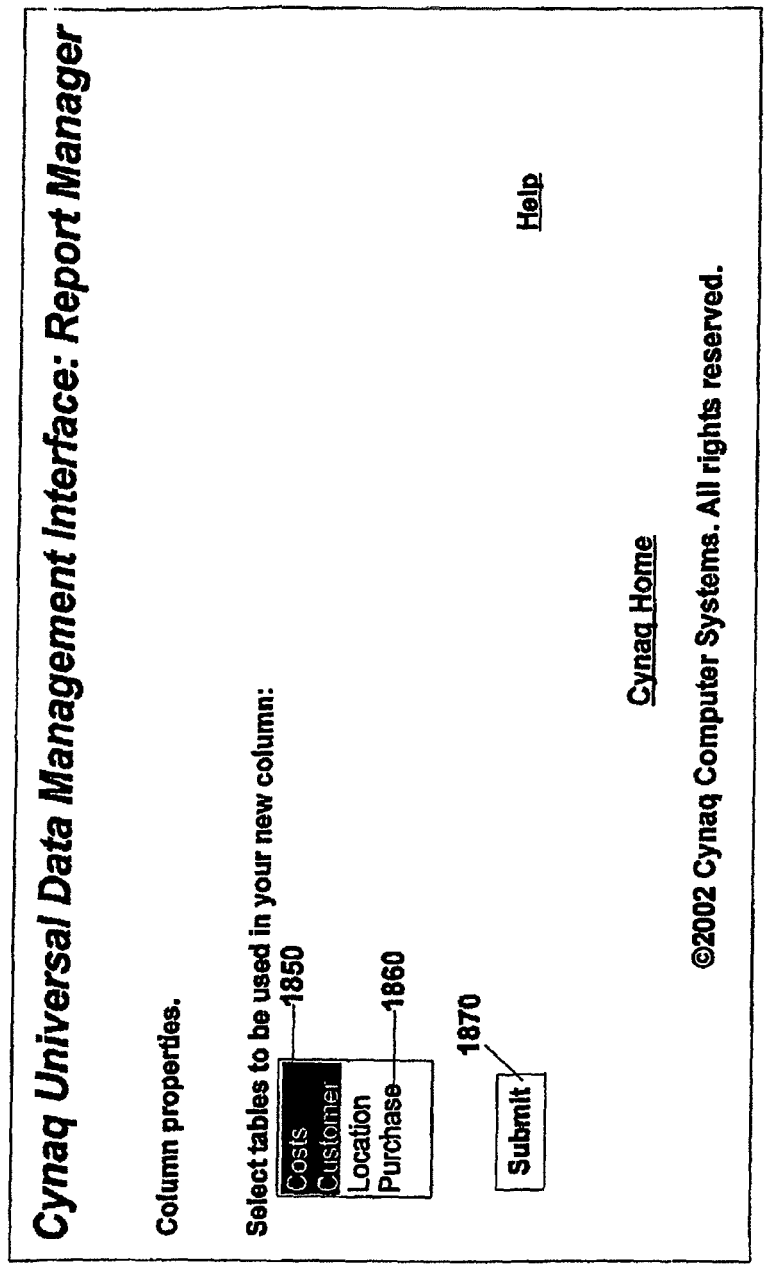
FIG. 31 (Report Manager's first step in column insertion)

Cynaq Universal Data Management Interface: Report Manager

Column properties.

For new column specify its name by changing "COLUMN NAME" text field, and define columns and functions to compute its value.

Column_1: CostOfSales  [Function ▶]  [Costs.UnitCost ▶]  [MULT ▶]  [Purchase.AmountSold ▶]  [Function ▶]  [Table.column ▶]
                          1630          1640                1650

Choose column by which to group your data.
Group by: [Table.column selection ▶] — 1690

[Submit]
1890

Cynaq Home

©2002 Cynaq Computer Systems. All rights reserved.

FIG. 32 (Report Manager's second step in column insertion)

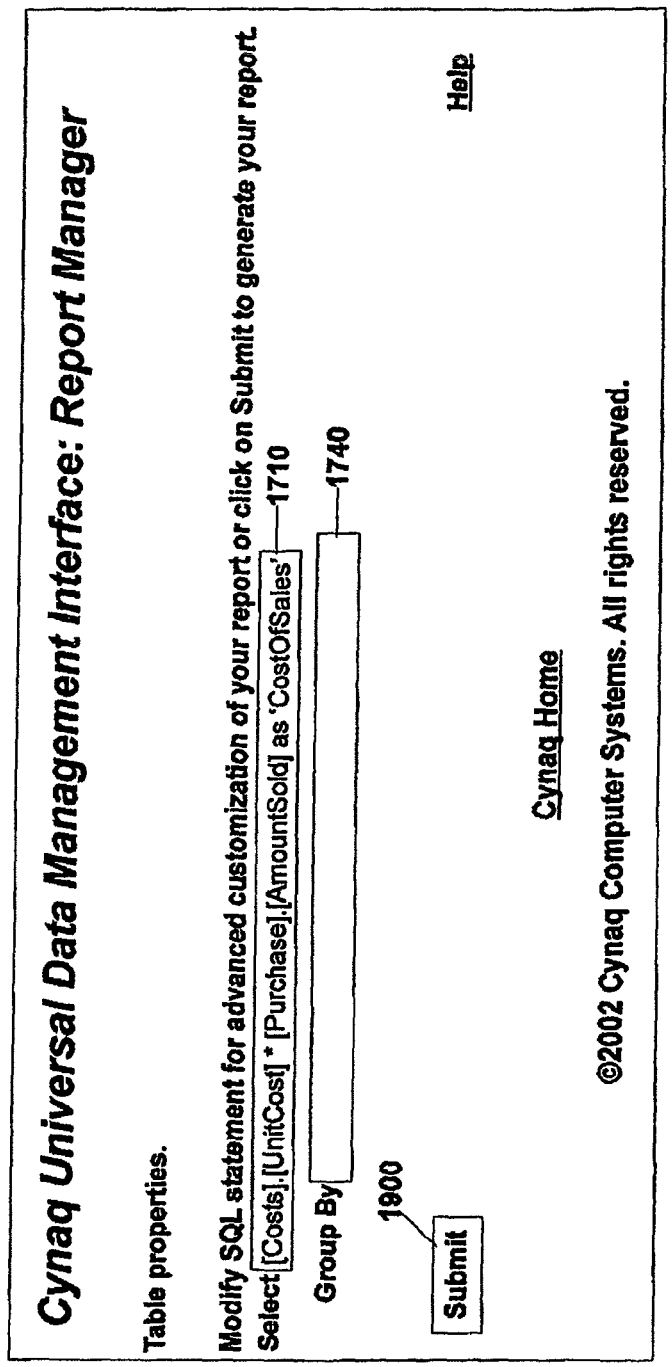
FIG. 33 (Report Manager's third step in column insertion)

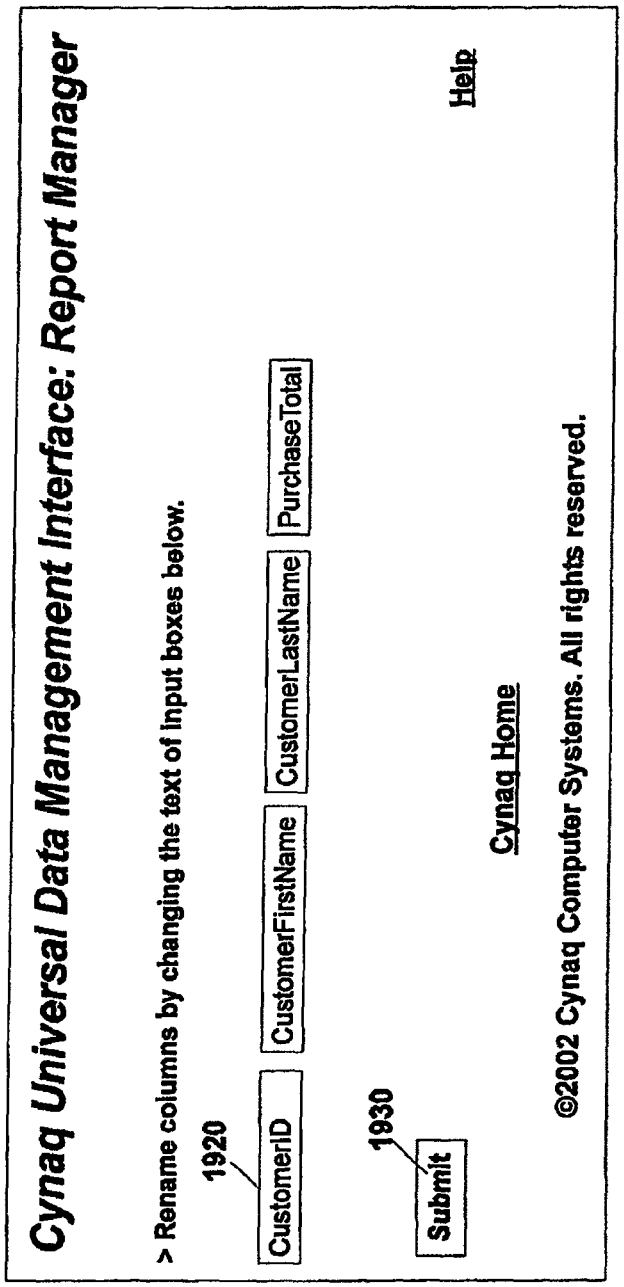
FIG. 34 (Report Manager's rename columns screen)

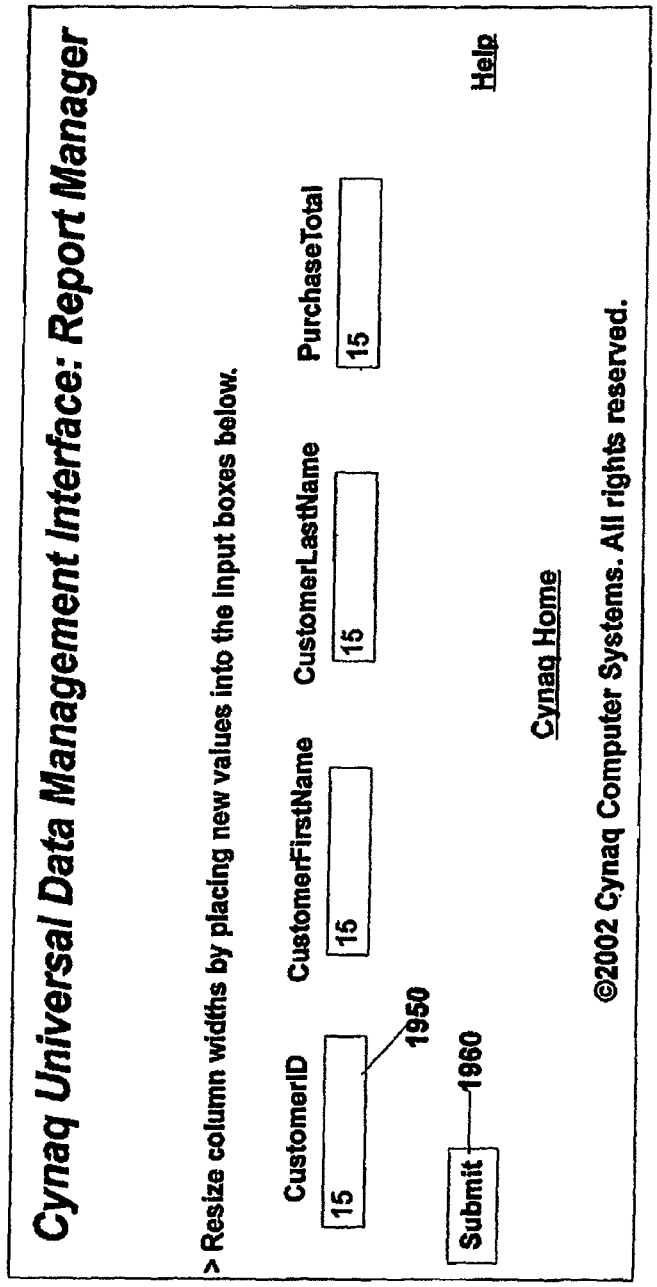
FIG. 35 (Report Manager's resize columns screen)

*Cynaq Universal Data Management Interface: Report Manager*

Help

> Reorder columns by changing their order numbers below.

CustomerID    CustomerFirstName    CustomerLastName    PurchaseTotal

[1▶]—1980      [2▶]                 [3▶]                [4▶]
               1
               2
               3
               4
               5

[Submit]—1990

Cynaq Home

©2002 Cynaq Computer Systems. All rights reserved.

FIG. 36 (Report Manager's reorder columns screen)

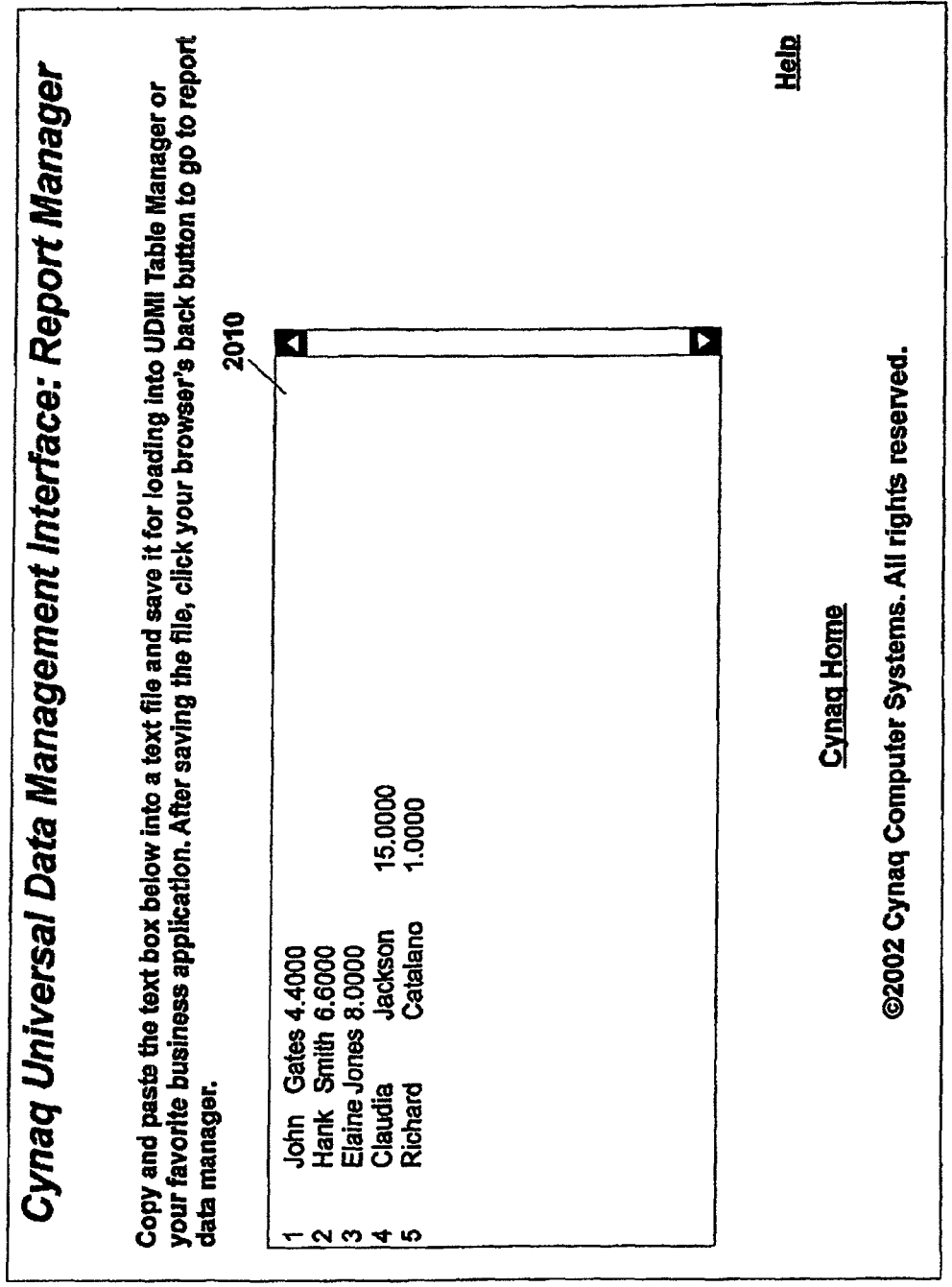
FIG. 37 (Report Manager's backup table screen)

Cynaq Universal Data Management Interface: Report Manager

Help

Output Conditions. 1660 1670 1680

Change conditions by modifying input boxes below.

Condition_1: | Purchase.Date ▶ | GREATER THAN ▶ | 2002-06-01
Condition_2: | Purchase.Date ▶ | LESS THAN ▶ | 2002-07-01
Condition_3: | Table.column selection ▶ | Function ▶ | VALUE Choose column by which to group your data.

Group by: | Customer.CustomerID ▶ | — 1690
| Table.column selection |
| Customer.CustomerID |
| Customer.LName |
| Customer.FName |
| Customer.Address1 |
| Customer.Address2 |
| Purchase.AmountSold |

2030 — Submit

Cynaq Home

©2002 Cynaq Computer Systems. All rights reserved.

FIG. 38 (Report Manager's first step in changing conditions in a report)

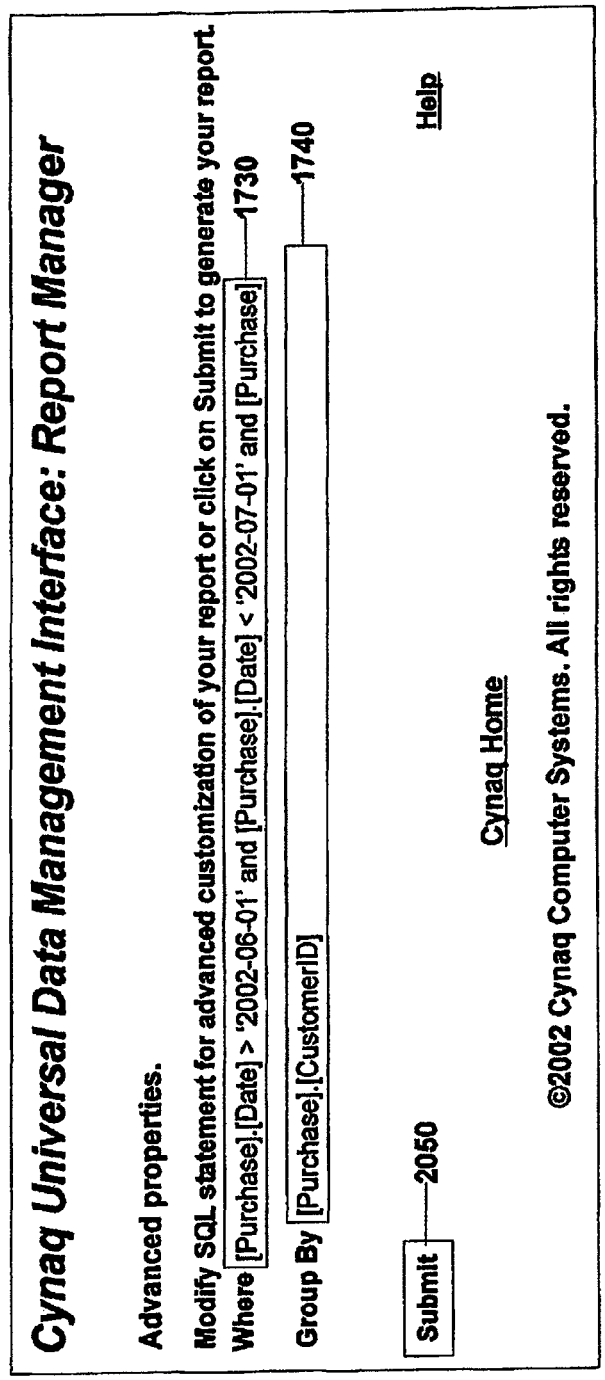
FIG. 39 (Report Manager's second step in changing conditions in a report)

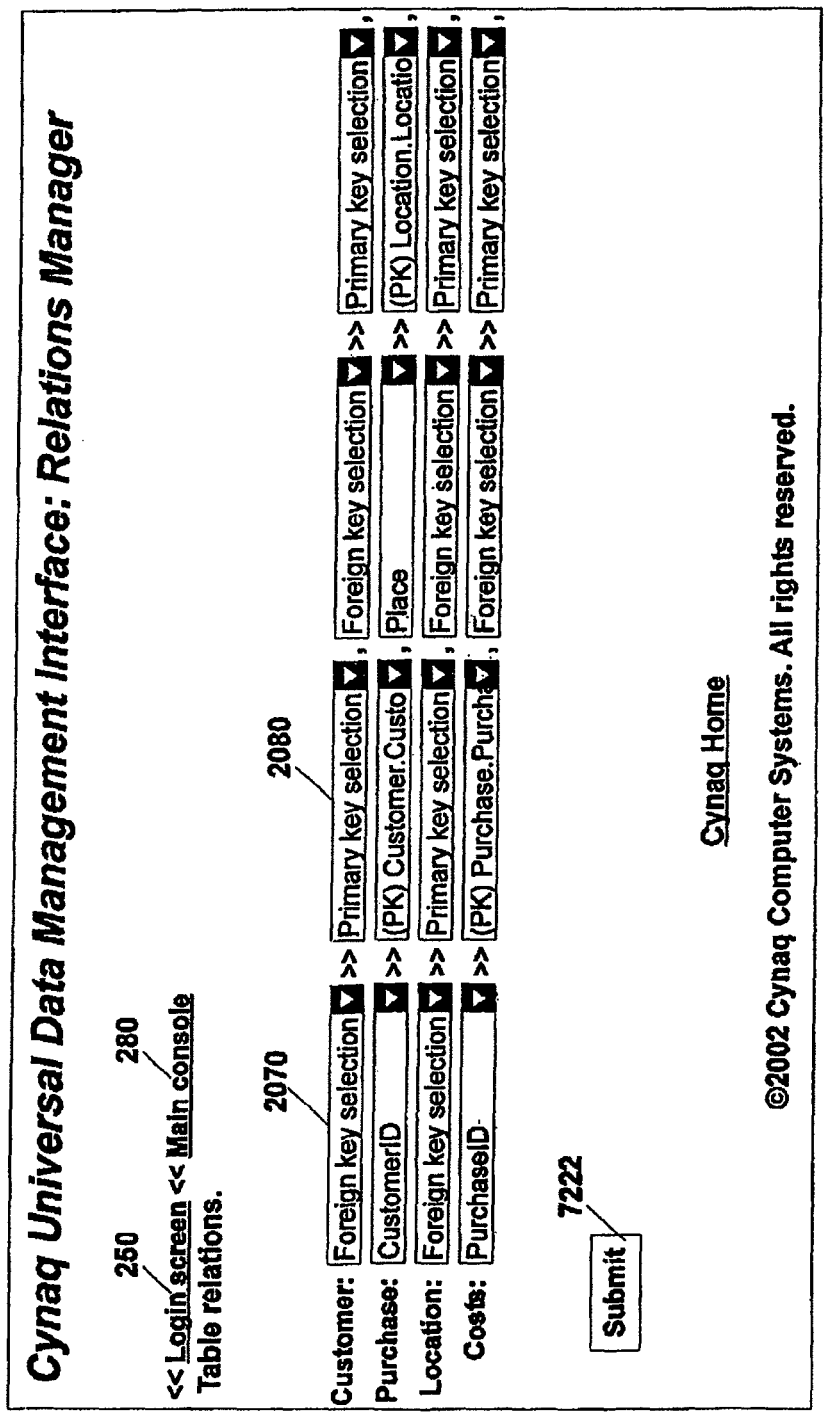
FIG. 40 (Relations Manager screen)

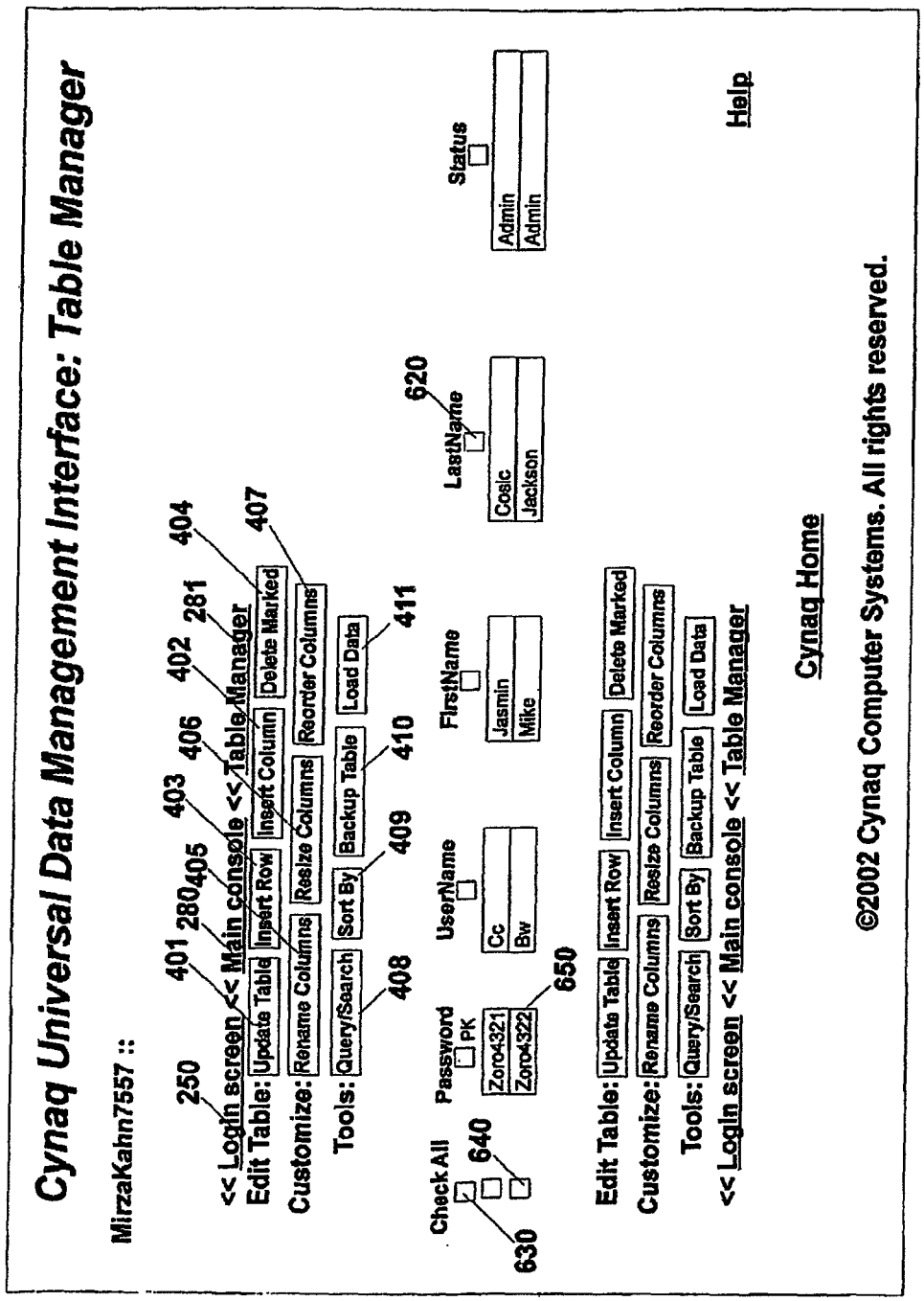
FIG. 41 (Security Table)

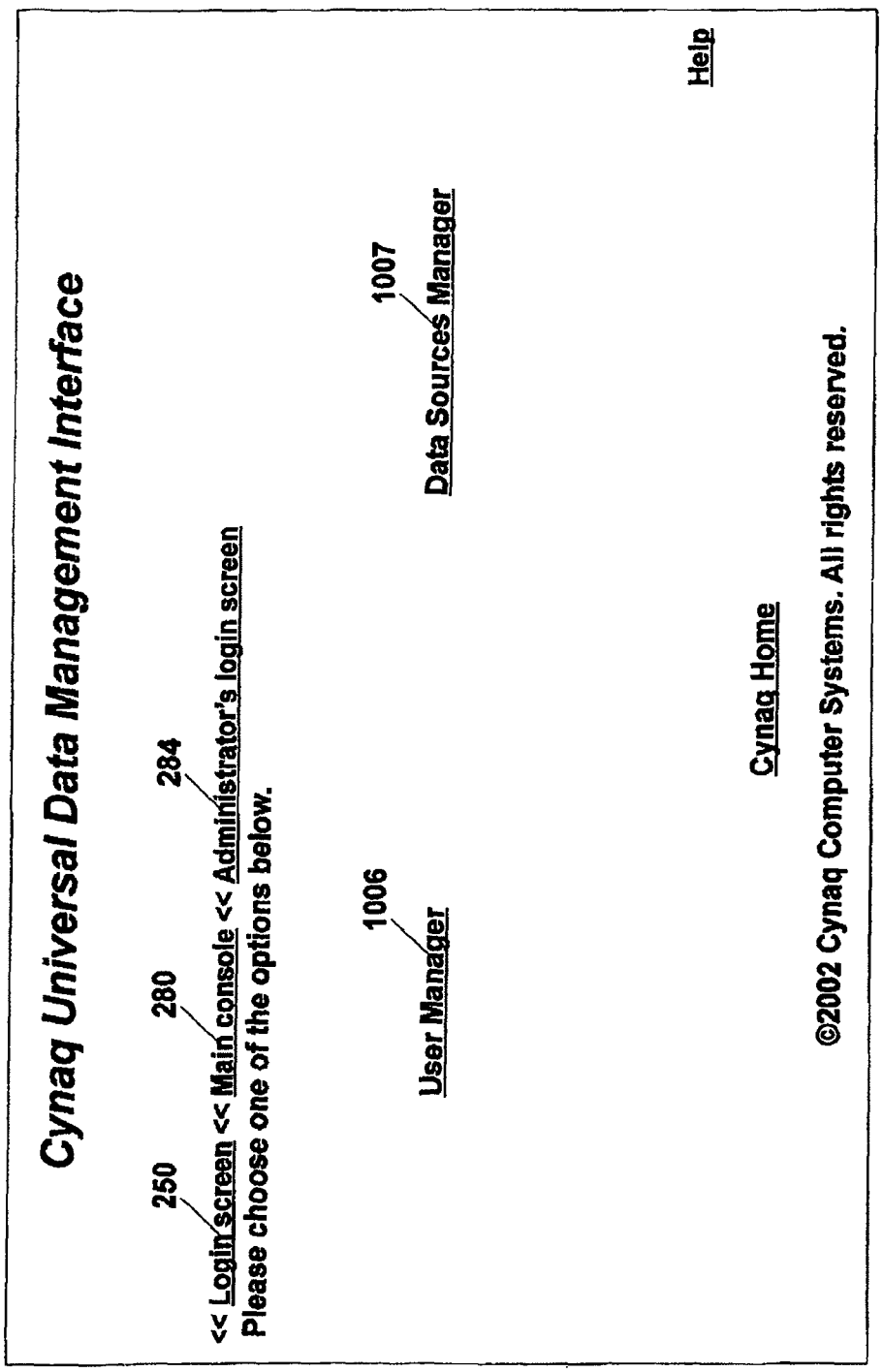
FIG. 41A (Administrator's Area initial screen)

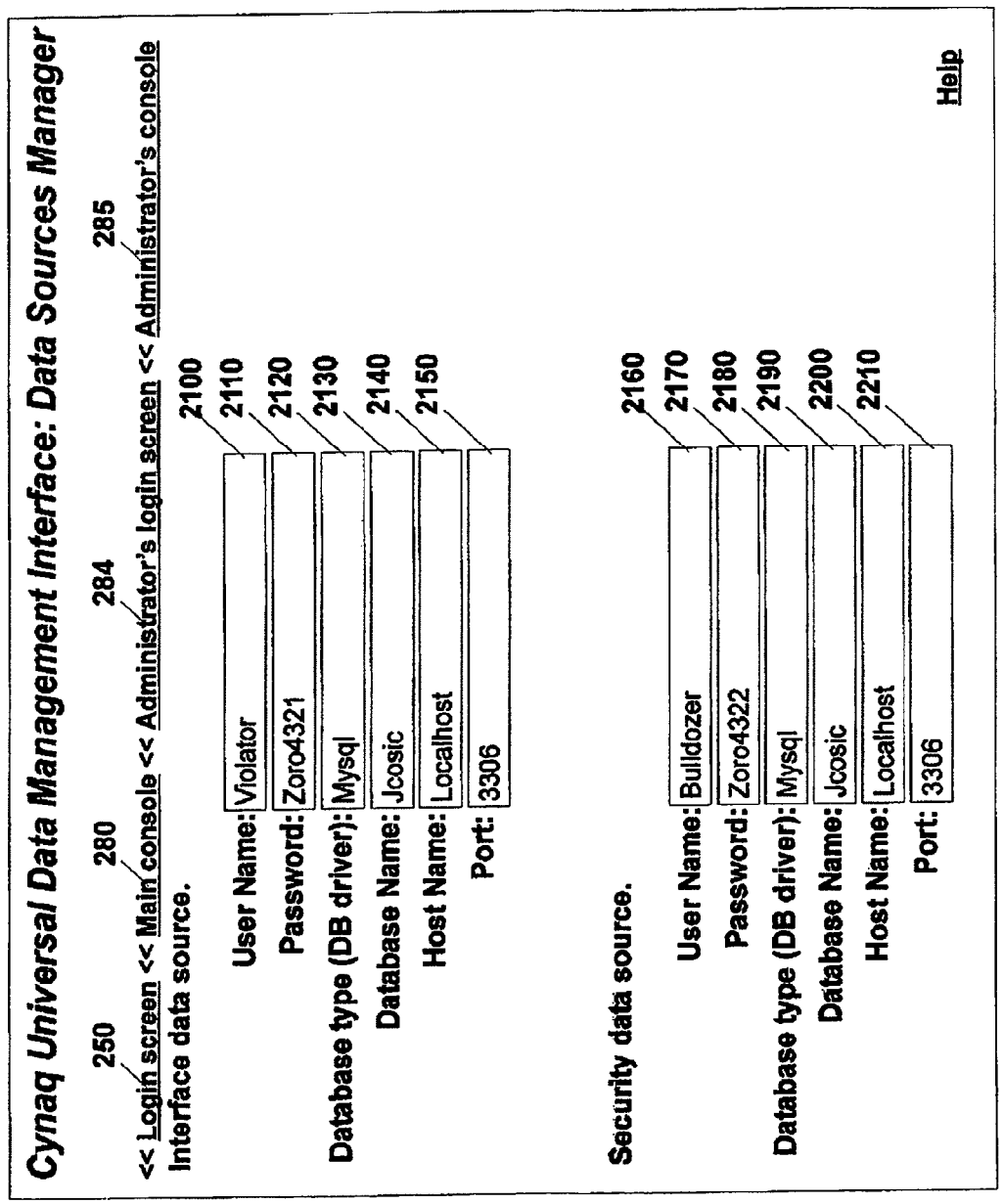
FIG. 42 (Data Sources Manager)

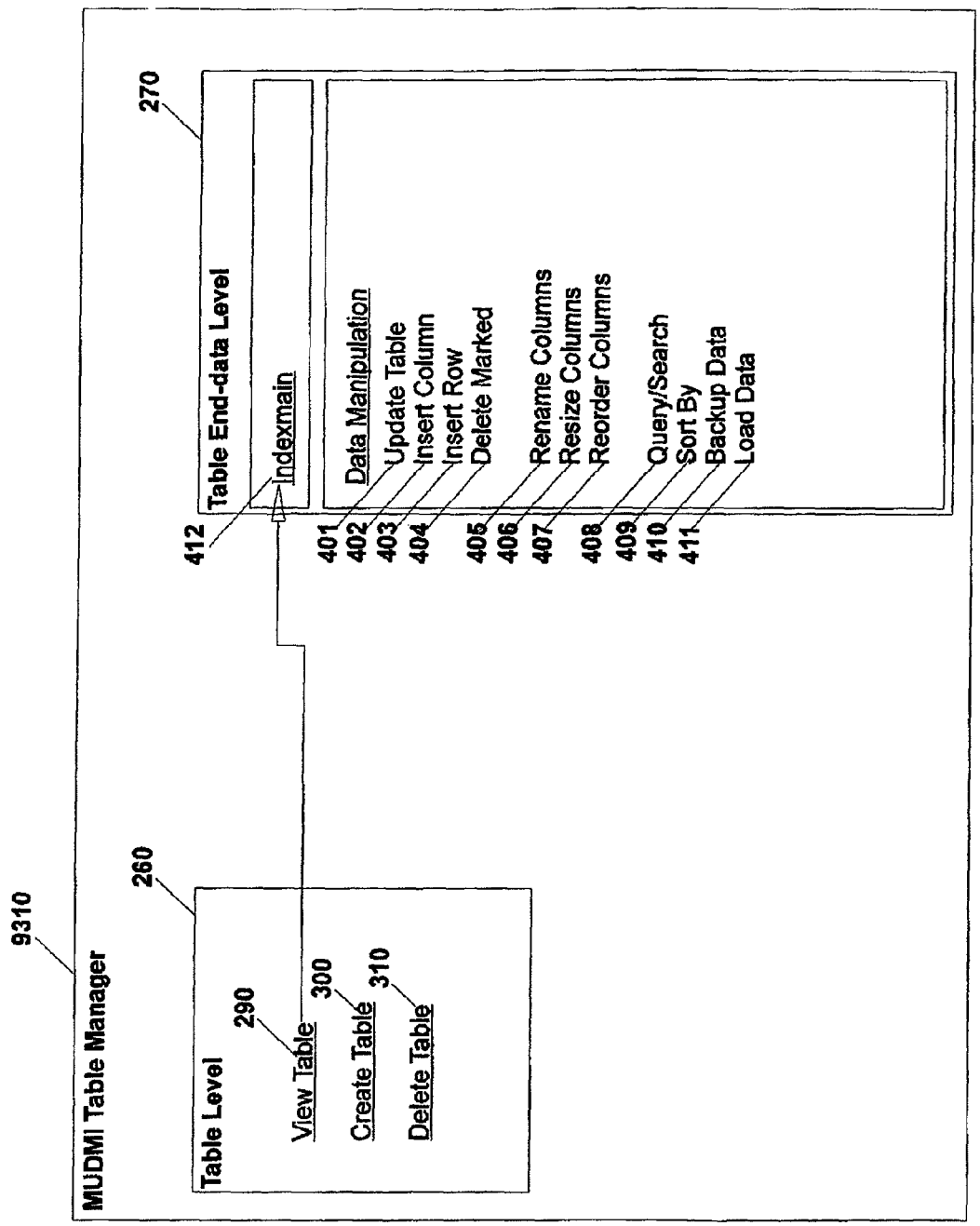
FIG. 43 (Multiple-database Within One Database UDMI logical chart)

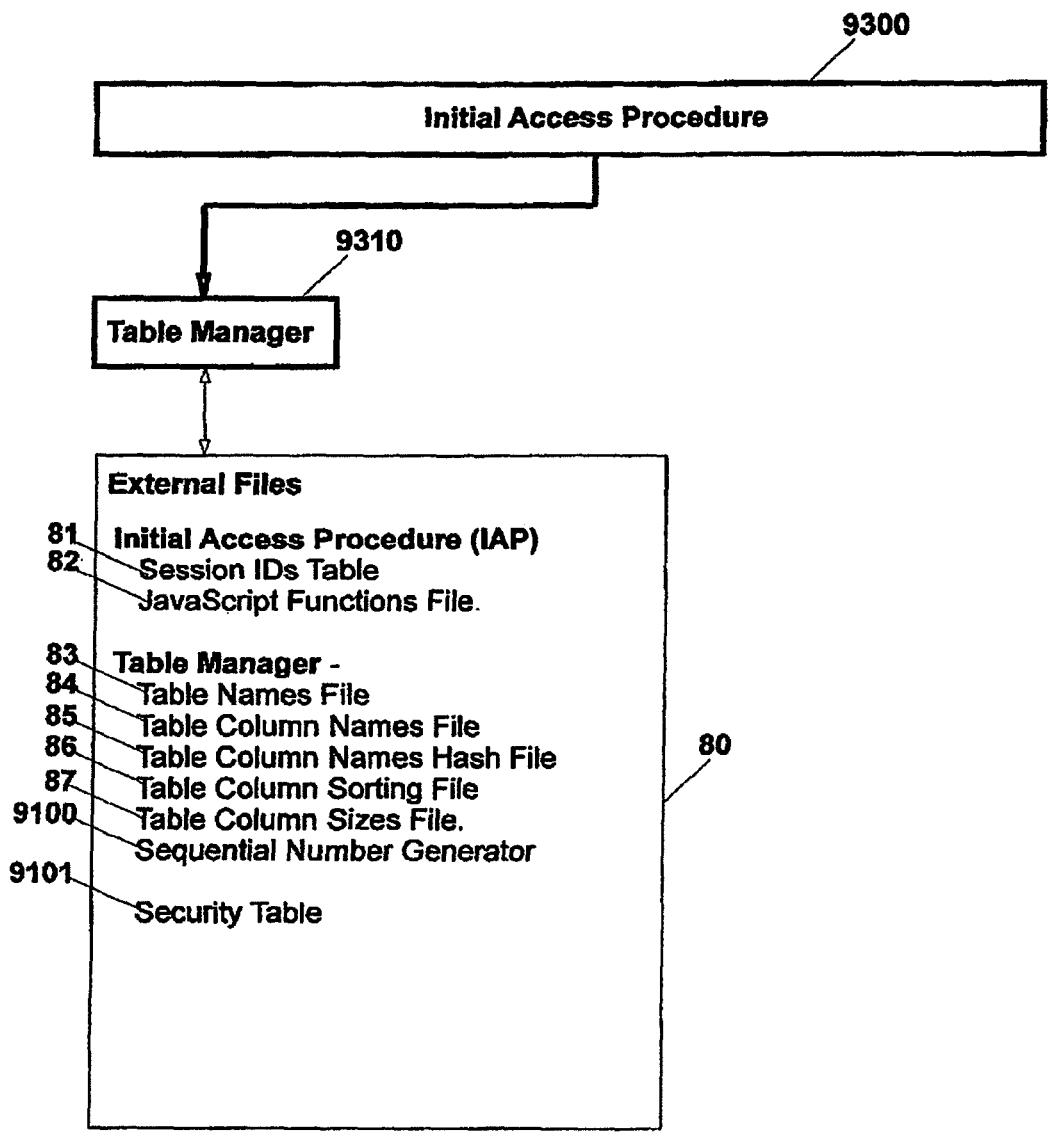
FIG. 43A (MUDMI's logical structure)

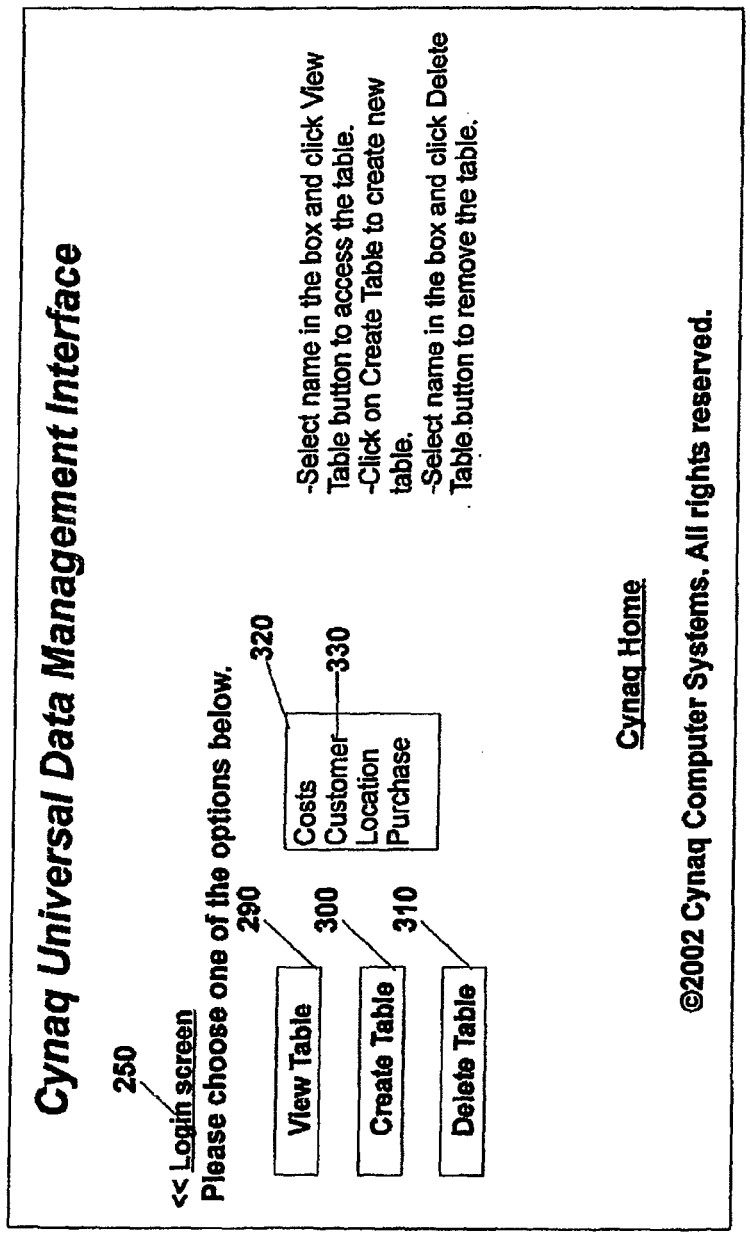
FIG. 44 (MUDMI's table mode)

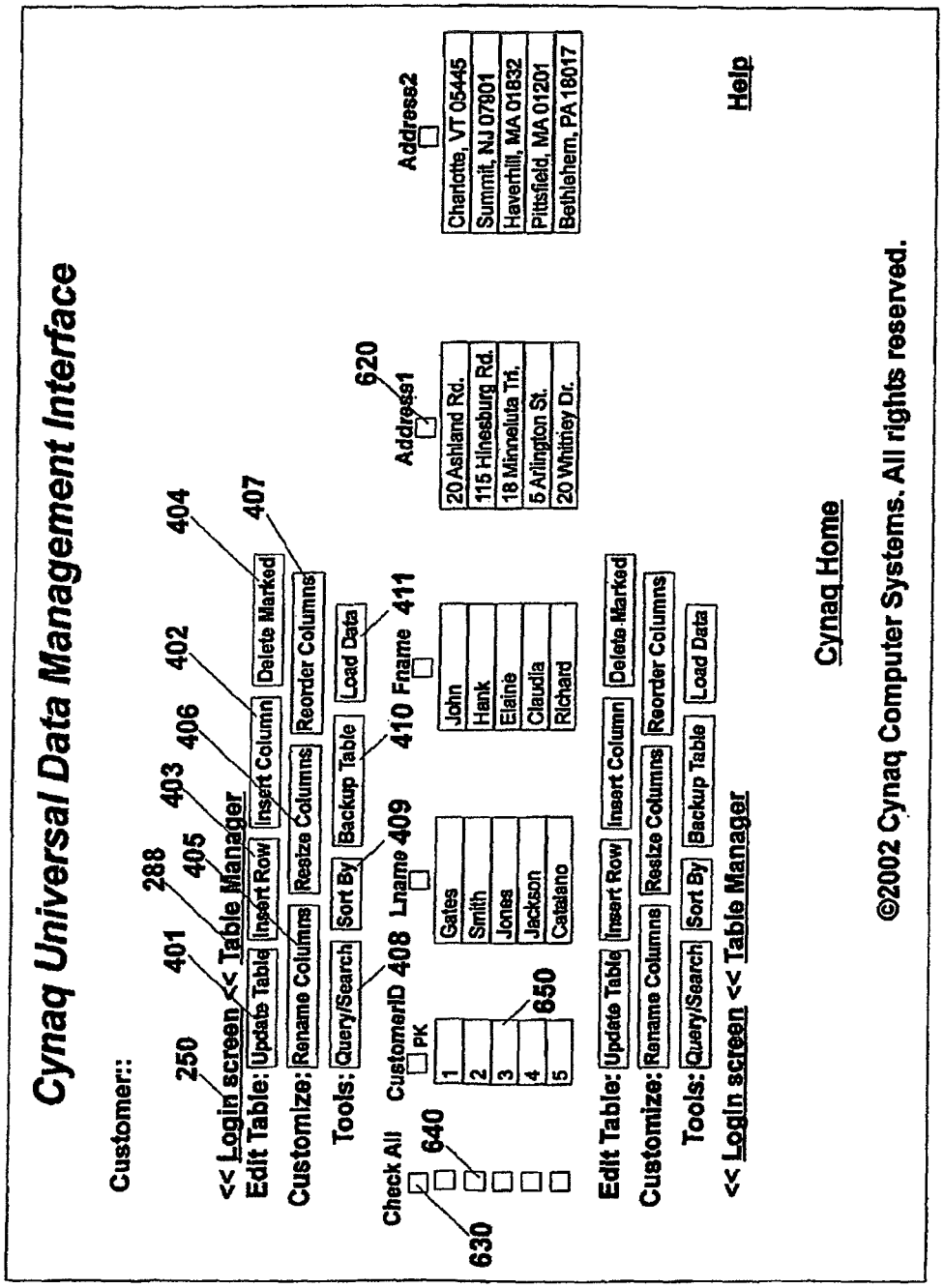
FIG. 45 (MUDMI's end-data mode)

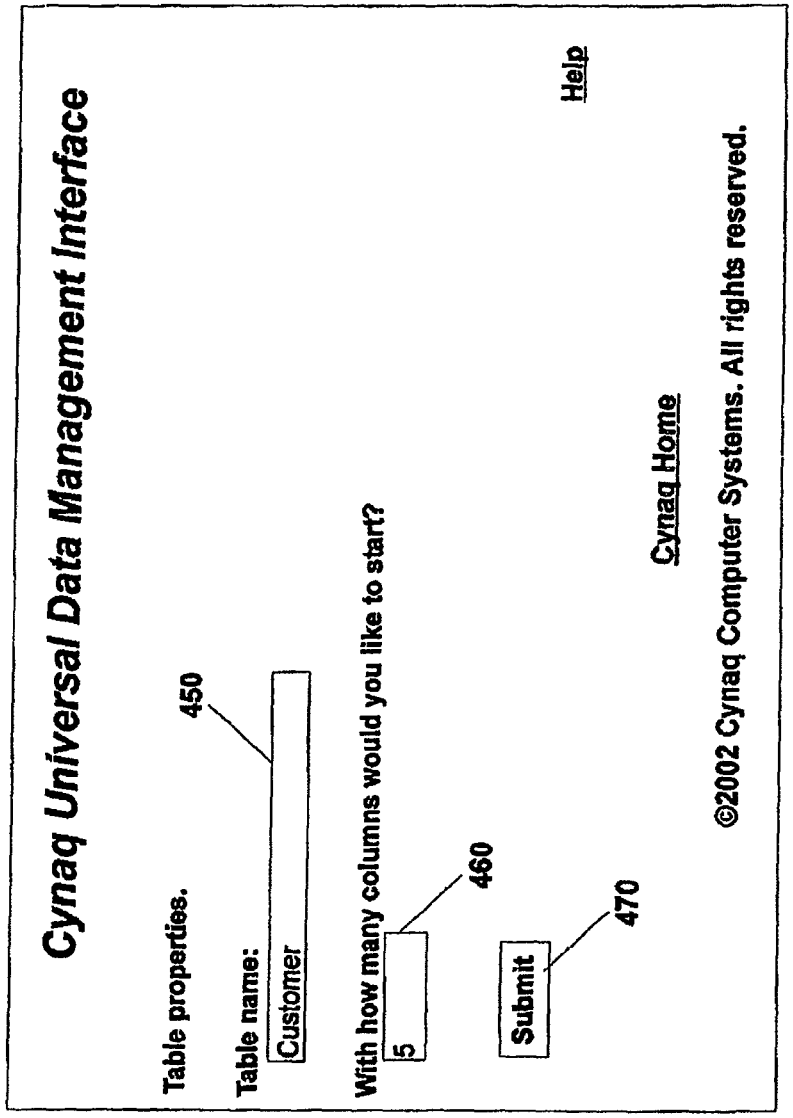
FIG. 46 (MUDMI's first step in table creation)

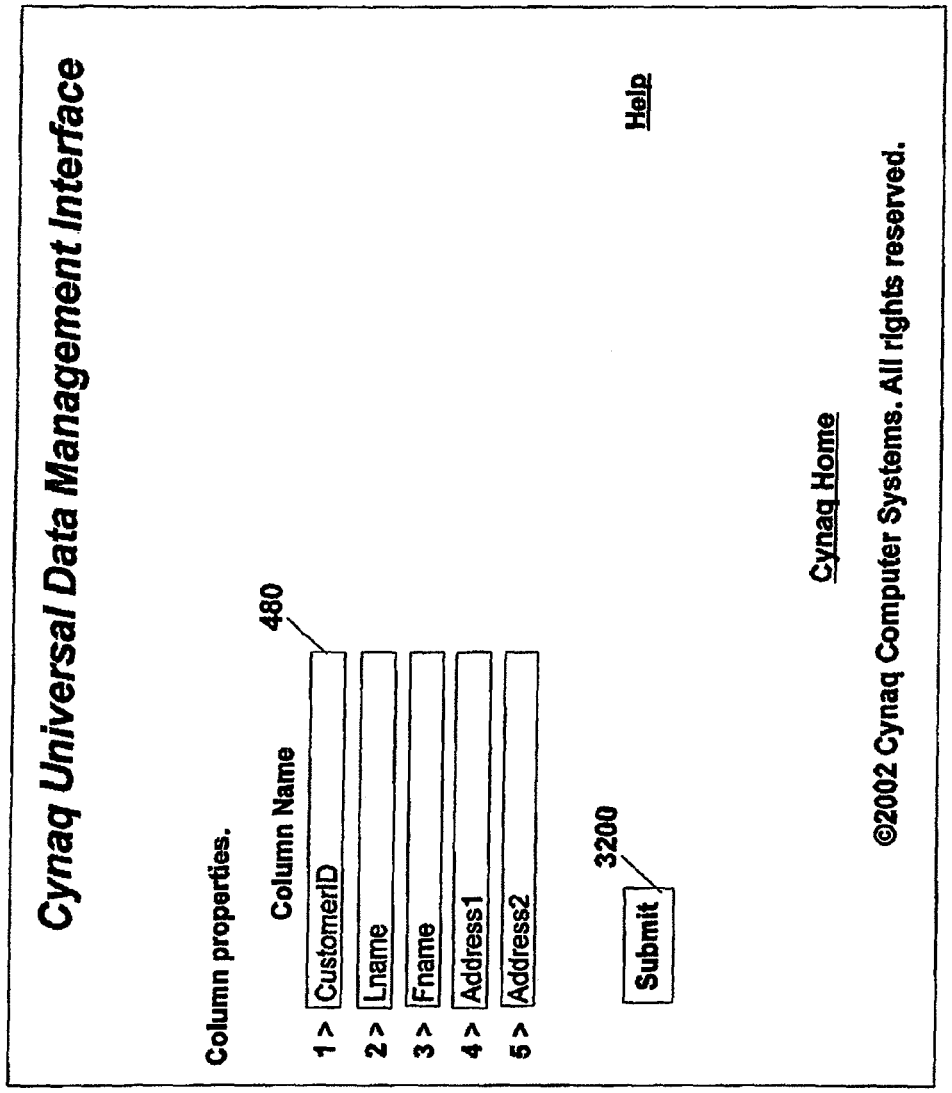
FIG. 47 (MUDMI's second step in table creation)

FIG. 48 (MUDMI's insert column screen)

Cynaq Universal Data Management Interface

Registration
Required Fields *

*User Name: Mike — 30001
*Password (eight characters): ******** — 30002
*Reenter Password: ******** — 30003

*First Name: Michael — 30004
*Last Name: Jackson — 30005
Company: MPP — 30006

[Submit] — 30007

Cynaq Home

©2002 Cynaq Computer Systems. All rights reserved.

FIG. 49 (MUDMI's sign-up screen)

UNIVERSAL DATA MANAGEMENT INTERFACE

CROSS-REFERENCE TO RELATED APPLICATION

The present invention is a continuation of U.S. application Ser. No. 11,072,030, filed Mar. 4, 2005, which is a continuation of U.S. application Ser. No. 10/217,937, filed on Aug. 12, 2002, now U.S. Pat. No. 7,117,225, which claims priority from U.S. Provisional Application No. 60/311,863, filed Aug. 13, 2001, the contents of which are hereby incorporated by reference into this application as if set forth herein in full.

TECHNICAL FIELD

The present invention relates to a client-server application that allows network users to manage data in any standard Database Management System (DBMS) through a visual interface that does not require special software installed on the user's computing or communication device.

BACKGROUND

DBMS is a common method of storing, organizing, and manipulating data.

DBMS can provide a reliable and transparent way for people to store large amounts of data. Although, DBMS makes it easier to store, manage, and manipulate low-level data (binary data), DBMS is still too complex to operate for an average user.

Many database administrators and software professionals use character-driven data interfaces. These interfaces provide freedom and power in data management and manipulation. However, these interfaces do not provide a transparent, human-friendly interaction with data. This is one reason for the use of visual interfaces that non-software professionals, computing devices, and communication devices can understand and interpret.

There are several problems associated with conventional visual interfaces. For example, access to data is limited to interfaces that are accessed through specialized software that needs to be installed on the user's computing or communication device. This implies that users can access their data only through devices that include this specialized software. Specialized software is any software that is not pre-installed on a standard computing or communication device. For example, a web browser such as Netscape Navigator or Microsoft Internet Explorer, or any software pre-installed ("usually comes with") on a Personal Digital Assistant (PDA), mobile device (e.g., cell phone), or any other computing or communication device is not considered to be specialized software. On the other hand, Crystal Reports is a report generating software that does not come pre-installed with most computers; therefore, it is considered to be specialized software.

DBMSs produced by competing companies are generally incompatible. Although, most DBMSs use a standard Structured Query Language (SQL) to manage data, internal organization of different DBMSs differ considerably. Furthermore, multiple dialects of SQL are introduced when operating different DBMSs.

In an environment where access to data is restricted to specialized software, and where DBMS incompatibilities are an every day reality, there is a need for a network service that allows network users to manage and manipulate data in the background DBMS transparently by subscribing to the service through any computing or communication device connected to the network.

SUMMARY

In general, in one aspect, the invention is directed to storing information relating to a database in an external file. The information includes instructions, parameters, and tables that facilitate access to different types of databases. This aspect also includes accessing the database using the information, and may include one or more of the features set forth below.

Accessing the database may be performed using a database management language. This aspect may include establishing a link to the database, obtaining the information via the link, synchronizing with the data structure of the database, and/or managing and manipulating data in the database following accessing.

The database may be accessed via software that operates over a network. The database may include multiple databases and accessing may include accessing one or more of the multiple databases. The external files may include a file that stores network location and access information of the database, a file that stores at least one of names and columns of tables in the database, a table containing session identifier information for identifying a session in which the database is accessed, a file that stores information for use in sorting data from the database, a file that stores sizes of columns in the database, a file that stores information relating to relationships among tables in the database, a file for storing security information to limit access to the database, a file that stores network location and access information that contains security information, a table located in a remote database, a file containing instructions that are executable by software that accesses the database, a file that stores at least one of names and columns of reports in the database, a file that stores pre-parsed instructions and parameters used for report generation, and/or a file that stores sizes of columns of a report.

This invention may also include generating a graphical user interface and managing data in the database via the graphical user interface.

In general, in another aspect, the invention is directed to a universal data management interface (UDMI) system. This aspect includes a processing system that executes instructions to generate a visual interface through which a user can access, manage, and manipulate data on plural different types of remote databases.

This aspect may also include one or more of the following features. The visual interface may be executed and interpreted by software that interprets a markup. The markup may include one or more of HTML, DHTML, SGML, XML or any other standard markup language.

In general, in one aspect, the invention is directed to a UDMI that includes a processing system that executes instructions to connect to multiple standard database management systems and to allow multiple users to access, manage, and manipulate data within each of the multiple standard database management systems.

This aspect may include one or more of the following features. The multiple standard database management systems includes one or more of Oracle, MSSQL Server, SyBase, Informix, DB2, dBase, mSQL, mySQL and any other standard database management system (e.g., oracle, Sybase, etc. are DBMSystems).

In general, in another aspect, the invention is a UDMI that includes a processing system that executes instructions to allow multiple virtual databases that reside in a single database to be available as a network service. This aspect may include one or more of the following features.

The processing system may use a table management process to allow the multiple virtual databases to be available. The processing system may use an external file containing table domains to allow the multiple virtual databases to be available. The processing system may use a table that stores information on users enrolled to use the network data service. The processing system may use a sign-up process to allow users to sign-up over a network for the network data service.

Other features and advantages of the invention will become apparent from the following description, including the claims and drawings.

BRIEF DESCRIPTION OF THE DRAWINGS

FIG. 1A is a diagram showing a general DBMS database including n sample tables.

FIG. 1 is a block diagram showing general operation of the Universal Data Management Interface (UDMI) according to the present invention.

FIG. 2 is a block diagram showing the abstract structure of UDMI.

FIG. 3 is a block diagram of the UDMI Column Names Hash File interacting with the UDMI Column Names File.

FIG. 4 is a block diagram of the logical structure of UDMI and UDMI's four major functional areas.

FIG. 5 shows graphical user interface (GUI) form components used throughout UDMI's GUI output.

FIG. 6 is a GUI showing the Initial Access Procedure's login screen.

FIG. 7 is a GUI showing UDMI's four functional areas.

FIG. 8 is a block diagram of the Table Manager's two modes of operation.

FIG. 9 is a GUI showing the Initial Table Level screen with four tables defined.

FIG. 10 is a GUI showing the first step in table creation.

FIG. 11 is a GUI showing the second step in table creation.

FIG. 12 is a GUI showing the table deletion confirmation screen.

FIG. 13 is a GUI showing the table end-data level screen.

FIG. 14 is a GUI showing the Table Manager's insert row screen.

FIG. 15 is a GUI showing the Table Manager's insert column screen.

FIG. 16 is an example of checking/marking rows and columns.

FIG. 17 is a GUI showing the Table Manager delete marked confirmation screen.

FIG. 18 is a GUI showing the query/search screen.

FIG. 19 is a GUI showing the Table Manager's rename columns screen.

FIG. 20 is a GUI showing the Table Manager's resize columns screen.

FIG. 21 is a GUI showing the Table Manager's reorder columns screen.

FIG. 22 is a GUI showing the Table Manager's backup table screen.

FIG. 23 is a GUI showing the Table Manager's load data screen.

FIG. 24 is a block diagram of the Report Manager's two modes of operation.

FIG. 25 is a GUI showing the Report Manager's initial screen.

FIG. 26 is a GUI showing the first step in report creation.

FIG. 27 is a GUI showing the second step in report creation.

FIG. 28 is a GUI showing the third step in report creation.

FIG. 29 is a GUI showing the report deletion confirmation screen.

FIG. 30 is a GUI showing the Report Manager's end-data screen.

FIG. 31 is a GUI showing the Report Manager's first step in column insertion.

FIG. 32 is a GUI showing the Report Manager's second step in column insertion.

FIG. 33 is a GUI showing the Report Manager's third step in column insertion.

FIG. 34 is a GUI showing the Report Manager's rename columns screen.

FIG. 35 is a GUI showing the Report Manager's resize columns screen.

FIG. 36 is a GUI showing the Report Manager's reorder columns screen.

FIG. 37 is a GUI showing the Report Manager's backup table screen.

FIG. 38 is a GUI showing the Report Manager's first step in changing conditions in a report.

FIG. 39 is a GUI showing the Report Manager's second step in changing conditions in a report.

FIG. 40 is a GUI showing the Relations Manager screen.

FIG. 41A is a GUI showing the Administrator's Area with two functional areas: User Manager and Data Source Manager.

FIG. 41 is a GUI showing the Security Table.

FIG. 42 is a GUI showing the Data Sources Manager.

FIG. 43A is a block diagram of the Multiple-database Within One Database UDMI (MUDMI) logical structure.

FIG. 43 is a block diagram of MUDMI's Table Manager.

FIG. 44 is a GUI showing MUDMI's table mode.

FIG. 45 is a GUI showing MUDMI's end-data mode.

FIG. 46 is a GUI showing MUDMI's first step in table creation.

FIG. 47 is a GUI showing MUDMI's second step in table creation.

FIG. 48 is a GUI showing MUDMI's insert column screen.

FIG. 49 is a GUI showing MUDMI's sign-up screen.

Like reference numerals in different figures indicate like elements.

DESCRIPTION

Database Management System is defined herein as a hardware component, software, or any data source that hosts, manages, and manipulates data organized in tables.

Device is defined herein as any hardware component or software that is able to connect to any other hardware component or software.

Computing device/software is defined herein as any hardware component or software that can perform computation of any kind with or without involvement of any other hardware component or software.

Communication device/software is defined herein as any hardware component or software that can exchange signals of any kind with another hardware component or software with or without involvement of any other hardware component or software.

Universal Data Management Interface (UDMI) is a software application for performing data manipulation and management. As such, UDMI provides network users with a tool for connecting to a DBMS that resides on a device connected to the network. UDMI connects to all standard DBMSs (Oracle, MS SQL Server, SyBase, Informix, mSQL, mySQL, and other database management systems) and allows multiple users to access, manage, and manipulate data within a DBMS database.

Figure 1A:
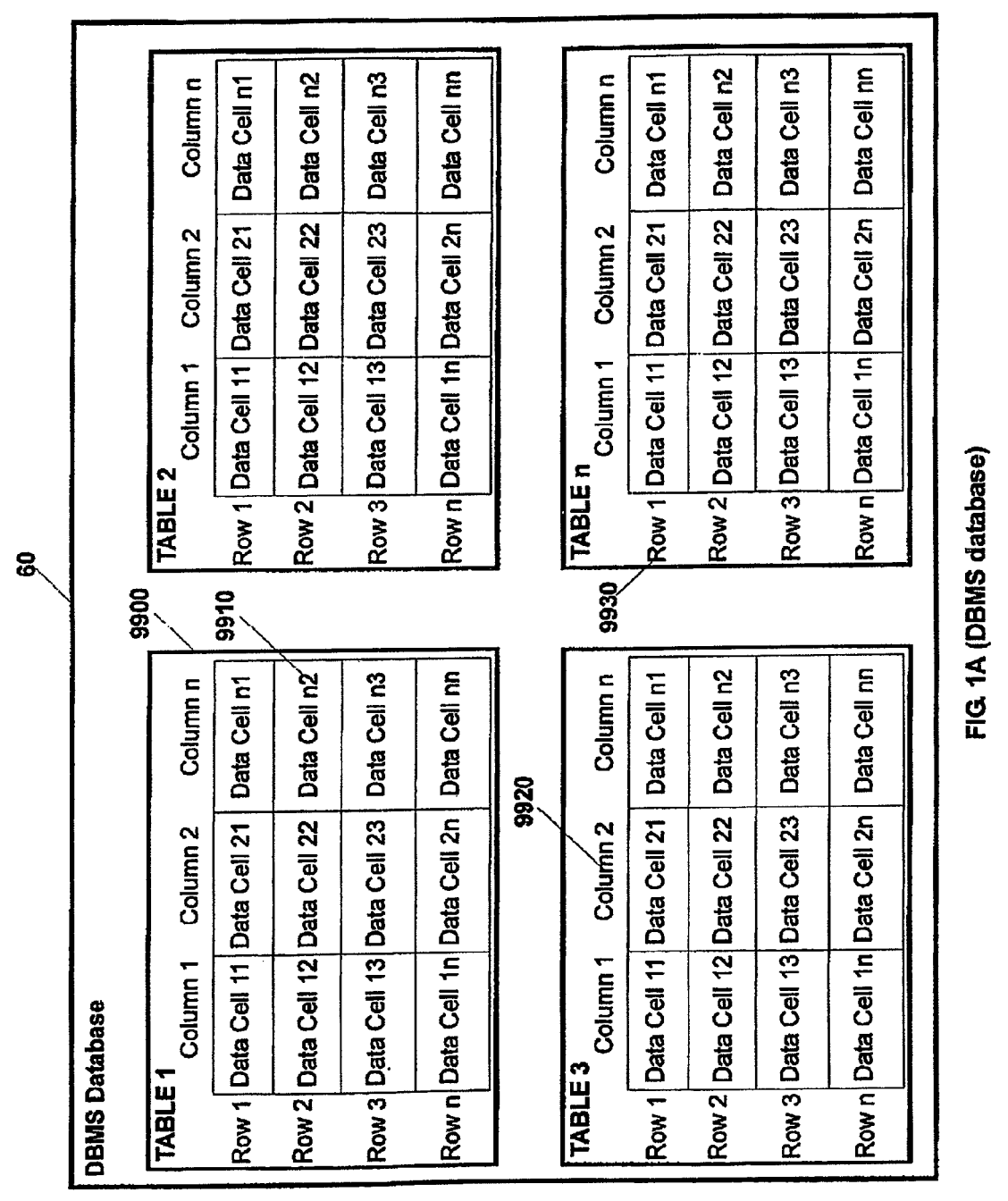

As shown in FIG. 1, a user 10 connects to the network 30 through a local system 20 that includes a computing or communication device/software. The network 30 contains UDMI 100 (UDMI), through which the user 10 connects to, accesses, and manages/manipulates DBMS 50, as described in more detail below.

Once a user is connected to DBMS using UDMI, the user can place, modify, delete, search, and sort data; generate reports from data; define and modify relations among the data tables; define and modify data sources; and add, delete, and modify users and their access privileges. Users accomplish the above-mentioned tasks within DBMS through the visual interface, i.e., the graphical user interface (GUI) of Web browsers (e.g., Internet Explorer and Netscape Navigator), or of any other device or software that complies with the protocol of a specific network and interprets (PDAs, mobile devices, etc.), is embedded (Java applets, ActiveX components, etc.) into, or is executed by the markup (e.g. HTML, SGML, XML, etc.) or any other language that presents data.

UDMI can be implemented as predominantly server-side application through server-side executable program (Engine Program), or as predominantly client-side application through technology such as JavaScript, Java applet, and ActiveX component. For the sake of illustration, the UDMI Engine Program described herein is implemented as a predominantly server-side application.

Described herein are two separate embodiments of UDMI: (1) a one-database UDMI (denoted as UDMI herein) that synchronizes with, accesses, manages, and manipulates one DBMS database, and (2) a multi-database UDMI (denoted as MUDMI herein) that hosts multiple virtual databases (user table collections) in one DBMS database.

First Embodiment: One-Database UDMI

One-database UDMI accesses a DBMS database, reads and synchronizes with the database's table structure, and manages/manipulates the database's tables and end-data through an interface that portrays the entire database's content (except special purpose tables). This UDMI embodiment may serve as a stand-alone application for management of data in newly built databases and databases that are not originally created by UDMI.

As shown in FIG. 2, one-database UDMI includes three abstract segments: UDMI Engine Program 1000, DBMS connectivity interface 1020, and Graphical User Interface (GUI) 1010. These highly interconnected interfaces work together to accomplish UDMI's main purpose: manipulation and management of data in a remote (local in some instances) DBMS (relational or non-relational) database. As shown in the FIG. 4, logically (as seen by end users), UDMI operates through the Initial Access Procedure (IAP) 1001 and four functional areas: Table Manager 1002, Report Manager 1003, Relations Manager 1004, and Administrator's Area 1005.

UDMI Engine Program

The heart of UDMI's functionality is the Engine Program 1000 (see FIG. 2), which directs and controls the flow of data from the DBMS connectivity interface 1020 to GUI 1010 and vice versa. It is a client (parts of the computation is done on a client's device/software)-server (parts of the computation is done on a server device) application executable by users through web browsers (Microsoft Internet Explorer, Netscape Navigator, etc.), or through any other device or software that complies with the protocol of a specific network and interprets (PDAs, mobile devices, etc.), is embedded (Java applets, ActiveX components, etc.) into, or is executed by the markup (e.g. HTML, SGML, XML, etc.) or any other language that presents data.

Engine Program 1000 may reside on a device connected to the network. Engine Program 1000 receives directions from GUI 1010 on what DBMS manipulations and data management procedures to execute, initiates DBMS connectivity, issues Structured Query Language (SQL) instructions to DBMS, and presents data received from a DBMS database 60 (see FIG. 2) back to GUI 1010. The Engine Program 1000 is completely independent of the programming language in which it is written and implemented. The Engine Program 1000 may use GUI markup (HTML, SGML, XML, etc.) or any other language for presentation of data over the network. Also, the Engine Program 1000 may use itself or the connectivity interface SQL or any other language for management/manipulation of data.

DBMS Connectivity Interface

DBMS connectivity interface 1020 is responsible for establishing a link with a DBMS database 60 that resides on a computing device connected to the network. Since the data is stored in DBMS database 60, the link between Engine Program 1000 and DBMS connectivity interface 1020 is crucial for correct functionality of the entire system for manipulation and management of data in a remote DBMS database 60.

Once DBMS connectivity interface 1020 establishes a link between the Engine Program 1000 and DBMS database 60 (shown in FIG. 1A), DBMS connectivity interface 1020 uses SQL to obtain, manipulate, and manage data (e.g., content of a specific DBMS database table 9900 cell) in DBMS database 60.

UDMI connects to all standard DBMSs, including but not limited to, Oracle, MS SQL Server, SyBase, Informix, mSQL, mySQL, and other database management systems, through Database Interface (DBI) 70 and its predefined functions. DBI is a standard database interface produced by independent software programmers. DBI is available for free use as an open source application. UDMI Engine Program 1000 connects to DBMS using a DBI instruction:

connect($data_source, $username, $password).

In this instruction $data_source is text string (see Interface Data Source File below for more detail on this string) containing the location and access information of the DBMS database to be manipulated/managed, $username is the access login word for the DBMS database, and $password is the password for the DBMS database. Once the Engine Program 1000 connects to DBMS database, it uses DBI instruction:

$sth=$dbh→prepare($statement) or die "Can't prepare $statement: $dbh→errstr\n"

to prepare SQL statement for execution, and it uses DBI instruction of the type $rv=$sth→execute or die "can't execute the query: $sth→errstr;

to issue execution request to DBMS database. In the previous two DBI instructions, $sth is a statement handle object, $dbh is DBMS database handle object, and $statement is the SQL statement to be executed. Other DBI instructions are occasionally used within the Engine Program 1000 (see descriptions of specific functions below for more detail).

Although, DBI offers a standard template for DBMS database manipulation, certain incompatibilities exist among different DBMSs. UDMI is designed to bypass these incompatibilities and is completely independent of the background DBMS. This is achieved by using the external files 80 (FIG. 4). These files reside on the server 40 where UDMI's Engine Program 1000 resides or on any other device connected to the network 30. These external files 80 store information about UDMI's state (table and data structure, security, session IDs (identifiers), etc., details explained in the rest of the document) independently from the DBMS database's 60 state. The external files are accessed, read and modified by all parts of UDMI Engine Program (Initial Access Procedure 1001, Table Manager 1002, Report Manager 1003, Relations Manager 1004, and Administrator's Area 1005). FIG. 4 shows the external files 80 grouped by the major parts (Initial Access Procedure 1001, Table Manager 1002, Report Manager 1003, Relations Manager 1004, and Administrator's Area 1005) of the Engine Program. This grouping only implies that some UDMI parts (Initial Access Procedure 1001, Table Manager 1002, Report Manager 1003, Relations Manager 1004, and Administrator's Area 1005) use the specific external file(s) 80 most often. The external files 80 comprise any storage place for data, e.g., text files, or table within DBMS database. The information for external files 80 that relates to data stored in DBMS database and its structure is obtained from the DBMS database via an established DBI link using SQL instructions.

Not only do the external files 80 ensure universal compatibility, but also they enhance DBMS's functionality as seen by UDMI's end-users, as described below.

External Files

Session IDs Table 81 is a special purpose table that stores current UDMI logged-in users' session IDs. The purpose of the Session IDs Table 81 is to allow the Engine Program 1000 to compute the inactivity time between two subsequent executions of UDMI for each logged-in user (user presently using UDMI). Session IDs Table is not stored in the Table Names File and therefore is invisible to UDMI users. The following is an example of the Session IDs Table:

| SessionId | Password | UserName | LastVisited |
|---|---|---|---|
| 1 | 1ira0000 | in | 1024286633 |
| 2 | zoro2948 | zorc | 1024287439 |

The SessionId column represents the primary key (unique record identifier) for the Session IDs Table. The LastVisited column stores the number of seconds passed from Jan. 1, 1970 to the last time each particular user executed an UDMI function. Information in the LastVisited column is used by the Engine Program 1000 to calculate lengths of sessions (inactivity time) for each particular user.

The JavaScript Functions File 82 contains three JavaScript routines that add client-side functionality to UDMI, and enhance UDMI's speed and usability. The JavaScript Functions File 82 is used by the Engine Program 1000 to store the client-side executable functions. In this embodiment, the three JavaScript routines include:

(1) "document.FormOne.Java_Script_Works.value=1;" this function attempts to set Java_Script_Works hidden field 1016 (GUI component, see GUI below for definitions of all GUI components) to 1 during the Initial Access Procedure (IAP) 1001 execution (see IAP section for more detail). If it succeeds, the next execution of the Engine Program 1000 will recognize that the user 10 has a JavaScript enabled device or software by checking the Java_Script_Works field for 1 value.

(2) "function cm(changedCell)" concatenates the name of its associated data cell (text field GUI component 1011) to the modifiedCells hidden field 1017 in the table end-data markup when the on Change JavaScript event occurs (see Table Manager end-data mode section below for more detail).

(3) "function checkAllKeyCheckBoxes( )" executes when a user clicks on the "Check All" check box (GUI component) within the table end-data GUI. The function either selects or deselects all other check boxes in the table end-data GUI depending on its previous state (selected or unselected).

The Table Names File 83 contains names of tables in the current UDMI table collection. These tables are the tables within a DBMS database managed/manipulated by UDMI (see the Engine Program section below for more detail). The Table Names File 83 is used by the Engine Program 1000 to store names of tables in the current UDMI table collection. The following is an example of the Table Names File 83:

Costs:.:Customer:.:Location:.:Purchase

The Table Column Names File 84 contains user-defined/visible table column names in order (from left to right) in which they appear in the table end-data GUI. The Table Column Names File 84 is used by the Engine Program 1000 to store user-defined/visible table column names. The following is an example of the Table Column Names File 84 for the "Purchase" table:

AmountSold:.:UnitPrice:.:Place:.:Date:.:CustomerID:.:PurchaseID

The Table Column Names Hash File 85 is a DBM (database management) hash file containing user-defined/visible table column names (column names presented to the user through the table end-data GUI) as keys 5010, and the Engine Program 1000 defined table column names within DBMS (user invisible column names) as values 5020. FIG. 3 shows a Table Column Names Hash File 85 (including the hash's keys 5010 and values 5020) interacting with the Table Column Names File 84. The Table Column Names Hash File 85 is used by the Engine Program 1000 to store user-defined/visible table column names as keys, and the Engine Program defined table column names within DBMS as values. Column renaming occurs in the Columns Names File 84 and within the column names hash's keys. Although, most new versions of DBMSs provide column renaming function, old versions as well as a small number of new DBMS editions do not allow for column renaming. In order to ensure that UDMI is compatible with all standard DBMSs, the Table Column Names Hash File 85 is used.

The Table Column Sorting File 86 contains column names that will be used by "ORDER BY" SQL clause to achieve sorting of data records (rows) by specific columns. If more than one column name is present in the Table Column Sorting File, data records will be sorted by columns in order in which they appear in the Table Column Sorting File (first column name in the Column Sorting File will appear first in the ORDER BY clause, second name will appear second in the clause, etc.). Table Column Sorting File contains DBMS database table 9900 column names (user invisible column names) (FIG. 1A). The Table Column Sorting File 86 is used by the Engine Program 1000 to store column names that will be used by "ORDER BY" SQL clause to achieve sorting of data records (rows) by specific columns. The following is an example of the Table Column Sorting File for the "Purchase" table:

col0:.:col1:.:col3

The Table Column Sizes File 87 is used exclusively for the table end-data GUI purposes to determine user-defined table column widths. The Table Column Sizes File 87 contains column widths in order (from left to right) in which they appear in the table within the table end-data GUI. The Table Column Sizes File 87 is used by the Engine Program 1000 to store user-defined table column widths. The following is an example of the Table Column Sizes File for the "Purchase" table:

15:.:15:.:15:.:15:.:15:.:15

The Report Names File 88 contains names of reports in the current UDMI report collection. The Report Names File 88 is used by the Engine Program 1000 to store names of reports in the current UDMI report collection. The Following is an example of the Report Names File:

TotalPurchasesPerCustomer:.:AugustPurchases

The Report Column Sizes File 90 is used exclusively for the report end-data GUI purposes to determine user-defined report column widths. The Report Column Sizes File 90 is used by the Engine Program 1000 to store user-defined report column widths. The Report Column Sizes File 90 contains column widths in order (from left to right) in which they appear in the report within the report end-data GUI. Following is an example of the Report Column Sizes File 90 for the "AugustPurchases" report:

15:.:15:.:15:.:15

The Pre SQL Statement File 89 contains non-parsed (slightly modified to be easily manipulated) sections of the SQL statement that generates a particular report. The file contains three sections: SELECT section, FROM section, and WHERE/ORDER BY/GROUP BY section. The third section is divided into three subsections that correspond to WHERE, ORDER BY, and GROUP BY clauses of a standard SQL statement.

Every section and subsection of the file contains entries—clauses separated by comma, and, or, or some other separator in a standard SQL statement (e.g. "[Purchase].[Amount Sold]*[Purchase].[UnitPrice] as 'q4' and [Purchase].[Date]<'2001-09-01'"). As in a regular SQL statement, only the SELECT and FROM sections are mandatory in order for a report to be generated. The Pre SQL Statement File 89 is used by the Engine Program 1000 to store non-parsed sections of the SQL statement that generates a particular report. The following is an example of a full Pre SQL Statement File 89 that contains non-parsed SQL code for report generation:

[Purchase].[CustomerID] as 'CusId', [Location].[Zip] as 'Loc', [Location].[Zip] as 'Zip', [Purchase].[AmountSold]*[Purchase].[UnitPrice] as 'SalesAmount':.:[Location], [Purchase]:.:[Purchase].[Date]>'2001-08-01' and [Purchase].[Date]<'2001-09-01' and [Purchase].[Place]=[Location].[LocationID] order by 'CusId' group by 'Loc'.

The Table Relations File 91 stores relations among tables in the current UDMI table collection. This file contains table relations domains (one domain per table). Each row in the Table Relations File 91 represents a table relations domain. A table relations domain is defined as a set of column pairs (relations) with the first column selected from the originating table and the second column selected from the concluding table. The Table relations domain also includes the specific table name to which the above-mentioned set of relations belong. This set of relations can be an empty list. The Table Relations File 91 does not necessarily correspond to relations defined in the DBMS database. Because the Table Relations File may be a completely separate entity from the DBMS database defined relations, it is possible to define relations within a non-relational database. The Table Relations File 91 is used by the Engine Program 1000 to store relations among tables in the current UDMI table collection. The following is an example of the Table Relations File:

Customer
Purchase:.:
Purchase.CustomerID>>Customer.CustomerID:.:
Purchase.Place>>Location.LocationID
Location
Costs:.:Costs.PurchaseID>>Purchase.PurchaseID The Interface Data Source File 92 contains one line of text defining the location and access information of the current DBMS database. The Interface Data Source File 92 is used by the Engine Program 1000 to store the location and access information of the current DBMS database. The Following is a sample of the Interface Data Source File:

DBI:mysql:jcosic:localhost:3306:.:jcosic:.:jcos4082

In this file,

DBI indicates to the Engine Program 1000 that the Database Interface will be used to connect to the database.

Mysql indicates that the database to be accessed and manipulated/managed is of mySQL type. Other possibilities for this field include oracle, Informix, mssql, etc.

jcosic indicates the name of the database to be accessed and manipulated/managed.

localhost is the address at which the database to be accessed and manipulated/managed. Other possibilities for this field include addresses of type cscil.mcla.edu or IP address of type 123.123.123.123.

3306 indicates the database port.

jcosic is the user name for accessing the database.

zoro4082 is the password for accessing the database.

The Security Table Source File 93 contains one line of text defining the location, and access information of UDMI's security table. The Security Table Source File 92 is used by the Engine Program 1000 to store the location, and access information of UDMI's security table (see Security Table below for more detail on the Security Table). Following is a sample of the Security Table Source File:

DBI:mysql:jcosic:localhost:3306:.:jcosic2:.:jcos4083

A description of fields in the Security Table Source File 93 can be found in the Interface Data Source File section above.

The Security Table 94 is a special purpose table that stores information on users and their privileges in accessing UDMI. The Security Table is not stored in the Table Names File 83 and therefore is invisible to UDMI users who do not have administrator's access privileges. The Following is an example of the security table:

| Password | UserName | FirstName | LastName | Status |
|----------|----------|-----------|----------|--------|
| jcos4082 | jcosic   | Jasmin    | Cosic    | admin  |
| jg432432 | jgreen   | John      | Green    | user   |

Two access privileges are defined within the Security Table 94 at this stage of UDMI development: "admin" and "user". In the case that a user's Status column is set to "user." the user will not have access to administrator's area (User Manager and Data Sources Manager) within UDMI. If a user's Status column is set to "admin," the user can access all UDMI functions. The Security Table 94 can be expanded to include additional information about UDMI users such as address, phone, sign-up date, etc. Password column is the primary key (unique record identifier) for the Security Table.

Graphical User Interface (GUI)

Referring back to FIG. 2, GUI 1010 has two functions within UDMI: visual presentation of data, and as an input for users to provide manipulation directions (clicking on buttons, entering text in text fields 1011, clicking on check boxes 1015, etc.). GUI 1010 presents data and data manipulation/ management forms through visual templates that are easily understandable to end-users who do not possess extensive database knowledge.

GUI 1010 operates through server-generated markup (e.g. HTML, SGML, XML, etc.) forms, and client-side executable code embedded into the markup (e.g. JavaScript, Java applet, ActiveX component, etc.). Several GUI form components are used for presentation of data, Engine Program functioning, and gathering user's input and operating directions. FIG. 5 shows examples of GUI form components, including text boxes fields 1011, text areas 1012, drop down menus 1013, push buttons 1014, check boxes 1015, links 1018 as well as hidden fields Java_Script_Works 1016 and modifiedCells 1017. Although, hidden fields are not visual (visible to users) components, they are part of GUI component collection herein because they are embedded into the markup that presents visual components.

Text box 1011 takes one line of text as input. Text box 1011 can either be assigned an initial value by the Engine Program 1000, or it can be written into from the user's keyboard.

Text area 1012 takes multiple lines of text as input. As was the case with the text box 1011, text area 1012 contains the Engine Program 1000 assigned value, or user typed text.

Drop-down menus 1013 contain predefined values outlined in the menu itself by the name labels (the menu entries for specific values). Users pick their preferred value by clicking on it within the menu entries.

Push buttons 1014 serve as means of submitting the current (currently on the screen) GUI form to the Engine Program 1000 for processing and execution. Users activate the push button 1014 by clicking on it using their mouse.

Check boxes 1015 possess either of the two values (states): checked or unchecked. Each time a user clicks on a check box 1015, he/she changes the check box's state to opposite of its previous state (e.g. checked to unchecked, and vice versa).

Generic hidden field's purpose is to store a value for the Engine Program 1000 use in such a manner that it's value is invisible to a user. The hidden field is embedded into the markup.

Java_Script_Works hidden field's purpose is to indicate whether the user's software or device is JavaScript enabled. This hidden field contains either 0 value or 1 value. 0 indicates that the user's software or device is not JavaScript enabled, whereas, 1 indicates the opposite.

modifiedCells hidden field's purpose is to store names of text boxes corresponding to the modified data cells within the table end-data GUI. This hidden field is modified by the JavaScript function "cm(changedCell)" on the user's device when the user changes the value (onchange JavaScript event) of a text box corresponding to a DBMS database table 9900 data cell (see Update Table function for more detail).

Links 1018 within UDMI are underlined pieces of text that, when clicked on, lead to another network location, or execute a program or function to which they point (e.g. UDMI Engine Program function). Users utilize links 1018 within UDMI for quick access to a particular part of UDMI and for moving through the hierarchical UDMI structure.

After a user clicks on push button 1011 that submits the form, data from specific form components is sent to UDMI Engine Program 1000. UDMI Engine Program 1000 interprets the data (GUI components' values) received from the online form, and executes a corresponding set of SQL instructions and GUI directions to acquire needed information and produce required output through a visual interface. The output is presented to the user through the above-mentioned GUI components.

All functions within UDMI are executed by clicking on an appropriate push button within GUI. It is always assumed that users need to click on a push button to execute a function even where clicking on it is not explicitly noted in this document.

Logical Division

Logically (from a user's perspective), UDMI operates through Initial Access Procedure and the four functional areas. These are shown in FIG. 4, and include the Initial Access Procedure 1001, Table Manager 1002, Report Manager 1003, Relations Manager 1004, and Administrator's Area 1005 as well as the sub-areas: User Manager 1006, Data Sources Manager 1007, and External files 80. Table Manager's 1002 purpose is to manipulate/manage tables and table end-data (data within tables). Report Manager's 1003 purpose is to manipulate/manage reports and report end-data (data within reports). Relations Manager's 1004 purpose is to manipulate/manage relations among tables in the current table collection. Administrator's Area's 1005 purpose is to manipulate/manage users and their privileges through User Manager, and to manipulate/manage Security Table data source and the interface data source through Data Sources Manager.

In this embodiment, seven separate interrelated physical programs are used to manipulate/manage data and UDMI structure. These include (1) login.cgi, which administers initial access to UDMI; (2) cdmitablemanager.cgi, which administers table manipulation/management; (3) cynaqdmi.cgi, which administers end-data within tables manipulation/management; (4) cdmireportmanager.cgi, which administers report manipulation/management; (5) cdmireportgenerator.cgi, which administers end-data within reports manipulation/management; (6) cdmirelationsmanager.cgi, which administers relations among tables manipulation/management; and (7) datasources.cgi, which administers data sources manipulation/management.

Initial Access Procedure (IAP)

Users access UDMI's functions by passing through the Initial Access Procedure 1001. Users are required to enter their user names and passwords in order to go to UDMI main console (four functional areas redirection screen, see FIG. 7; see below for explanation of FIG. 7), or they are required to click on the Administrator's Area link that leads to the Administrator's Area. FIG. 6 shows a user login screen, in which the user enters a user name 210 and a password 220. After entry, the user clicks on submit button 230 to provide this information to the UDMI engine. The UDMI Engine Program 1000 then matches the user-entered login and password with the UserName and Password columns in the Security Table 94. If it finds a match, the Engine Program 1000 generates a session ID for this user by creating an additional record in the Session IDs Table. This is done by adding one to the maximum integer in the SessionId column within the Session IDs Table 81, and placing this new number as the SessionId column value for the new record. This way the uniqueness of the primary key column (SessionId) is maintained. A second step in adding a new record to the Session IDs Table 81 is placing the user name, password, and the current time in the remaining three columns (UserName, Password, and LastVisited). After the new record is added, the user is granted access to UDMI functions (Table Manager, Report Manager, Relations Manager, and Administrator's Area) through the main console GUI, shown in FIG. 7.

FIG. 7 shows links to UDMI's four functional areas: Table Manager 1002, Report Manager 1003, Relations Manager 1004, and Administrator's Area 1005, and the link 250 that, when clicked on, leads back to the initial login screen (see FIG. 6). If the Engine Program 1000 does not find a match for the user-entered user name and password, an access denied message is presented through GUI.

During the Initial Access Procedure, the JavaScript function

"document.FormOne.Java_Script_Works.value=1;"

attempts to set Java_Script_Works hidden field to 1. If it succeeds, the next execution of the Engine Program 1000 will "know" that the user has a JavaScript enabled device or software by checking the Java_Script_Works field for 1 value. Java_Script_Works value (0 or 1) is passed through the entire program as long as the user operates UDMI. Based on the value of Java_Script_Works field, several UDMI functions, such as the table end-data Update Table function, gain on the client-side computational efficiency (see the particular UDMI areas' description for details on efficiency gains).

At all operating points during and beyond the Initial Access Procedure and execution of any UDMI function, the UDMI Engine Program 1000 locates the database to be accessed and manipulated/managed as well as the Security Table 94 against which to match user-entered user names and passwords. The Engine Program 1000 does this by opening and reading the Interface Data Source File 92 to obtain a location of the database to be manipulated, and by opening and reading the Security Table Source File 93 to obtain location of the database where the Security Table 94 resides (see the section on External Files for details on the Interface Data Source File and Security Table Source File).

At all operating points beyond the Initial Access Procedure 1001, the UDMI Engine Program 1000 checks the user's session ID before executing any of its functions. When the user passes through the Initial Access Procedure 1001, the user's session ID is written to UDMI User Sessions Analyzer (USA). This analyzer computes the inactivity time (set as 15 minutes by default) by subtracting the current time from the LastVisited column in the Session IDs Table 81. To obtain present time the Engine Program uses function localtime( );

To obtain the user's LastVisited column value, the Engine Program 1000 takes the user's session ID, which is passed through the entire program as long as the user operates UDMI, and finds a match in SessionId column of the Session IDs Table 81. Once the match is found and the computation is done, the UDMI Engine Program 1000 can take two actions:

(1) if the inactivity time is less than the allowed inactivity time (e.g., 15 minutes), the UDMI Engine Program updates the corresponding user's session record in the LastVisited column with the new "last" time (expressed in seconds since 1970) the user executed an UDMI function; or (2) if the inactivity time is longer than the allowed inactivity time, the UDMI Engine Program 1000 deletes the user's session record, and presents a "you have been inactive for too long" message through GUI. The user then has an option to go to the initial login screen.

Each time the procedure for managing session IDs is executed, it deletes session IDs of user's who are not operating UDMI for longer than the allowed inactivity time. This is done by subtracting the current time from each record's LastVisited column value in the Session IDs Table 81. If the difference is greater than the allowed inactivity time, the Engine Program 1000 deletes the corresponding record.

Table Manager

The Table Manager operates at two levels through two modes of the Engine Program 1000: table level/mode (level and mode are used interchangeably herein) and table end-data mode (see FIG. 8). The former allows for table manipulation/management (accessing/viewing, creating, and deleting tables) while the later manipulates/manages data within a given table. FIG. 8 shows the Table Manager 1002, Table Level 260, Table End-data Level 270, as well as the general functions on each level (see below for more detail on each function).

Table Manager Table Level/Mode

Table manipulation/management occurs at this level. Three functions are defined at this level: View Table, Create Table, and Delete Table (see FIG. 9). FIG. 9 shows View Table push button 290, Create Table push button 300, Delete Table push button 310, list 320 including table names 330, as well as the Login Screen link 250 and Main Console link 280 (see below for more detail on the three functions).

General Facts

In order to maintain synchronization with the underlying DBMS database 60, the Engine Program 1000 reads the list of tables presently in the DBMS database 60 each time a table level 260 or table end-data level 270 function is executed. The Engine Program 1000 uses SQL instructions such as "SHOW TABLES;" to obtain the list of tables in DBMS database 60. Once the DBMS table list is obtained, the Engine Program 1000 matches every element of this list with the elements (table names) stored in the Table Names File 83. If table(s) are found to exist in DBMS table list and do not exist in the Table Names File 83, the Engine Program 1000 creates the non-existent table(s) within UDMI by placing their names in the Table Names File 83, by placing the tables' relations domains into the Table Relations File 91, and by creating the tables' own external files: Table Column Names File 84, Table Column Names Hash File 85, Table Column Sorting File 86 and Table Column Sizes File 87 (see Create Table for details on table creation).

To achieve a complete synchronization with the underlying tables and end-data within DBMS database 60, the Engine Program 1000 also reads each DBMS table's column list. The Engine Program 1000 uses SQL instruction of type "DESCRIBE TableName;" to obtain the list of columns in DBMS database table 9900. Once the DBMS table column list is obtained, the Engine Program 1000 matches every element of this list with the elements (column names) stored in the Table Column Names File 84. If column(s) are found to exist in DBMS table column list and do not exist in the particular table's Table Column Names File 84, the Engine Program 1000 creates the non-existent column(s) within UDMI by placing their names in the particular table's Table Column Names File 84; by establishing the link in the Table Column Names Hash File 85 between DBMS database table 9900 column name and column name appointed by the Engine Program 1000; by placing the new column name into the Table Relations File 91 in the particular table's relations domain; by placing the initial column width for the new column into the Table Column Sizes File 87; and by placing an empty string value throughout the new column.

View Table

View Table function (push button) 290 accesses the selected table in the background DBMS database 60 and shows data presently in the table through the table end-data GUI. Another function of the View Table 290 is changing operating modes. After View Table 290 is executed, UDMI switches to table end-data mode 270 (see Table End-Data Level/Mode for details on table end-data mode). UDMI enters table end-data mode 270 through View Table function 290 called from the table level 260.

The View Table function 290 performs the following steps: reads the value (DBMS table name) behind the list entry 320 (the selected table name 330) to obtain the table selection 330, calls (executes) indexmain function 412 on the table end-data level 260, and passes the table name to indexmain 412 as parameter.

Users take the following steps to view a table: from the initial table level screen (see FIG. 9) select the table name from the list 320 (GUI component), and click on View Table button 290.

Create Table

Create Table 300 adds a new table with user-defined properties (table name, column names, primary key, and column ranges) to the user's table collection, and to the Table Relations File 91. Initially, an empty table relations domain is added to the Table Relations File 91.

Create Table 300 performs the following steps: adds the new table to DBMS database 60, places the table name into the Table Names File 83, places the table's relations domain into the Table Relations File 91, and creates the table's own external files: Table Column Names File 84, Table Column Names Hash File 85, Table Column Sorting File 86 and Table Column Sizes File 87. After the table is created by DBMS database 60 and placed in the Table Names File 83, a new table name is shown to the user through the table level GUI (see FIG. 9).

The following are steps that users take to create a table: from the initial table level screen (see FIG. 9) press Create Table button 300 (GUI component), enter the table name and initial number of columns that new table will contain into text field GUI components 450 and 460 (see FIG. 10). FIG. 10 shows the Table name text field 450, "initial number of columns" text field 460, and Submit push button 470. The second step in table creation is to enter initial column names 480, column value types 490, column ranges 500, and choose primary key column 510 by clicking on a corresponding checkbox GUI component. FIG. 11 shows column name text boxes 480, column type drop-down menus 490, column range text boxes 500, primary key check boxes 510, and the Submit push button 510.

Column types offered in this UDMI version are INTEGER, TEXT, DECIMAL, and DATE. For example, if a column is set as a DATE type, the only value it can contain is of date format (12-31-2002, 2002-12-31, etc.).

In the case that the user picks TEXT type for a particular column, the user can define its range (range is applicable only to TEXT type columns). Range is the number of characters the underlying DBMS database table 9900 column will accept as input. Range is any integer between 1 and 255 (ranges for different DBMSs may have slightly different limits on the column ranges). If the user does not define a range for a TEXT type column, the Engine Program assigns 255 to the range column property.

Delete Table

Delete Table 310 function (FIG. 9) removes the selected table from the user's table collection.

Delete Table 310 performs the following functions: reads the value (DBMS table name) behind the list 320 entry (the selected table 330) to obtain the table selection 330, removes the selected table from DBMS database 60, deletes the table name from the Table Names File 83, deletes the table's relations domain and the table name from the Table Relations File 91, removes the table name from reports' Pre SQL Statement Files 89, and deletes the table name from the tables external files: Table Column Names File 84, Table Column Hash File 85, Table Column Sorting File 86 and Table Column Sizes File 87. The table name is removed from the table level GUI as well.

Users take the following steps to delete a table: from the initial table level screen (see FIG. 9) select the table name 330 from the drop-down list 320 (GUI component), press Delete Table button (GUI component) 310, and confirm the deletion (see FIG. 12). FIG. 12 shows check box 530 for deleting the selected table from all reports in the table collection (current database), Delete button 540, and Cancel button 550.

Table Manager End-Data Level/Mode

The Table Manager, in the end-data mode, operates as record, column, and cell manager/manipulator via the following functions, which are described in detail below: indexmain, update table, insert row, insert column, delete marked, query/search, sort by, rename columns, resize columns, reorder columns, backup data, and load data.

Indexmain

Indexmain function 412 provides initial presentation of data presently in a DBMS database table 9900 (see FIG. 13). FIG. 13 shows the Login screen link 250, Main console link 280, Table manager link 281, Update Table button 401, Insert Row button 402, Insert Column button 403, Delete Marked button 404, Rename Columns button 405, Resize Columns button 406, Reorder Columns button 407, Query/Search button 408, Sort By button 409, Backup Table button 6410, Load Data button 411, Check All check box 630, individual records' check boxes 640, individual columns' check boxes 620, and data cells text boxes 650.

Indexmain 412 performs the following steps:

(1) Indexmain 412 reads the following files corresponding to a specific table: Table Column Names File 84 to obtain user-defined column names; Table Column Sorting File 86 to obtain user's sorting preferences; and Table Column Sizes File 87 to obtain user's column width preferences.

(2) Indexmain 412 obtains DBMS database table 9900 column names (DBMS database table 9900 column names are different from user-defined column names that reside in Column Names File 84) by reading the Table Column Names Hash File 85. Indexmain 412 uses column names read from the Table Column Names File 85 as keys and obtains DBMS database table 9900 column names as values of specific keys within the Column Names Hash File 85.

(3) Indexmain 412 extracts data from DBMS database table 9900. SQL instruction of type "SELECT col1, col2, col3, . . . FROM tableName ORDER BY col1*, col2*, col3*, . . . " is used. In this SQL instruction, "col1, col2, col3, . . . " represent column names obtained from the Column Names Hash File 85 as values (DBMS database table 9900 column names) of specific keys (user-defined/visible column names). TableName is the name of table with which the user is currently working. "col1*, col2*, col3*, . . . " represent column names obtained from the Column Sorting File 86.

(4) Indexmain 412 shows through the table end-data GUI: text fields 650 (GUI components) corresponding to DBMS database table 9900 cells; push buttons corresponding to UDMI's data management/manipulation functions (see below for the functions description); check boxes 640 and 620 corresponding to particular rows and columns respectively.

(5) In the case that the Initial Access Procedure 1001 discovered JavaScript enabled device or software on the client machine, indexmain 412 prints a reference in the markup to the update field function in the JavaScript Functions File. In the case that the Initial Access Procedure did not discover JavaScript enabled device or software, indexmain 412 prints in the markup the hidden fields 1019 possessing the same values as the corresponding text fields 650. Double cell representation (having both text fields 650 and hidden fields 1019 contain the same values) will be used by Update Table

601 function for finding which cells have been updated (see Update Table for additional details on text fields and hidden fields relationship).

Indexmain 412 is executed after each DBMS database table 9900 end-data manipulation/management (inserting data, modifying data, deleting data, searching data, sorting data, backing data, and column resizing, reordering, and renaming) due to user's need to see the effects of recent manipulations.

Update Table

Update Table function 401 provides a means of applying cell modifications to DBMS database table 9900. Update table 401 performs the following functions.

(1) In the case that the user's device or software is not JavaScript enabled (Java_Script_Works field set to 0), Update Table 401 function takes the values of GUI text boxes 650 and hidden fields 1019 (hidden fields are printed within the markup during indexmain 412 execution), and compares each text box value with its corresponding hidden field. The Engine Program 1000 updates only text boxes 650 (DBMS database table 9900 cells) whose values differed from the corresponding hidden fields 1019.

(2) In the case that the user's device or software is JavaScript enabled (Java_Script_Works field set to 1) Update Table 601 function takes the modifiedCells hidden field 1017, splits it up by ":.:" delimiter to obtain names of all modified cells, and places new user-entered values into the corresponding cells. This technique greatly increases UDMI's speed due to the fact that only one dynamically (JavaScript client-side processing) generated field that keeps track of updated table data cells is passed from the client to the server. Each time a user changes a data cell text box 650 (in the case of JavaScript enabled device or software), JavaScript embedded into the markup appends the name of the changed text box 650 to the modifiedCells hidden field 1017. This way the Engine Program "knows," when it splits the modifiedCells hidden field, which data cells (text boxes 650) have been modified.

Once the names of the data cells (text boxes 650) to be updated are obtained by the Engine Program, Update Table 401 function uses SQL instruction of type: "UPDATE tableName SET columnName=someValue WHERE columnName*=someValue*." In this SQL instruction, tableName is the name of table with which the user is currently working. ColumnName and columnName* represent column names obtained from Column Names Hash File 85 as values (DBMS database table 9900 column names) of specific keys (user-defined/visible column names).

Insert Row

Insert Row function 403 serves as a new record generator. Use of this function causes the Engine Program 1000 to create a new record within DBMS database table 9900 with which user is currently working.

Insert Row function 403 uses SQL instruction of type: "INSERT INTO tableName (columnName) VALUES (someValue)." In this SQL instruction, tableName is the name of table with which the user is currently working. ColumnName represents DBMS database table 9900 column name.

The following are steps that users take to insert a new row: click on the Insert Row button 403 within the table end-data GUI (see FIG. 13), and fill the column value text fields 700 (see FIG. 14). FIG. 14 shows column value text fields 700 associated with specific table columns and a Submit push button 710.

Insert Column

Insert Column function 402 represents a new column generator. This function causes the Engine Program 1000 to create a new column within DBMS database table 9900 with which the user is currently working. The new column is shown at the left end of the table end-data GUI (see FIG. 13).

Insert Column function 402 performs the following steps:

(1) Insert Column function 402 uses SQL instruction of type: "ALTER TABLE tableName ADD columnName" to insert the new column into the DBMS database table 9900. In this SQL instruction, tableName is the name of table with which the user is currently working. ColumnName represents DBMS database table 9900 column name (user invisible column name) appointed by the Engine Program 1000.

(2) Insert Column function 402 places user-defined/visible column name into the Table Column Names File 84.

(3) Insert Column function 402 establishes the link between user-defined/visible column name and column name appointed by the Engine Program 1000. This link is created by inserting an entry (key-value pair) into the Table Column Names Hash File 85. User-defined/visible column name represents the key, while column name appointed by the Engine Program 1000 represents the value.

(4) Insert Column function 402 places the new column name into the Table Relations File 91 in the table relations domain of the table with which the user is currently working.

(5) Insert Column function 402 places initial column width for the new column into the Table Column Sizes File 87. Initial width is 15 characters.

(6) Insert Column function 402 places an empty string value throughout the new column.

Users call the Insert Column function by pressing the Insert Column push button 402 within the table end-data GUI (see FIG. 13), and by entering the new column name into text field 730, by selecting column type (TEXT, INTEGER, DECIMAL, or DATE, see table creation above for details on column types and ranges) from the drop-down menu 740, and optionally by entering the new column range into the text field 750 (see FIG. 15). FIG. 15 shows Column Name text field 730, Column Type drop-down menu 740, Range text field 750, and Submit push button 760.

Delete Marked

Delete Marked function 404 removes selected (marked by check boxes 640 and 620) rows and columns (see FIG. 16 for example on checking/marking rows and columns). FIG. 16 shows columns LName and Address1, and rows 1, 3, and 4 marked by their respective check boxes 620 (for columns) and 640 (for rows).

Delete Marked function performs the following steps:

(1) Delete Marked function 404 removes the selected rows and columns from DBMS database table 9900 by using SQL instruction of type: "DELETE FROM tableName WHERE columnName=someValue" for row (data record) deletion, and SQL instruction of type "ALTER TABLE tableName DROP COLUMN columnName" for column deletion. In this SQL instruction, tableName is the name of table with which the user is currently working. ColumnName represents DBMS database table 9900 column name.

(2) Delete Marked function 404 deletes selected user-defined/visible column names from the Table Column Names File 84.

(3) Delete Marked function 404 deletes entries (key-value pairs) corresponding to selected columns from the Table Column Names Hash File 85.

(4) Delete Marked function 404 deletes selected user-defined/visible column names from the corresponding table relations domain in the Table Relations File 91.

(5) Delete Marked function 404 deletes SELECT section entries that contained selected (selected for deletion) columns in all Pre SQL Statement Files 89.

(6) Delete Marked function 404 deletes selected user-defined/visible column names from the table Column Sorting File 86.

(7) Delete Marked function 404 Deletes numbers (widths in characters) from the Table Column Sizes File 87 corresponding to selected column names.

Users call Delete Marked function 404 by selecting (clicking on the check boxes 640 and 620) rows and columns to be deleted, by clicking on the Delete Marked push button 404 within the table end-data GUI, and by confirming the deletion (see FIG. 17). FIG. 17 shows the "delete selected column names from all reports within current database" check box 770, Delete push button 780, and Cancel push button 790.

Query/Search

Query/Search function 408 provides a table querying and searching tool. Users are expected to select the type of query through the drop-down menu 800, fill GUI text fields 810 (within Search/Query screen, see FIG. 18) corresponding to specific columns, and click on Submit button 820 for results. Query results are presented through the indexmain function 412 and its GUI (see FIG. 13).

To receive required query results, the Engine Program 1000 uses SQL instruction of type "SELECT col1, col2, col3, . . . FROM tableName WHERE columnName1\*= someValue, columnName2\*=someValue . . . ORDER BY col1\*, col2\*, col3\*, . . . ". In this SQL instruction, "col1, col2, col3, . . . " and "columnName1\*=someValue, columnName2\*=someValue . . . " represent column names obtained from Column Names Hash File 85 as values (DBMS database table 9900 column names) of specific keys (user-defined/visible column names). TableName is the name of table with which the user is currently working. "col1\*, col2\*, col3\*, . . . " represent DBMS database table 9900 column names obtained from Column Sorting File 86.

Two types of queries are offered through the drop-down menu 800: logical OR (default) and "AND". The former presents all records that contained EITHER of the non-empty text field 810 values in the corresponding columns. An AND query presents all records that contained ALL of the non-empty text field 810 values in the corresponding columns. OR generally produces a longer list of records than an AND query, which is more restrictive. In both cases, if the corresponding record value contains the query text field value, the record is valid for presenting in query results.

One of the most powerful GUI features allows for modification of data while in the query GUI (query GUI is the same as the table end-data GUI, see indexmain above for more details). When modification of data through query window is complete, using the Update Table function 401 causes DBMS database 60 to apply changes to DBMS database table 9900. Use of the Update Table 401 function also causes GUI to call indexmain, which shows table end-data GUI exiting the query GUI.

Users call Search/Query function by pressing the Search/Query push button 408 within the table end-data GUI (see FIG. 13), and by entering the search phrases into the text fields 810 corresponding to the specific table columns.

Sort By

Sort By function 409 rearranges table records in ascending order by selected columns within the table end-data GUI.

Sort By function 409 performs the following steps: (1) rewrites (deletes and writes over) the Table Column Sorting File (86) by placing DBMS database table 9900 column names selected (checked by clicking on the corresponding column check boxes 620) for sorting into the Table Column Sorting File 86 in order (from left to right) in which the selected column names appear within the table end-data GUI (see FIG. 13 for table end-data GUI).

Users call Sort By function 409 by selecting (checking the corresponding column check boxes 620) columns by which rows will be sorted, and by pressing the Sort By push button 409 within the table end-data GUI.

Rename Columns

Rename Columns function 405 modifies user-defined column names within the table with which the user is currently working.

Rename Columns function 405 performs the following steps:

(1) Rename Columns function 405 rewrites the Table Column Names File 84 by placing the new user-defined/visible column names into the Table Column Names File 84.

(2) Rename Columns function 405 rewrites entries (key-value pairs) in the Table Column Names Hash File 85 by removing old user-defined/visible column names (keys) and placing new keys (modified user-defined/visible column names). Values (DBMS database table 9900 column names) in the Column Names Hash File 85 remain the same.

(3) Rename Columns function 405 renames the corresponding column names in the Table Relations File 91.

(4) Rename Columns function 405 renames the corresponding entries in all sections and subsections of the reports' Pre SQL Statement Files 89.

Users call Rename Columns function 405 by clicking on the Rename Columns push button 405 within the table end-data GUI (see FIG. 13 for table end-data GUI), and by entering the new column names into the text fields 830 (see FIG. 19). FIG. 19 shows the new column name text fields 830, "rename columns in all reports within current database" check box 840, and Submit push button 850.

Resize Columns

Resize Columns function 406 modifies the table end-data GUI text box 650 sizes (column widths in characters) corresponding to the specific columns within the table with which the user is currently working.

Resize Columns function 406 performs the following steps: rewrites the Table Column Sizes File 87 by placing the new user-defined column sizes into the Table Column Sizes File 87.

Figure 20:
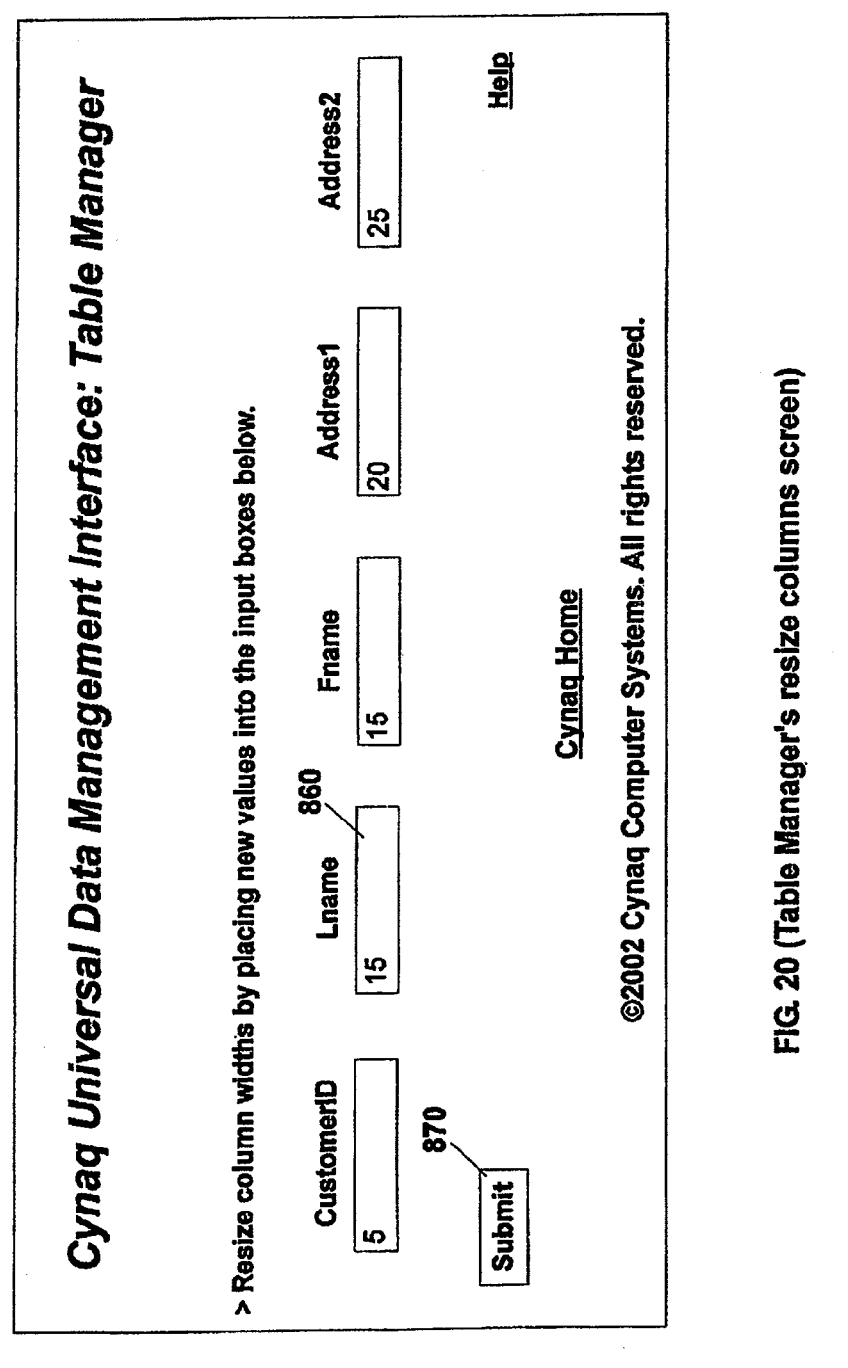

Users call Resize Columns function 406 by clicking on the Resize Columns push button 406 within the table end-data GUI (see FIG. 13 for table end-data GUI), and by entering the new column sizes into the text fields 860 (see FIG. 20). FIG. 20 shows the new column size text fields 860, and Submit push button 870.

Reorder Columns

Reorder Columns function 407 modifies the order in which columns appear within the table end-data GUI (see FIG. 13 for table end-data GUI).

Reorder Columns function 407 performs the following steps: rewrites the Table Column Names File 84 by placing user-defined/visible column names into the Table Column Names File 84 in the new order.

Figure 21:
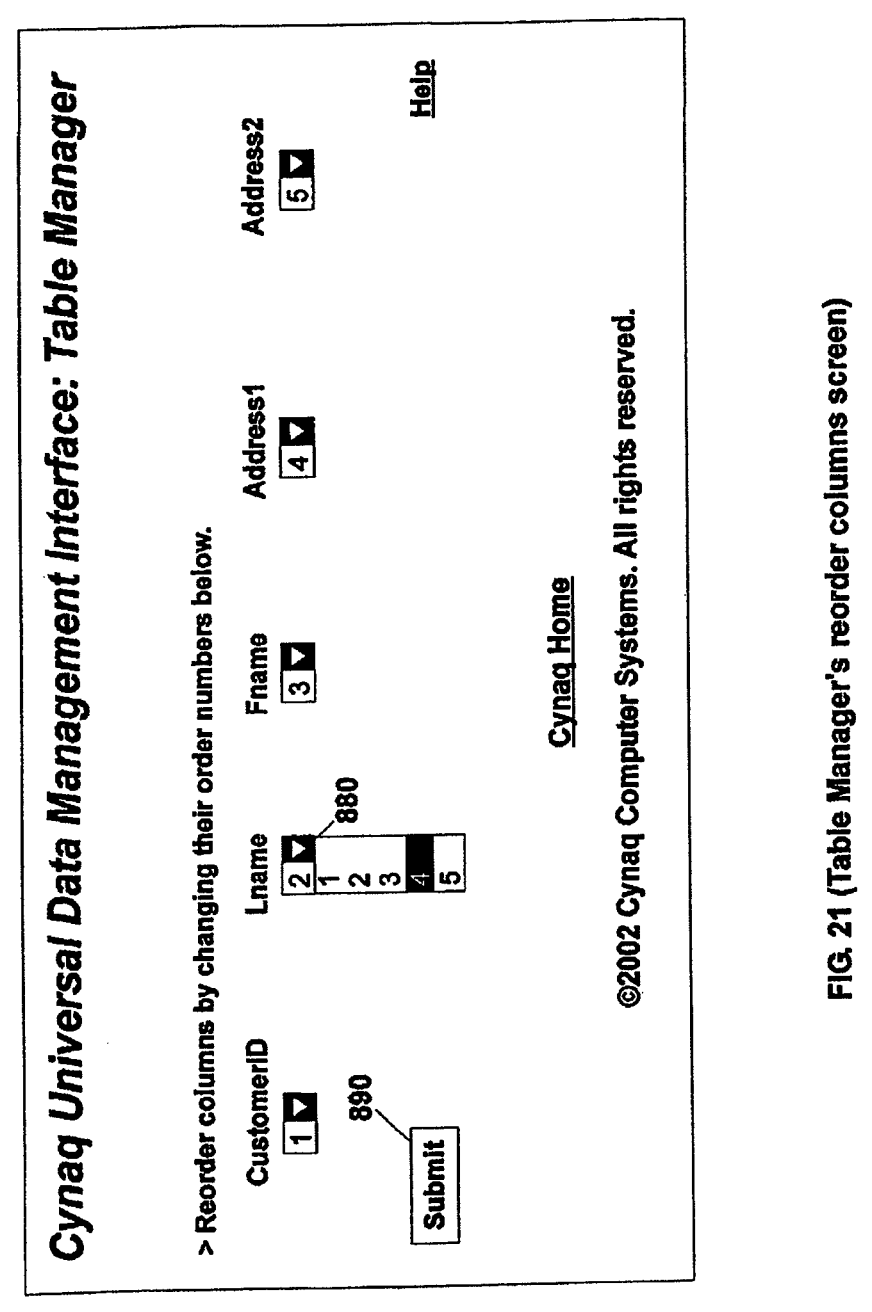

Users call Reorder Columns function 407 by clicking on the Reorder Columns push button 407 within the table end-data GUI (see FIG. 13 for table end-data GUI), and by selecting each column's new order number through drop-down menus 880 (see FIG. 21). FIG. 21 shows the column order drop-down menus 880, and Submit push button 890.

Backup Table

Backup Table function 410 gives user an option to save the server-side data stored in DBMS database table 9900 to the user's device 20. After the user presses the Backup Table button 410, data from the current table is presented in the text area 900 as a tab-delimited text (format readable by most data management programs, see FIG. 22). FIG. 22 shows the text area 900 with tab-delimited text in it. The user can copy the tab-delimited text and paste it into a text file for saving on his/her device. In order to obtain data to place into the text area, the Engine Program 1000 uses SQL instruction of type "SELECT col1, col2, col3, . . . FROM tableName ORDER BY col1*, col2*, col3*, . . . ". In this SQL instruction, "col1, col2, col3, . . . " represent column names obtained from the Column Names Hash File 85 as values (DBMS database table 9900 column names) of specific keys (user-defined/visible column names). TableName is the name of table with which the user is currently working. "col1*, col2*, col3*, . . . " represent column names obtained from the Table Column Sorting File 86.

Load Data

Load Data function 411 represents a way to load large amount of data into the current table. After pressing the Load Data button 411 within the table end-data GUI (see FIG. 13 for table end-data GUI), the GUI presents a screen with an input text area 910 (GUI component see FIG. 23). FIG. 23 shows the input text area 910, and Submit push button 920. Users are expected to type or paste a tab-delimited text into the text area 910 in order to load the data into the current table. Once the Engine Program 1000 obtains the data from the text area 910 it uses SQL instruction of type: "INSERT INTO tableName (columnName) VALUES (someValue)." In this SQL instruction, tableName is the name of table with which the user is currently working. ColumnName represents DBMS database table 9900 column name. When loading data, the Engine Program 1000 reads the tab-delimited text columns from left to right and loads the data from the leftmost column to the right (as far as it can) in the current DBMS database 60 column ordering structure.

Report Manager

Report Manager 1003 operates at two levels through two modes of the Engine Program 1000: report level/mode and report end-data mode (see FIG. 24). The former allows for report manipulation (accessing/viewing, creating, and deleting) while the later manipulates/manages data within a given report. FIG. 24 shows the Report Manager 1003, Report Level 1500, Report End-data Level 1510, as well as the general functions on each level (see below for more detail on each function).

Report Manager Report Level/Mode

Report manipulation/management occurs at this level. Three functions are defined at this level: View Report, Create Report, and Delete Report (see FIG. 25). FIG. 25 shows View Report push button 1520, Create Report push button 1530, Delete Report push button 1540, list 1573 including report names 1574, as well as the Login Screen link 250 and Main Console link 280 (see below for more detail on the three functions).

View Report

View Report 1520 accesses the selected report in the user's report collection and shows through the report end-data GUI (see FIG. 30 below for report end-data GUI) the data that conforms to the rules defined in the report. Another important function of View Report 1520 is changing operating modes. After View Report 1520 is executed, UDMI switches to report end-data mode 1510 (see Report End-Data Level/Mode for details on the report end-data mode). UDMI enters report end-data mode 1510 through View Report function 1520 called from the report level 1500.

View Report function 1520 performs the following steps: reads the value behind the list entry (the selected report 1574) to obtain the report selection 1574, calls (executes) index-main function 1550 on the report end-data level 1510, and passes the report name to indexmain 1550 as parameter.

Users take the following steps to view a report: from the initial report level screen (see FIG. 25) select the report name 1574 from the drop-down menu 1573, and press the View Report button 1520.

Create Report

Create Report function 1530 adds a new report with user-defined properties (report name, column names, column definitions, record filtering conditions, and grouping conditions) to the user's report collection.

Create Report function 1530 performs the following steps: adds the new report name to the Report Names File 88, creates the report's Pre SQL Statement File 89, and creates the report's Column Sizes File 90. Before the report can be created, the Engine Program 1000 checks for existence of relations (see Table Relations File above for definition of a relation) among tables selected for the report data extraction. If the number of relations is one less than the number of tables selected for data extraction or greater, the report can be created, otherwise, a message "Unrelated tables selected" will be displayed through GUI. The user can then select tables that have a sufficient number of relations among them and proceed with the report creation. After the report is created, the new report name is shown to the user through the report level GUI (see FIG. 25).

Figure 27:
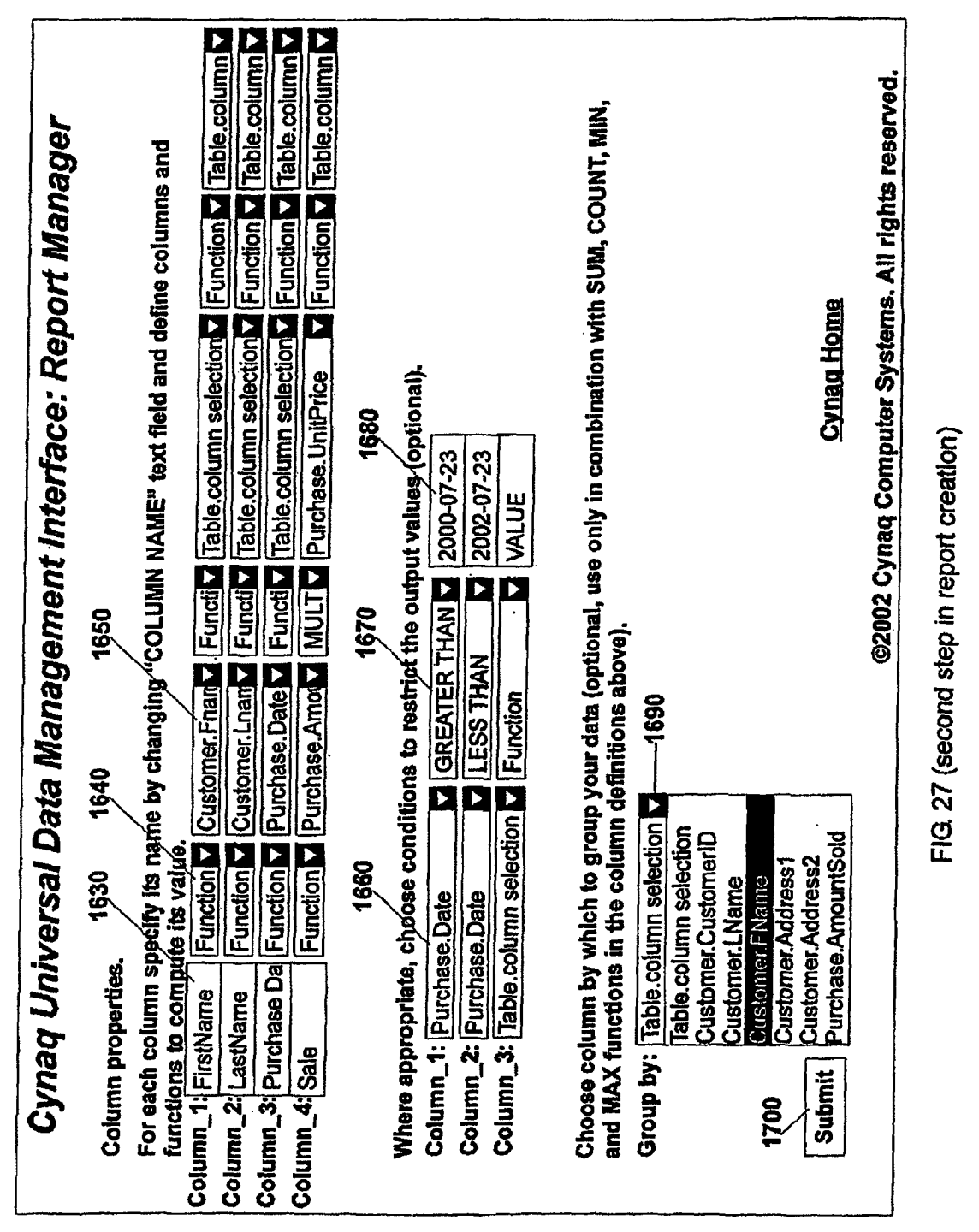

The following are steps that users take to create a report: from the initial report level screen (see FIG. 25) press the Create Report button 1530; enter the report name 1580, initial number of columns 1590 that new report will contain, and select from list 1600 the table(s) from which the report will obtain data (see FIG. 26). FIG. 26 shows the Report name text field 1580, "initial number of columns" text field 1590, table selection list 1600 including table names 1610, and Submit push button 1620. Second step in report creation is to enter initial column names 1630, select column definitions using drop-down menus 1640 and 1650 and using text field 1651 (not visible in the FIG. 27), select record filtering conditions using drop-down menus 1660 and 1670 and using text field 1680, and select grouping conditions using drop-down menu 1690 (see FIG. 27). Column definition is done either by selecting column 1650, or by defining computation 1640 of multiple columns 1650, see below for explanation. FIG. 27 shows the column name text boxes 1630, column computation drop-down menus 1640, column selection drop-down menus 1650, column selection drop-down menus 1660, filtering conditions drop-down menus 1670, filtering conditions text fields 1680, grouping conditions drop-down menu 1690, and Submit push button 1700. Third step in report creation is the optional custom modification of the Engine Program 1000 generated pre-parsed sections and subsections of the SQL report code through modification of the sections and subsections text fields 1710, 1720, 1730, and 1740 (see FIG. 28). FIG. 28 shows the text field 1710 corresponding to the SELECT section of the Pre-SQL Statement File, text field 1720 corresponding to the FROM section, text field 1730 corresponding to the WHERE subsection, text field 1740 corresponding to the GROUP BY subsection, and Submit push button 1750.

Users are offered the following options when defining a column:

(1) Grouping (must be used in combination with Group By function) functions (leftmost column definition function drop-down menu 1640): SUM (sum of records in the selected column), COUNT (number of records in the selected column), MIN (minimum value in the selected column), MAX (maximum value in the selected column), and AVG (average value in the selected column).

(2) Inter-column functions: MULT (multiplication of values in the selected columns), DIV (division of values in the selected columns), ADD (addition of values in the selected columns), and SUB (subtraction of values in the selected columns). Depending on the version of UDMI implementation, additional column definition functions can/will be introduced.

Users are offered the following options when defining record filtering conditions (drop-down menu 1670): EXISTS (value present in the column), DOES NOT EXIST (value not present in the column), EQUAL (equal column values), NOT EQUAL (not equal column values), LESS THAN (column selection 1660 values less than the value defined in the text field 1680), AND GREATER THAN (column selection 1660 values greater than the value defined in the text field 1680). Depending on the version of UDMI implementation, additional record filtering functions can/will be introduced.

Users define the grouping conditions by selecting in the drop-down list 1690 any column from any table that was selected as source of data in the first step of column creation.

Delete Report

Delete Report function 1540 removes the selected report from the user's report collection.

Delete Report function 1540 performs the following steps: reads the value behind the list entry (the selected report 1574) to obtain the report selection 1574, removes the selected report from the Report Names File 88, deletes the report's Pre SQL Statement File 89, and deletes the report's Column Sizes File 90. The report name is removed from the report level GUI as well (see FIG. 25 for report level GUI).

Users take the following steps to delete a report: from the initial report level screen (FIG. 25) select the report name 1574 from the drop-down list 1573, press the Delete Report button 1540, and confirm the deletion (see FIG. 29). FIG. 29 shows the Delete button 1760, and Cancel button 1770.

Report Manager End-Data Level/Mode

Report Manager in the end-data mode operates as record, column, and cell manager/manipulator through the following functions, which are described in detail below: indexmain, insert column, delete columns, change conditions, sort by, rename columns, resize columns, reorder columns, and backup data.

Indexmain

Indexmain function 1550 (FIG. 24) provides initial presentation of data that conforms to the rules defined in the report (see FIG. 30). FIG. 30 shows the Login screen link 250, Main console link 280, Report manager link 282, Insert Column button 1551, Delete Columns button 1552, Change Conditions button 1553, Rename Columns button 1554, Resize Columns button 1555, Reorder Columns button 1556, Sort By button 1557, Backup Table button 1558, individual columns' check boxes 1820, and data cells text boxes 1830.

Indexmain function 1550 performs the following steps:

(1) Indexmain function 1550 reads the following files corresponding to a particular report: Pre SQL Statement File 89, to obtain sections and subsections of the pre-parsed SQL statement; and the Report Column Sizes File 90 to obtain the user's column width preferences.

(2) Indexmain function 1550 extracts data from DBMS database table 9900s using the user-defined and the DBMS specific report properties obtained in the report creation procedure. SQL instruction of type "SELECT col1, col2, col3, . . . FROM table1, table2, table3, . . . WHERE cond1, cond2, cond3, . . . ORDER BY col1*, col2*, col3*, . . . GROUP BY col1, col2, col3, . . . " is used. In this SQL instruction, "col1, col2, col3, . . . ," represent column names obtained from the Pre SQL Statement File's 89** SELECT section entries. "table1, table2, table3, . . . " are names of tables from which data will be used to generate the report. "cond1, cond2, cond3, . . . " are user-defined conditions for filtering the report records. "col1*, col2*, col3*, . . . " represent the user's column sorting preferences. "col1, col2, col3**, . . . " represent the user's column grouping preferences.

(3) Indexmain function 1550 shows GUI text fields 1830 corresponding to the report data cells.

(4) Indexmain function 1550 shows push buttons 1551, 1552, 1553, 1554, 1555, 1556, 1557, 1558 corresponding to the report data manipulation functions.

(5) Indexmain function 1550 shows check boxes 1820 corresponding to the particular columns.

Indexmain 1550 is executed after each report manipulation (changing report conditions, sorting data, backing data, etc.) due to the user's need to see the effects of recent manipulations.

Insert Column

Insert Column function 1551 represents a new column generator. This function causes the Engine Program 1000 to create a new column within the report with which the user is currently working. The new column possesses values that comply with the user-defined conditions for the new column as well as the general (e.g. grouping) column conditions in the report in which the new column will be inserted. The new column is shown at the left end of the report end-data GUI (see FIG. 30).

Insert Column function 1551 performs the following steps:

(1) Insert Column function 1551 creates a new entry in the SELECT section of the report's Pre SQL Statement File 89 by (1A) adding the user-defined column name, DBMS table column name (user invisible column name) and column definition to the SELECT section (e.g. [Purchase].[AmountSold] *[Purchase].[UnitPrice] as 'SalesAmount'); (1B) depending on whether the user selected additional table(s) from which the report will obtain data the Engine Program 1000 modifies the FROM section of the report's Pre SQL Statement File 89 by appending additional table names or changing the list of table names already in the FROM section; and (1C) depending on whether the user selected grouping column(s) the Engine Program 1000 modifies the GROUP BY subsection of the report's Pre SQL Statement File 89 by appending additional table column names or changing the list of table column names already in the GROUP BY subsection.

(2) Insert Column function 1551 places the initial column width for the new column into the Report Column Sizes File 90. Initial width is 15 characters.

The following are steps that users take to insert column: press the Insert Column button 1551 and select from the list 1850 one or more table names 1860 from which the column will obtain data (see FIG. 31). FIG. 31 shows table selection list 1850 including table names 1860, and Submit push button 1870. Second step in column insertion is to enter initial column name 1630, select column definition 1640 and 1650 (either a column selection, or computation of multiple columns), and select grouping conditions through drop-down menu 1690 (see FIG. 32). FIG. 32 shows the column name text box 1630, column computation drop-down menus 1640, column selection drop-down menus 1650, grouping conditions drop-down menu 1690, and Submit push button 1890. Third step in column insertion is the optional custom modification of the Engine Program 1000 generated pre-parsed section and subsection of the SQL report code through modification of the text fields 1710 and 1740 (see FIG. 33). FIG. 33 shows the text field 1710 corresponding to the SELECT section of the Pre-SQL Statement File, text field 1740 corresponding to the GROUP BY subsection, and Submit push button 1900.

Delete Columns

Delete Columns function 1552 removes selected (marked by check boxes 1820) columns within the report with which the user is currently working.

Delete Marked function 1552 performs the following steps:

(1) Delete Columns function 1552 removes the entries from all sections and subsections in the report's Pre SQL Statement File 89 corresponding to the selected columns or entries that contained the selected column.

(2) Delete Columns function 1552 deletes column width values from the Report Column Sizes File 90 corresponding to the selected column names.

Users call Delete Marked function 1552 by selecting (clicking on the check boxes 1820) columns to be deleted, pressing the Delete Marked push button 1552 within the report end-data GUI (FIG. 30), and by confirming the deletion (similar to FIG. 17, description above).

Sort By

Sort By function 1557 rearranges records in ascending order by the selected columns within the report end-data GUI (see FIG. 30 for report end-data GUI).

Sort By function 1557 performs the following steps: rewrites the entries in the ORDER BY subsection of the report's Pre SQL Statement File 89 by placing column names selected for sorting into the ORDER BY subsection in order (from left to right) in which the selected columns appear within the report end-data GUI (FIG. 30).

Users call Sort By function by selecting (clicking on check boxes 1820) columns by Which rows will be sorted, and clicking on Sort By push button within the report end-data GUI (FIG. 30).

Rename Columns

Rename Columns function 1554 modifies user-defined report column names.

Rename Columns function 1554 performs the following steps: rewrites entries in the SELECT section of the report's Pre SQL Statement File 89 by changing the entries' user-defined column names portion (the portion after the "as" word).

Users execute Rename Columns function 1554 by pressing the Rename Columns push button 1554 within the report end-data GUI (FIG. 30), and by entering the new column names (see FIG. 34). FIG. 34 shows the new column name text fields 1920, and Submit push button 1930.

Resize Columns

Resize Columns function 1555 modifies the report end-data GUI text box sizes (column widths in characters) corresponding to specific columns within the report with which the user is currently working.

Resize Columns function 1555 performs the following steps: rewrites the Report Column Sizes File 90 by placing the new user-defined column sizes into the Report Column Sizes File 90.

Users call Resize Columns function 1555 by clicking on the Resize Columns push button 1555 within the report end-data GUI (FIG. 30), and by entering the new column sizes (see FIG. 35). FIG. 35 shows the new column size text fields 1950, and Submit push button 1960.

Reorder Columns

Reorder Columns function 1556 modifies the order in which columns appear within the report end-data GUI (see FIG. 30 for report end-data GUI).

Reorder Columns function 1556 performs the following steps: rearranges and rewrites entries in the SELECT section of the report's Pre SQL Statement File 89. The new location of each entry in the SELECT section corresponds to the new (defined by user) order number 1980 of each entry.

Users call Reorder Columns function 1556 by pressing the Reorder Columns push button 1556 within the report end-data GUI (FIG. 30), and by selecting a new order number 1980 corresponding to each column (see FIG. 36). FIG. 36 shows the column order drop-down menus 1980, and Submit push button 1990.

Backup Table

Backup Table function 1558 represents a way to save the report's data on the user's device. After the user presses the Backup Table button 1558 within the report end-data GUI, the data from the current report is presented in the text area 2010 as a tab-delimited text (format readable by most data management programs, see FIG. 37). FIG. 37 shows the text area 2010 with tab-delimited text in it. The user can copy the tab-delimited text and paste it into a text file for saving on his/her device. In order to obtain data to place into the text area, the Engine Program 1000 uses SQL instruction of type "SELECT col1, col2, col3, . . . FROM table1, table2, table3, . . . WHERE cond1, cond2, cond3, . . . ORDER BY col1*, col2*, col3*, . . . GROUP BY col1, col2, col3**, . . . ". In this SQL instruction, "col1, col2, col3, . . . " represent column names obtained from the Pre SQL Statement File's 89 SELECT section entries. "table1, table2, table3, . . . " are names of tables from which data will be used to generate the report. "cond1, cond2, cond3, . . . " are user-defined conditions for filtering the report records. "col1*, col2*, col3*, . . . " represent the user's column sorting preferences. "col1, col2, col3**, . . . " represent the user's column grouping preferences.

Change Conditions

Change Conditions function 1553 modifies record filtering and grouping conditions. This function causes the Engine Program 1000 to create new data compliance rules within the report with which the user is currently working.

Change Conditions function 1553 performs the following steps: rewrites entries in the WHERE and GROUP BY subsections of the report's Pre SQL Statement File 89 by placing newly defined record filtering and grouping conditions into the WHERE and GROUP BY subsections, respectively.

The following are steps that users take to change a report's filtering and grouping conditions: press the Change Conditions button 1553 within the report end-data GUI (FIG. 30), define new record filtering conditions by selecting table column(s), filtering function(s), and filtering value(s) through GUI drop-down menus 1660 and 1670 and text fields 1680, and define new grouping conditions by selecting a grouping column through drop-down menu 1690 (see FIG. 38). FIG. 38 shows the column selection drop-down menus 1660, filtering conditions drop-down menus 1670, filtering conditions text fields 1680, grouping conditions drop-down menu 1690, and Submit push button 2030. Second step in changing a report's conditions is the optional custom modification of the Engine Program 1000 generated pre-parsed sections and subsections of the SQL report code through modification of the sections and subsections text fields 1730, and 1740 (see FIG. 39). FIG. 39 shows the text field 1730 corresponding to the WHERE subsection, text field 1740 corresponding to the GROUP BY subsection, and Submit push button 2050.

Relations Manager

UDMI users manipulate/manage relations among tables in the current table collection through Relations Manager 1004. This is done through modification of column pairs 2070-2080 within the Relations Manager GUI (see FIG. 40). FIG. 40 shows the Login screen link 250, Main console link 280, originating table column selection drop-down menus 2070, concluding table column selection drop-down menus 2080, and Submit push button 7222. Each row in the Relations Manager GUI represents a table relations domain. A table relations domain is defined as a set of column pairs (relations) with the first column selected from the originating table and the second column selected from the concluding table. Table relations domain also includes the specific table name (owner of the specific relations domain) to which a set of relations belong. This set of relations can be an empty list. Users define a relation between Table1 and Table2 by selecting a Table1's column (origin of relation) within Table1's table relations domain, and by selecting a Table2's column (conclusion of relation) within Table1's table relations domain. The originating and concluding columns are separated by the ">>" within the Relations Manager GUI (see FIG. 40) to indicate the direction of the relation. Relations (column pairs) within the GUI are separated by ";".

Once the Engine Program 1000 obtains the column pairs (relations) from the user through the Relations Manager GUI, it rewrites the Table Relations File 91. Each time the user presses the Submit button within the Relations Manager GUI (FIG. 40) the Engine Program 1000 collects all column pairs defined in the GUI and rewrites the Table Relations File 91 in its entirety.

Relations defined through the Relations Manager 1004 do not correspond with relations possibly defined in the DBMS database 60. Because the Table Relations File 91 is a completely separate entity from the DBMS database 60-defined relations, it makes it possible to define relations within a non-relational database.

Administrator's Area

Users access the Administrator's Area 1005 by pressing the Administrator's Area link 240 on the initial login screen (FIG. 6), or by pressing the Administrator's Area link 1005 on the UDMI's main console (FIG. 7). Users are required to enter their user names 210 and passwords 220 (similar to FIG. 6, initial login screen) to access the Administrator's Area 1005 (see FIG. 41A). FIG. 41A, shows the Login screen link 250, Main console link 280, Administrator's login screen link 284, User Manager link 1006 and Data Sources Manager link 1007. After the user name and password are matched against the Security Table's 94 UserName and Password columns, and if the user's Security Table's 94 record shows "admin" in the Status column, the user is allowed to access the Administrator's Area through the two sub functions: User Manager 1006 and Data Sources Manager 1007. User Manager 1006 manages/manipulates users and user access and operating privileges, while Data Sources Manager 1007 manipulates/manages the interface data source and security table source (see Data Sources Manager below for more detail).

User Manager

User management occurs when a user with administrator's access privilege manipulates a special purpose table (Security Table 94) that stores information on users and their privileges in accessing UDMI. Security Table 94 is not stored in the Table Names File 83 and therefore is invisible to UDMI users who do not have administrator's access privilege. Following is an example of the Security Table 94:

| Password | UserName | FirstName | LastName | Status |
|---|---|---|---|---|
| jcos4082 | jcosic | Jasmin | Cosic | admin |
| jg432432 | jgreen | John | Green | user |

The Security Table's 94 data is managed/manipulated in the same manner as all other tables' data through UDMI's table end-data level-mode GUI (see FIG. 41 which is equivalent of FIG. 13). For example, to add another user, an administrator presses the Insert Row button 403, and fills out the five mandatory text fields 700 (Password, UserName, FirstName, LastName, and Status, equivalent of FIG. 14). To delete a user, an administrator selects the row in which the user's information reside, and presses the Delete Marked button 404. Also, all other Security Table 94 manipulations mimic manipulations of a regular UDMI table (any table within the Table Names File 83).

More important than the Security Table's 94 management/manipulation procedures is the content of this special purpose table's mandatory columns. Password, UserName, FirstName, and LastName are self-explanatory. Two access privileges (column values) for the Status column are defined: "admin" and "user." In the case that a user's Status value is set to "user," the user will not have access to Administrator's Area 1005 (User Manager 1006 and Data Sources Manager 1007) within UDMI. If a user's Status value is set to "admin," the user can access all UDMI functions. The Security Table 94 can be expanded to include additional non-mandatory columns such as address, phone, sign-up date, etc.

Another important parameter of the Security Table 94 is its network location (physical or abstract). The Security Table's 94 location may be the same as the UDMI manipulated/managed database's location, or it can be a different network location on the network (see below for details on data sources).

Data Sources Manager

Users manipulate UDMI accessed/managed DBMS database's 60 location and Security Table's 94 location through the Data Sources Manager (see FIG. 42). FIG. 42 shows Login screen link 250, Main console link 280, Administrator's login screen link 284, Administrator's console link 285, interface data source (IDS) User Name text field 2100, IDS Password text field 2110, IDS Database type text field 2120, IDS Database Name text field 2130, IDS Host Name text field 2140, IDS Port text field 2150, security data source (SDS) User Name text field 2160, SDS Password text field 2170, SDS Database type text field 2180, SDS Database Name text field 2190, SDS Host Name text field 2200, and SDS Port text field 2210. Submit push button 8000 is located below the above-mentioned text fields, but is not visible on FIG. 42.

Users are expected to enter the following access information for both data sources (Interface Data Source and Security Table Source) through the Data Sources Manager GUI: database type (e.g. mysql), database name (e.g. jcosic), database IP address (e.g. csci.fds.edu), database port (e.g. 3306), database access user name (e.g. zoro), and database access password (e.g. zoro4321). Once the Engine Program 1000 obtains the six pieces of information for the two data sources, it rewrites the Interface Data Source File 92 and the Security Table Source File 93 (see external files for details on data source files) with the new access information.

Second Embodiment: Multiple-Database within One Database UDMI (MUDMI)

MUDMI hosts multiple virtual databases (user table collections/domains) in one DBMS database 60. This UDMI embodiment is designed to efficiently serve multiple users (UDMI also serves multiple users) in an Application Service Provider (ASP) environment (e.g. network data management service). For the purpose of this description, MUDMI is implemented as an application similar in functionality to UDMI and its Table Manager 1002. Certain variations exist, and they are explained in detail in the text that follows.

As shown in FIG. 2, equivalently to UDMI, MUDMI includes three abstract segments: UDMI Engine Program 1000, DBMS connectivity interface 1020, and Graphical User Interface (GUI) 1010.

Logically (as seen by the end user), MUDMI operates through the Initial Access Procedure 1001, and Table Manager 1002 (see logical division below for details).

Abstract Division

MUDMI's abstract division is equivalent to UDMI's abstract division described in the first embodiment. MUDMI's abstract division includes MUDMI Engine Program 1000, DBMS Connectivity Interface 1020, and GUI 1010. See the first embodiment for descriptions of each abstract MUDMI's segment.

External Files

Session IDs Table 81 is equivalent to UDMI's Session IDs Table 81 (see description of the first embodiment for explanation).

JavaScript Functions File 82 is equivalent to UDMI's JavaScript Functions File 82 (see description of first embodiment for explanation).

Table Names File 83 is equivalent to UDMI's Table Names File 83 (see description of first embodiment for explanation).

Column Names File 84 is equivalent to UDMI's Table Column Names File 84 (see description of first embodiment for explanation).

Column Names Hash File 85 is equivalent to UDMI's Table Column Names Hash File 85 (see description of first embodiment for explanation).

Column Sorting File 86 is equivalent to UDMI's Table Column Sorting File 86 (see description of first embodiment for explanation).

Column Sizes File 87 is equivalent to UDMI's Table Column Sizes File 87 (see description of first embodiment for explanation).

Sequential Number Generator 9100 contains a single integer value representing the attachment number (number after "_" that makes table names unique, e.g. MyTable_253) of the last created table. Sequential Number Generator 9100 is used by Table Management Algorithm (see Table Level/Mode for details on TMA) to ensure that table names within DBMS database 60 are unique. A call to the Sequential Number Generator 9100 returns the last integer that has been used within TMA. Every integer output incremented by one from the Sequential Number Generator is a unique integer within TMA.

Security Table 9101 is a special purpose table that stores information on users who are allowed access to MUDMI. Security Table 9101 is not stored in the Table Names File and therefore is invisible to MUDMI users. Following is an example of the Security Table 9101:

| Password | UserName | FirstName | LastName |
|---|---|---|---|
| jcos4082 | jcosic | Jasmin | Cosic |
| jg432432 | jgreen | John | Green |

The Security Table 9101 can be expanded to include additional information about MUDMI users such as address, phone, sign-up date, etc. Password column is the primary key (unique record identifier) for the Security Table.

Graphical User Interface (GUI)

MUDMI GUI 1010 serves the same general purpose as UDMI's GUI, therefore the two are equivalent when functionality is concerned. See the description of first embodiment for explanation of GUI functioning.

Logical Division

Logically, MUDMI operates through the Initial Access Procedure 1001, and Table Manager 1002 (see FIG. 43A). FIG. 43A shows the Initial Access Procedure 1001, Table Manager 1002 as well as the External files 80. In this embodiment, three separate interrelated physical programs are used to manipulate/manage data and MUDMI structure: (1) login.cgi, which administers initial access to MUDMI; (2) mudmistablemanager.cgi, which administers table manipulation/management; and (3) cynaqmudmis.cgi, which administers end-data within tables manipulation/management.

Initial Access Procedure

Before accessing UDMI functions through the Initial Access Procedure, users are placed in the Security Table either by the network UDMI service administrators, or by the users themselves through the UDMI sign-up screen (see FIG. 49). FIG. 49 shows the Username text field 30001, Password text field 30002, Password confirmation text field 30003, First Name text field 30004, Last Name text field 30005, Company text field 30006, and submit push button 30007. Users are expected to fill the required fields and press the push button 30007. If the new user-defined password is not found in the Password column in the Security Table, the user is successfully enrolled in the network UDMI service and the user is granted the right to access UDMI functions through the Initial Access Procedure 1001.

Users access MUDMI's functions by passing through the Initial Access Procedure 1001. Users are required to enter their user names 210 and passwords 220 (see FIG. 6, FIG. 6 is MUDMI equivalent). The MUDMI Engine Program 1000 then matches the user-entered login 210 and password 220 with the UserName and Password columns in the Security Table 9101. If it finds a match, the Engine Program 1000 generates a session ID for this user by creating an additional record in the Session IDs Table 81. This is done by adding one to the maximum integer in the SessionId column within the Session IDs Table 81, and placing this new number as the SessionId column value for the new record. This way the uniqueness of the primary key column (SessionId) is maintained. Second step in adding a new record to the Session IDs Table is placing the user name, password, and the current time in the remaining three columns (UserName, Password, and LastVisited). After the new record is added, the user is granted access to MUDMI functions through the table level GUI (see FIG. 9, FIG. 9 is MUDMI equivalent).

If the Engine Program does not find a match for the user-entered user name and password, an access denied message is presented through GUI.

During the Initial Access Procedure the JavaScript function "document.FormOne.Java_Script_Works.value=1;"

attempts to set Java_Script_Works hidden field 1016 to 1. If it succeeds, the next execution of the Engine Program 1000 will "know" that the user has a JavaScript enabled device or software by checking the Java_Script_Works hidden field 1016 for 1 value. Java_Script_Works value (0 or 1) is passed through the entire program as long as the user operates MUDMI. Based on the value of Java_Script_Works hidden field 1016, several MUDMI functions such as the end-data Update Table function gain on the client-side computational efficiency.

At all operating points beyond the Initial Access Procedure 1001, the MUDMI Engine Program 1000 checks the user's session ID before executing any of its functions. When the user passes through the Initial Access Procedure 1001, his/her session ID is written to MUDMI User Sessions Analyzer (USA). This analyzer computes the inactivity time (set as 15 minutes by default) by subtracting the current time from the LastVisited column in the Session IDs Table 81. To obtain the current time the Engine Program 1000 uses function Localtime( );

To obtain the user's LastVisited column value the Engine Program 1000 takes the user's session ID, which is passed through the entire program as long as the user operates MUDMI, and finds a match in SessionId column of the Session ID Table 81. Once the match is found, the MUDMI Engine Program can take two actions:

if the inactivity time is less than the allowed inactivity time (15 minutes by default), the MUDMI Engine Program 1000 updates the corresponding user's session record in the LastVisited column with the new "last" time (expressed in seconds since 1970) the user executed an MUDMI function.

if the inactivity time is longer than the allowed inactivity time, the MUDMI Engine Program 1000 deletes the user's session record, and presents the "you have been inactive for too long" message through GUI. The user has an option to go to the initial login screen.

Each time the procedure for managing session IDs is executed, it deletes session IDs of user's who are not operating MUDMI for longer than the allowed inactivity time. This is done by subtracting the current time from each record's LastVisited column value in the Session IDs Table 81. If the difference is greater than the allowed inactivity time, the Engine Program 1000 deletes the corresponding record.

Table Manager

Table Manager operates at two levels through two modes of the Engine Program 1000: table level/mode (level and mode are used interchangeably herein) and table end-data mode (see FIG. 43, FIG. 43 is equivalent to FIG. 8). The former allows for table manipulation/management (accessing/viewing, creating, and deleting tables) while the later manipulates/manages data within a given table.

Table Level/Mode

Table manipulation/management occurs at this logical level. Three functions are defined at this level: View Table 290, Create Table 300, and Delete Table 310 (see FIG. 44). FIG. 44 shows the Login screen link 250, View Table push button 290, Create Table push button 300, Delete Table push button 310, and list 320 including table names 330 (see below for more detail on the three functions).

General Facts

Each table within MUDMI possesses a special purpose primary key (unique record identifier) column. The primary key column's content are integers in the descending order for easy monitoring and update of data cells. Whenever a user executes a MUDMI table end-data function (Update Table 401, Insert Column 402, etc.) the Engine Program 1000 obtains the primary key of the particular row(s) on which the manipulation takes place, and conducts the manipulation. This user-invisible column improves MUDMI's efficiency and simplicity by keeping track of primary keys automatically.

View Table

View Table function 290 accesses the selected table in the background DBMS database 60 and shows data presently in the table through the end-data GUI (see FIG. 45; see end-data mode below for more detail). Another important function of the View Table 290 is changing operating modes. After View Table is executed, MUDMI switches to end-data mode (see End-Data Level/Mode for details on end-data mode).

View Table function 290 performs the following steps: reads the value. (DBMS table name) behind the list entry (the selected table 330) to obtain the table selection 330, calls (executes) indexmain function 412 on the end-data level, and passes the table name to indexmain 412 as parameter.

Users take the following steps to view a table: from the initial table level screen (FIG. 44) select the table name 330 from the drop-down list 320, and click on View Table button 290.

Create Table

Create Table 300 adds new table with user-defined properties (table name, and column names) to the user's table domain (set of tables created by individual user, see User's Table Domain below for more detail).

Create Table 300 performs the following steps: adds the new table to DBMS database 60, places the table name into the Table Names File 83, and places the new table name into MUDMI's table management algorithm (TMA). Use of TMA (see Table Management Algorithm for details) ensures that table names within each user's domain are unique. After the table is created by DBMS database 60 and placed in TMA, the new table name is shown to the user through the table level GUI (FIG. 44).

The following are steps that users take to create a table: from the initial table level screen (FIG. 44) press Create Table button 300, and enter the new table name and initial number of columns that the table will contain into text field GUI components 450 and 460 (see FIG. 46, FIG. 46 is equivalent to FIG. 10). Second step in table creation is to enter initial column names 480 (see FIG. 47). FIG. 47 shows column name text boxes 480, and Submit push button 510.

Delete Table

Delete Table function 310 removes selected table from the user's table domain.

Delete Table function 310 performs the following steps: reads the value (DBMS table name) behind the list entry (the selected table 330) to obtain the table selection 330, removes the table from DBMS database 60, deletes the table name from the Table Names File 83, and deletes the table name from TMA. The table name is removed from the table level GUI (FIG. 44) as well.

Users take the following steps to delete a table: from the initial table level screen (FIG. 44) select the table name 330 from the drop-down list 320, press Delete Table button 310, and confirm the deletion (see FIG. 12, FIG. 12 is MUDMI equivalent).

User's Table Domain

When a user applies for MUDMI use, he/she is given a folder (his/her own domain logically inaccessible by other users) within MUDMI, separate copies of cynaqmudmis.cgi and mudmistablemanager.cgi, and external files belonging to that user's domain (see External Files above for details). Separate copies of the two MUDMI physical programs enhance MUDMI's speed when multiple users concurrently access MUDMI. In the case of two or more users accessing MUDMI at the same time, they would not compete for the same copy of the program, which would extend waiting time. This waiting time would be significantly long if thousands of users are subscribed to MUDMI. By placing separate copies of the two MUDMI physical programs in each user's domain, separate physical programs are interpreted for each individual user. This technique greatly enhances MUDMI's speed.

MUDMI Table Management Algorithm (TMA)

Each user has access to tables only within his/her table domain. Table domain is an abstract object that resides within the Table Names File 83. The separation of user domains is achieved through utilization of an algorithm that ensures name uniqueness of every table within the DBMS database 60 even though different users might have defined same table names within their respective table domains. Separate table domains can legitimately possess the same table names. However, TMA allows only unique table names to be used within individual user's domain.

When a new table name is defined by the user, TMA checks whether the new table name already exists within the user's domain. If it does, an error message is presented through GUI. In the case that the new table name does not exist in the user's domain, TMA attaches an incremented number generated by the Sequential Number Generator to the user-defined table name. Since each incremented number obtained from the Sequential Number Generator is unique, every new table name approved by TMA (it is approved if it is unique within user's domain) will be unique within DBMS database 60. This technique is crucial in ensuring that every table within DBMS database has a unique name.

End-Data Level/Mode

Table Manager 1002, in the end-data mode 270, operates as record, column, and cell manager/manipulator via the following functions, which are described in detail below: indexmain, update table, insert row, insert column, delete marked, query/search, sort by, rename columns, resize columns, reorder columns, backup data, and load data.

Indexmain

Indexmain function 412 provides initial presentation of data presently in a DBMS database table 9900 (see FIG. 45). FIG. 45 shows the Login screen link 250, Table manager link 281, Update Table button 601, Insert Row button 602, Insert Column button 603, Delete Marked button 604, Rename Columns button 605, Resize Columns button 606, Reorder Columns button 607, Query/Search button 608, Sort By button 609, Backup Table button 610, Load Table button 611, Check All check box 630, individual records' check boxes 640, individual columns' check boxes 620, and data cells text boxes 650.

Indexmain function 412 performs the following steps:

(1) Indexmain function 412 reads the following files corresponding to a specific table: Column Names File 84 to obtain user-defined column names; Column Sorting 86 File to obtain user's sorting preferences; and Column Sizes File 87 to obtain user's column width preferences.

(2) Indexmain function 412 obtains DBMS database table 9900 column names by reading the Column Names Hash File 85. Indexmain uses column names read from Column Names File 84 as keys 5010 and obtains DBMS database table 9900 column names as values 5020 of specific keys 5010 within the Column Names Hash File 85.

(3) Indexmain function 412 extracts data from DBMS database table 9900. SQL instruction of type "SELECT col1, col2, col3, . . . FROM tableName ORDER BY col1*, col2*, col3*, . . . " is used. In this SQL instruction, "col1, col2, col3, . . . " represent column names obtained from Column Names Hash File 85 as values (DBMS database table 9900 column names) of specific keys (user-defined/visible column names). TableName is the name of table with which the user is currently working. "col1*, col2*, col3*, . . . " represent column names obtained from Column Sorting File 86.

(4) Indexmain function 412 shows (prints into the markup) GUI text fields 650 corresponding to DBMS database table 9900 cells.

(5) Indexmain function 412 shows push buttons corresponding to MUDMI's data manipulation functions.

(6) Indexmain function 412 shows check boxes 640 and 620 corresponding to particular rows and columns respectively.

(7) In the case that the Initial Access Procedure 1001 discovered JavaScript enabled device or software on the client machine, indexmain prints a reference in the markup to the update field function in the JavaScript Functions File 82. In the case that the Initial Access Procedure 1001 did not discover JavaScript enabled device or software, indexmain 412 prints in the markup the hidden fields possessing the same values as the corresponding text fields. Double cell representation (having both text fields and hidden fields contain the same values) will be used by Update Table function for finding which cells have been updated (see Update Table for additional details on text fields and hidden fields relationship).

Indexmain function 412 is executed after each DBMS database table 9900 end-data manipulation/management (inserting data, modifying data, deleting data, searching data, sorting data, backing data, and column resizing, reordering, and renaming) due to user's need to see the effects of recent manipulations.

Update Table

Update Table function 401 provides a means of applying cell modifications to DBMS database table 9900. Update table 401 performs the following steps:

(1) In the case that the user's device or software is not JavaScript enabled (Java_Script_Works hidden field 1016 set to 0) Update Table function 401 takes the values of GUI text boxes and hidden fields (hidden fields are printed within the markup during indexmain execution), and compares each text box value with its corresponding hidden field. The Engine Program updates only text boxes (DBMS database table 9900 cells) whose values differed from the corresponding hidden fields.

(2) In the case that the user's device or software is JavaScript enabled (Java_Script_Works hidden field 1016 set to 1) Update Table function 401 takes the modifiedCells hidden field 1017, splits it up by "::" delimiter to obtain names of all modified cells, and places new user-entered values into the corresponding cells. This technique greatly increases MUDMI's speed due to the fact that only one dynamically (JavaScript client-side processing) generated field that keeps track of updated table data cells is passed from the client device/software to the server device/software.

Once the names of the data cells to be updated are obtained by the Engine Program 1000, Update Table function 401 uses SQL instruction of type: "UPDATE tableName SET columnName=someValue WHERE columnName*=someValue*." In this SQL instruction, tableName is the name of table with which the user is currently working. ColumnName and columnName* represent column names obtained from Column Names Hash File 85 as values (DBMS-database table 9900 column names) of specific keys (user-defined/visible column names).

Insert Row

Insert Row function 403 serves as a new record generator. Use of this function causes the Engine Program 1000 to create a new record within DBMS database table 9900 with which the user is currently working. The new record is shown as a row of empty text boxes within the end-data GUI (FIG. 45).

Insert Row function 403 uses SQL instruction of type: "INSERT INTO tableName (columnName) VALUES (someValue)." In this SQL instruction, tableName is the name of table with which the user is currently working. ColumnName represents DBMS database table 9900 column name.

The following is the step that users take to insert a new row: click on the Insert Row button 403 within the end-data GUI (FIG. 45).

Insert Column

Insert Column function 402 represents a new column generator. This function causes the Engine Program 1000 to create a new column within DBMS database table 9900 with which the user is currently working. The new column possesses either a specific (user-defined) or an empty value (in the case that user choose not to place an initial value) throughout the new column. The Engine Program 1000 shows the new column at the left end of the end-data GUI (FIG. 45).

Insert Column function 402 performs the following steps:

(1) Insert Column function 402 uses SQL instruction of type: "ALTER TABLE tableName ADD columnName" to insert new column into DBMS database table 9900. In this SQL instruction, tableName is the name of table with which the user is currently working. ColumnName represents DBMS database table 9900 column name (user invisible column name) appointed by Engine Program 1000.

(2) Insert Column function 402 places the user-defined/visible column name into the Column Names File 84.

(3) Insert Column function 402 establishes the link between the user-defined/visible column name and column name appointed by the Engine Program 1000. This link is created by inserting an entry (key-value pair) into the Column Names Hash File 85. User-defined/visible column name represents the key 5010, while column name appointed by the Engine Program 1000 represents the value 5020. Engine Program defines (appoints) DBMS database table 9900 column name by calculating the largest number accompanying any column name within a given table, and incrementing it by one. The DBMS database table 9900 column name is of type "col+largestNumberAccompanyingAny-ColumnNamePlusOne (e.g. col3)."

(4) Insert Column function 402 places initial column width for the new column into the Column Sizes File 87. Initial width is 15 characters.

(5) Insert Column function 402 places initial value throughout the new column. If the user defined an initial value, it is placed throughout the new column; otherwise, an empty string is placed.

Figure 48:
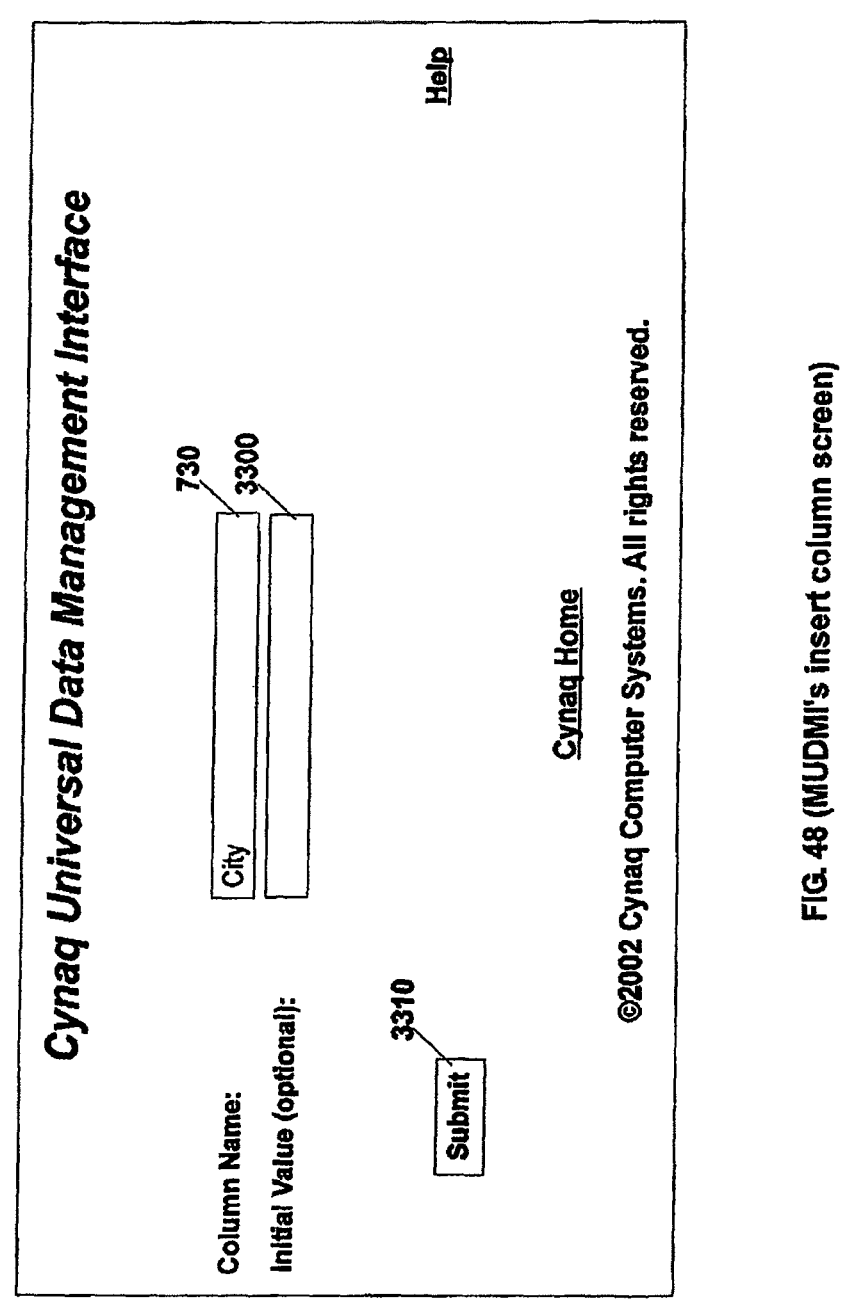

Users call the Insert Column function by pressing the Insert Column push button 402 within the end-data GUI (FIG. 45), and by entering the new column name 730 and optionally the initial column value 3300 (see FIG. 48). FIG. 48 shows the Column name text field 730, Initial value text field 3300, and Submit push button 3310.

Delete Marked

Delete Marked function 404 removes selected (marked by check boxes 640 and 620) rows and columns (see FIG. 16 for example on checking/marking rows and columns; FIG. 16 is MUDMI equivalent). FIG. 16 shows columns LName and Address1, and rows 1, 3, and 4 marked by their respective check boxes 620 (for columns) and 640 (for rows).

Delete Marked function 404 performs the following steps:

(1) Delete Marked function 404 removes the selected rows and columns from DBMS database table 9900 by using SQL instruction of type: "DELETE FROM tableName WHERE columnName=someValue" for row (data record) deletion, and SQL instruction of type "ALTER TABLE tableName DROP COLUMN columnName" for column deletion. In this SQL instruction, tableName is the name of table with which the user is currently working. ColumnName represents DBMS database table 9900 column name.

(2) Delete Marked function 404 deletes selected user-defined/visible column names from the Column Names File 84.

(3) Delete Marked function 404 deletes entries (key-value pairs) corresponding to selected columns from the Column Names Hash File 85.

(4) Delete Marked function 404 deletes selected user-defined/visible column names from the Column Sorting File 86.

(5) Delete Marked function 404 deletes numbers (widths in characters) from the Column Sizes File 87 corresponding to selected column names.

Users call Delete Marked function 404 by selecting (clicking on the check boxes 640 and 620) rows and columns to be deleted, by clicking on the Delete Marked push button 404 within the table end-data GUI, and by confirming the deletion (see FIG. 17, FIG. 17 is MUDMI equivalent).

Query/Search

Query/Search 408 is equivalent to UDMI's Query/Search function 408.

Sort By

Sort By 409 is equivalent to UDMI's Sort By function 409.

Rename Columns

Rename Columns 405 is equivalent to UDMI's Rename Columns function 405.

Resize Columns

Resize Columns 406 is equivalent to UDMI's Resize Columns function 406.

Reorder Columns

Reorder Columns 407 is equivalent to UDMI's Reorder Columns function 407.

Backup Table

Backup Table 410 is equivalent to UDMI's Backup Table function 410.

Load Data

Load Data 411 is equivalent to UDMI's Load Data function 411.

Other Embodiments: UDMI Implemented as Predominantly Client-Side Application

The two UDMI embodiments (denoted as UDMI and MUDMI) described above are predominantly server-side applications. A slightly different UDMI implementation is a predominantly client-side UDMI. Client-side UDMI uses technology such as Java Applet, ActiveX Component, or a client-side scripting language such as JavaScript or VBScript. Client-side UDMI remains essentially the same functionality as the predominantly server-side UDMI. The only difference is that most of the computational work is done on the client's (user's) device.

Client-side implementation of UDMI requires the Engine Program to reside on the user's device as opposed to the predominantly server-side UDMI whose Engine Program resides and is executed on a server (device that hosts UDMI). On the client's device, the Engine Program would either be executed by a virtual machine (e.g. Java Applet requirement), a plugin (preinstalled software that interprets files and executables designed for it), or by the user's (client's) operating system. For example, in the case of a Java Applet, the Engine Program (1) connects to a DBMS database through the UDMI's DBMS Connectivity Interface placed on the client device; (2) requests data from the server-side DBMS; (3) processes the data on the client's device; and (4) presents the results of the computations on the client's device through a web browser, or another device or program.

UDMI implemented as a predominantly client-side application establishes a real time link between the DBMS database and client-side software (Java applet, ActiveX component, JavaScript, etc.). UDMI users are informed real-time about DBMS database events that can affect or be useful in their work.

Further Embodiments

UDMI may provide concurrent access by multiple users, and definitions of additional operational privileges.

Concurrency

One of the fields of UDMI development is the field of concurrency. Concurrency is an issue only in the UDMI implementation that is predominantly server-side.

In the case that multiple users access the same UDMI database, a situation may occur that one user updates a DBMS database table 9900, and the other user does not know about the update. This is a possibility because a predominantly server-side UDMI sends data to the user's device. The unchanged data remains on the user's device until the user executes an UDMI function. Since the user can take a few minutes in between function executions, another user of the same DBMS database table 9900 can update the table with new data in the meantime. The user who accessed the table first does not know about the recent update, so will override the second user's updates if he/she executes one of the table update functions (e.g. Update Table, Insert Column, etc.).

Solution to the concurrency issue is found by introducing either of the two techniques of informing the user about the recent modifications in the DBMS database table 9900:

Before the user updates a table an update array will be checked. The update array will contain users who updated DBMS database table 9900 most recently (e.g. in the thirty minutes). Whenever a user wants to update a DBMS database table 9900, he/she will receive a message that another user updated the table if the update array indicates this.

Ability of UDMI to establish a real-time link between DBMS database and client-side device or software will completely solve the issue of concurrency.

Whenever a user updates a table, the Engine Program informs all other users connected to the same table about the recent update. Also, values of the data cells within the table end-data GUI change automatically after the update.

Access Privileges

The second field of UDMI development is conducted as definition of additional access privileges at table level and end-data (columns concerned only) level. Definition of privileges will be done through creation of additional access rules (privileges) on user and group levels. Use of users and groups will allow administrators to define to which tables, columns, end-data (rows, columns, and cells), and UDMI functions will each particular user or group have access.

Architecture

The UDMI is not limited to use with the hardware/software configuration shown in the figures; it may find applicability in any computing or processing environment. The UDMI may be implemented in hardware (e.g., an ASIC {Application-Specific Integrated Circuit} and/or an FPGA {Field Programmable Gate Array}), software, or a combination of hardware and software.

The UDMI may be implemented using one or more computer programs executing on programmable computers and/or executing on a computing or communication device connected to the network, that each includes a processor, and a storage medium (e.g., a remote storage server) readable by the processor (including volatile and non-volatile memory and/or storage elements).

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable machine for configuring and operating the computer when the storage medium or device is read by the computer to execute UDMI.

The UDMI may also be implemented as a machine-readable storage medium, configured with a computer program, where, upon execution, instructions in the computer program cause the machine to perform the functions described herein.

Other embodiments not described herein are also within the scope of the following claims.

What is claimed:

1. A computer-readable medium storing executable instructions that, in response to being executed, cause a computing device to perform operations comprising:
    generating an interface to enable network access to a virtual database;
    establishing a link via the virtual database to a plurality of databases remote from the virtual database, wherein the virtual database represents the plurality of databases accessible to the computing device remotely via a network, and wherein the virtual database comprises a plurality of tables;
    generating a unique sequential number to attach to a name of a table of the plurality of tables;
    requesting data via the link from the virtual database through an interaction with a visual interface;
    receiving data from one or more of the plurality of databases; and
    enabling access to the virtual database via the link by the computing device.

2. The computer-readable medium of claim 1, wherein the virtual database is maintained locally on the computing device.

3. The computer-readable medium of claim 1, wherein the virtual database is maintained remotely from the computing device.

4. The computer-readable medium of claim 1, further comprising manipulating the received data to create processed data.

5. The computer-readable medium of claim 4, further comprising presenting the processed data on the interface.

6. The computer-readable medium of claim 1, further comprising enabling a signin process for the computing device to access the virtual database.

7. The computer-readable medium of claim 1, further comprising receiving a subset of the virtual database in a format compatible with a reading process.

8. The computer-readable medium of claim 1, further comprising calculating cells in the plurality of tables based on one or more settings of the computing device.

9. A method comprising:
    generating, by a computing device, an interface to enable network access to a virtual database;
    establishing, by the computing device, a link via the virtual database to a plurality of databases remote from the virtual database, wherein the virtual database represents the plurality of databases accessible to the computing device remotely via a network, and wherein the virtual database comprises a plurality of tables;
    generating a unique sequential number to attach to a name of a table of the plurality of tables;

requesting, by the computing device, data via the link from the virtual database through an interaction with a visual interface;

receiving, by the computing device, data from one or more of the plurality of databases; and enabling, by the computing device, access to the virtual database via the link.

10. The method of claim 9, wherein the virtual database is maintained locally on the computing device.

11. The method of claim 9, wherein the virtual database is maintained remotely from the computing device.

12. The method of claim 9, further comprising manipulating, by the computing device, the received data to create processed data.

13. The method of claim 12, further comprising presenting, by the computing device, the processed data on the interface.

14. The method of claim 9, further comprising enabling, by the computing device, a sign-in process for the computing device to access the virtual database.

15. The method of claim 9, further comprising receiving, by the computing device, a subset of the virtual database in a format compatible with a reading process.

16. The method of claim 9, further comprising calculating, by the computing device, cells in the plurality of tables based on one or more settings of the computing device.

* * * * *